(12) United States Patent
Cai et al.

(10) Patent No.: US 9,505,634 B2
(45) Date of Patent: Nov. 29, 2016

(54) WARNING DEVICE DEDICATED FOR REPLACING AGED-FILTER IN A HANDHELD SHOWERHEAD

(71) Applicants: Ying Lin Cai, Guangdong (CN); Chao Fou Hsu, Kaohsiung (TW)

(72) Inventors: Ying Lin Cai, Guangdong (CN); Chao Fou Hsu, Kaohsiung (TW)

(*) Notice: Subject to any disclaimer, the term of this patent is extended or adjusted under 35 U.S.C. 154(b) by 0 days.

(21) Appl. No.: 14/748,902

(22) Filed: Jun. 24, 2015

(65) Prior Publication Data

US 2015/0375147 A1   Dec. 31, 2015

(30) Foreign Application Priority Data

Jun. 25, 2014  (TW) ................................. 103121898
Apr. 20, 2015  (TW) ................................. 104112557

(51) Int. Cl.
| | | |
|---|---|---|
| *G08B 21/00* | (2006.01) | |
| *G08B 29/00* | (2006.01) | |
| *G08B 5/00* | (2006.01) | |
| *B67D 7/08* | (2010.01) | |
| *B67D 7/56* | (2010.01) | |
| *B05B 7/12* | (2006.01) | |
| *A62C 31/00* | (2006.01) | |
| *B05B 1/30* | (2006.01) | |
| *C02F 1/00* | (2006.01) | |

(52) U.S. Cl.
CPC ......... *C02F 1/003* (2013.01); *C02F 2201/006* (2013.01); *C02F 2209/445* (2013.01); *C02F 2307/06* (2013.01)

(58) Field of Classification Search
CPC .. B01D 35/143; C02F 1/003; C02F 2307/06; C02F 2209/445; C02F 2201/006; B05B 15/008; B05B 1/18

USPC ............... 340/540, 607, 506, 815.4, 815.52; 239/71–74, 283, 588, 390, 407, 569, 239/446–449; 210/85, 87

See application file for complete search history.

(56) References Cited

U.S. PATENT DOCUMENTS

| | | | | |
|---|---|---|---|---|
| 6,016,977 A * | 1/2000 | Farley | ................. | B05B 15/002 239/525 |
| 7,468,127 B2 * | 12/2008 | Hsu | ................. | B01D 35/04 210/449 |
| 7,713,339 B2 * | 5/2010 | Johansson | ................. | B01D 46/10 116/266 |
| 9,156,051 B2 * | 10/2015 | Cai | ................. | B05B 15/008 |
| 2005/0205475 A1 * | 9/2005 | Hsu | ................. | B01D 35/04 210/85 |
| 2012/0056743 A1 * | 3/2012 | Lyon | ................. | F24F 11/0086 340/540 |
| 2014/0042240 A1 | 2/2014 | Cai et al. | | |

* cited by examiner

*Primary Examiner* — George Bugg
*Assistant Examiner* — Munear Akki
(74) *Attorney, Agent, or Firm* — Bacon & Thomas, PLLC

(57) ABSTRACT

The present invention provides a "warning device dedicated for replacing aged-filter in a handheld showerhead", which comprises a showerhead stem, an impeller mount, an impeller, a signal circuit device and a transparent lid. The showerhead stem includes an upper adapting section, a lower adapting section, and a mounting cavity for containing parts of impeller and signal circuit device. With upper adapting section and lower adapting section, the warning device can be easily sandwiched between showerhead and filter cylinder of conventional "handheld showerhead with built-in filter". Other than inherent measuring display for quantity of shower water and alerting function for timely replacing filter cartridge, the warning device also solves all issues of "top-heavy awkwardness", "quickened aging fatigue" and "redundant purchase waste", which happened in the prior arts of "handheld showerhead with filter replacing pre-alarm device" or "handheld showerhead with filter replacing pre-display device" and conventional "handheld showerhead with built-in filter".

14 Claims, 61 Drawing Sheets

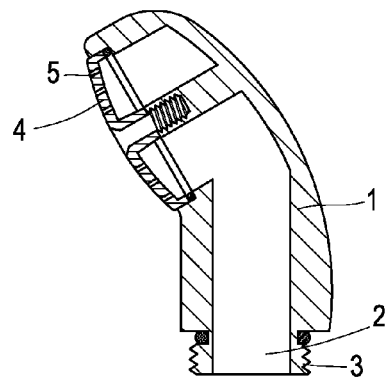
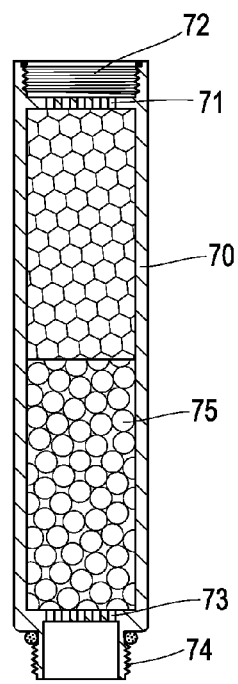
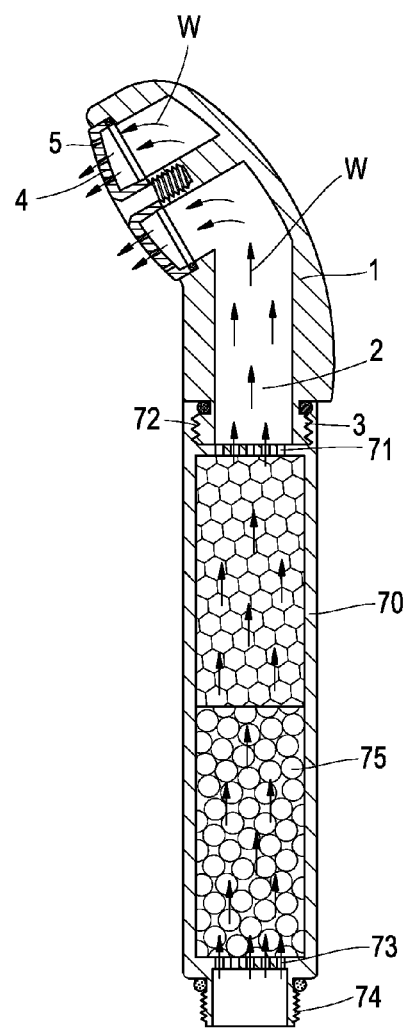
*FIG.1* (PRIOR ART)   *FIG.2* (PRIOR ART)

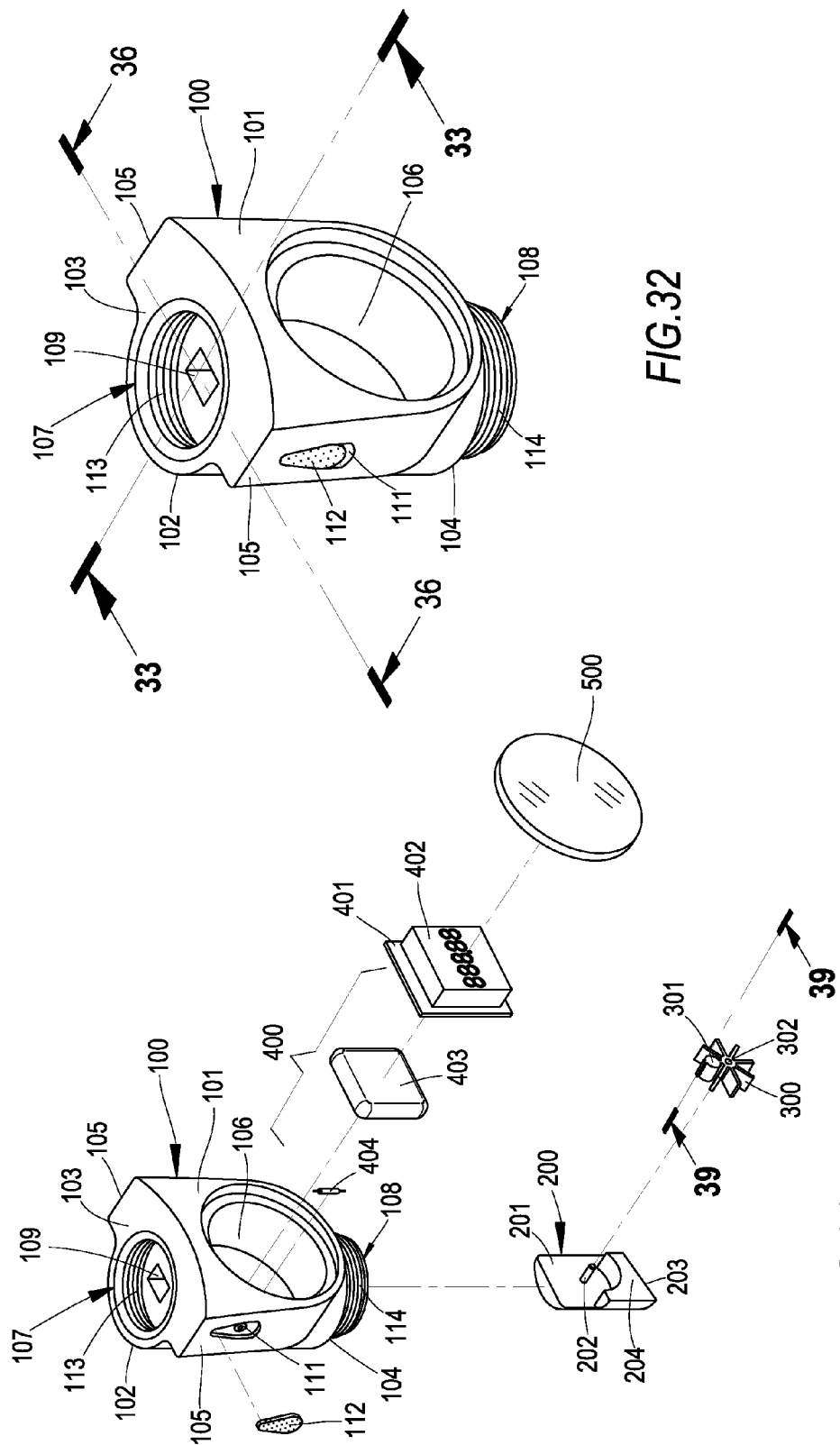

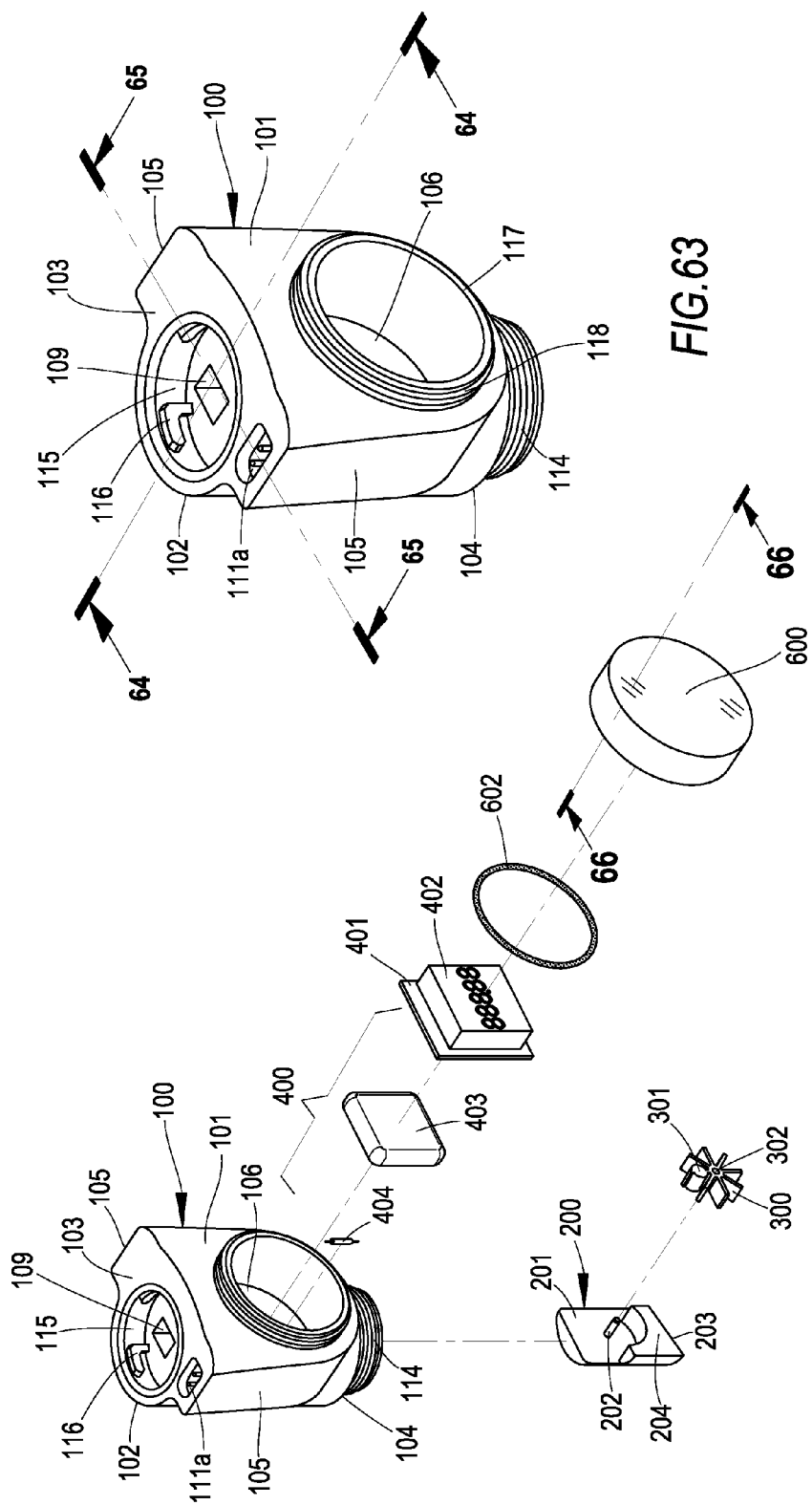

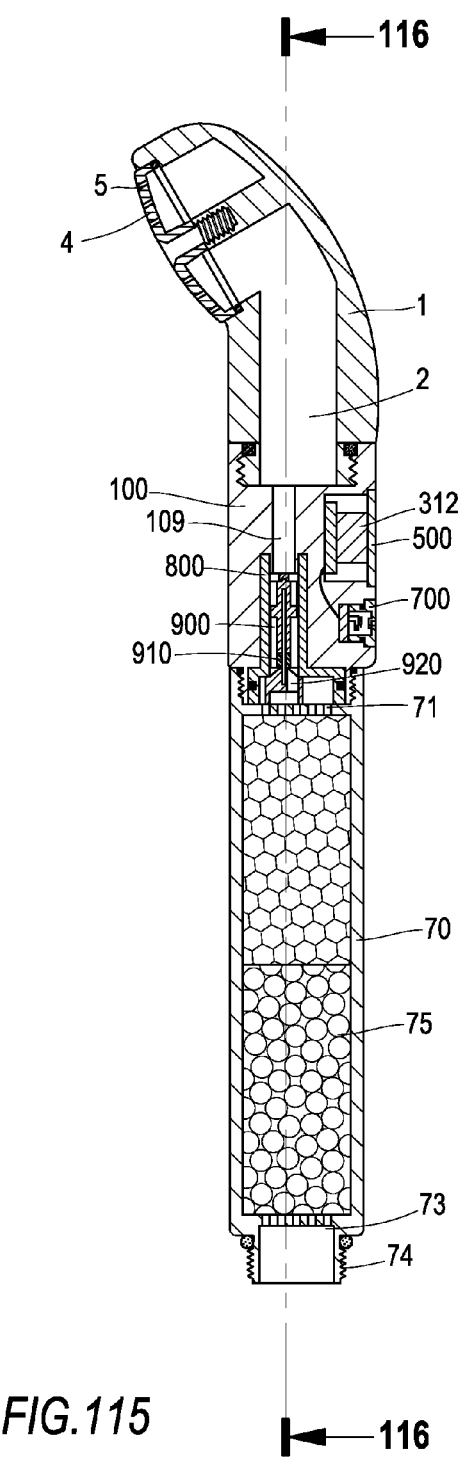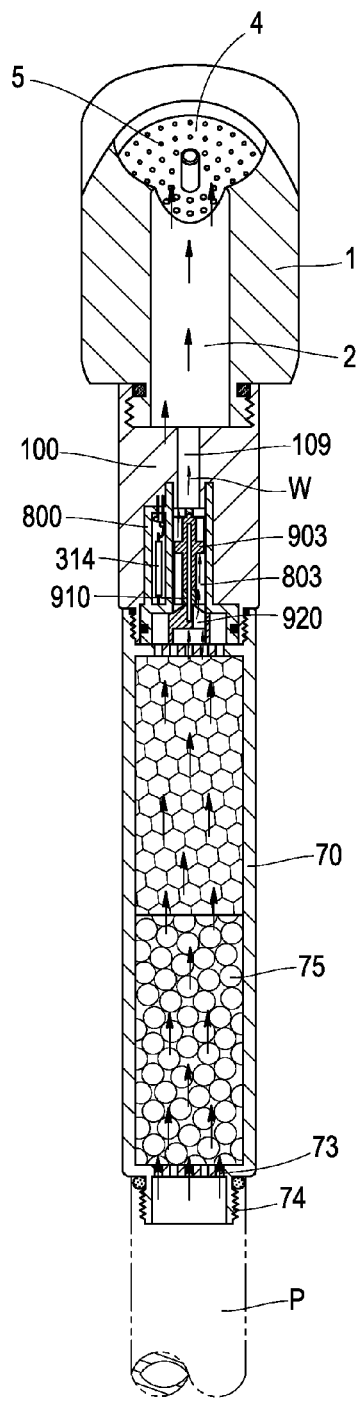
FIG.115
FIG.116

WARNING DEVICE DEDICATED FOR REPLACING AGED-FILTER IN A HANDHELD SHOWERHEAD

FIELD OF THE PRESENT INVENTION

The present invention relates to a "warning device", particularly for one dedicated for replacing aged-filter in a handheld showerhead. It can be easily sandwiched between showerhead and filter cylinder of conventional "handheld showerhead with built-in filter". Other than inherent measuring display for quantity of shower water and alerting function for timely replacing filter cartridge, the warning device also solves all issues of "top-heavy awkwardness", "quickened aging fatigue" and "redundant purchase waste", which happened in relevant prior arts.

BACKGROUND OF THE INVENTION

It is well known that the water supplied by waterworks is usually added chlorine for disinfection because chlorine is identified as a disinfecting agent. However, certain carcinogenic trihalomethanes may be formed by residual chlorine. Some diseases such as fracture, dry, falling-out and discoloration of the hairs as well as allergy, itch, dry and scaling of the skin are easily induced if people frequently showered by the warm shower water containing certain residual chlorine for a long time. For dechlorination of the residual chlorine in the shower water, the prior art of U.S. Pat. No. 6,016,977 discloses a design in title of "hand held shower head and filter housing", which insert a filter cartridge into the handheld handle to absorb the residual chlorine in the shower water. Besides, the prior art has been also commercialized into a marketing product of prior art "handheld shower head with built-in filter", which comprises a handheld showerhead 1 and a filter cartridge cylinder containing a filter cartridge 70 as shown in FIGS. 1 to 3, wherein the handheld showerhead 1 includes a water inlet orifice 2 with male tubular threads 3, a cap 4 with existing spray holes 5; and the filter cartridge cylinder 70 includes a water outlet orifice 71 with female tubular threads 72, a water inlet orifice 73 with male tubular threads 74, and a lot of mixed filter media 75 of activated carbon or non-soluble calcium sulfite ($CaSO_3$) and a copper-zinc media filled therein such that the filter cartridge cylinder 70 can be jointed with the handheld showerhead 1 via coupling of male tubular threads 3 of the water inlet orifice 2 and the female tubular threads 72 of the water outlet orifice 71. Thereby, the residual chlorine in the shower water W flowing through filter cartridge 70 will be absorbed and removed by the mixed filter media 75 so that clean shower water W without residual chlorine will be sprayed out the spray holes 5 on the cap 4 of the handheld showerhead 1 (as shown in FIGS. 2 and 3).

Normally, the activated carbon or calcium sulfite ($CaSO_3$) of the filter media 75 in the filter cartridge 70 has each service life of its own for effectively dechlorination. Usually, the manufacturer of the activated carbon or calcium sulfite ($CaSO_3$) will label the product to mark each effective service life of the filter cartridge 70 with limited total water flow quantity such as 300 Gallon or 500 Gallon. For instance of filter cartridge 70 with effective service life of 300 Gallon, the filter cartridge 70 must be replaced due to invalid of dechlorination if the total spent water flow quantity is 300 Gallon. However, the shower user does not know the exact time of reaching expiration of service life for the filter cartridge 70 because he/she is unable to realize the exact total flow quantity of shower water W that flows through the filter cartridge 70 in the prior art "handheld shower head with built-in filter". Two drawbacks are incurred by the facts mentioned above. Either user may waste money to increase economical burden if his/her replacement time of the filter cartridge 70 is early to expiration of service life thereof, or the filter cartridge 70 may become invalid of dechlorination to induce harmful healthful effects if his/her replacement time of the filter cartridge 70 is late to expiration of service life thereof.

For solving foregoing drawbacks in unpunctual replacement of filter cartridge 70, the inventor of the present invention firstly contrived a design of "handheld showerhead with filter replacing pre-alarm device", which is already granted by patents of R.O.C. patent No. 1275417, U.S. Pat. No. 7,468,127, Mainland China patent No. 858391, U.K. patent No. GB-2435797 and Korea patent No. 10-0912738 in filed records. Subsequently, the inventor of the present invention next contrived a new design of "handheld showerhead with filter replacing pre-display device", which is already published by patent applications of R.O.C. patent published No. 201406337 and US patent published No. 20140042241. To differentiate the application of the present invention from the prior arts, both of the "handheld showerhead with filter replacing pre-alarm device" and "handheld showerhead with filter replacing pre-display device" are put in a same category. Therefore, the prior art "handheld showerhead with filter replacing pre-alarm device" can also represent the prior art "handheld showerhead with filter replacing pre-display device" in this specification. The prior art "handheld showerhead with filter replacing pre-alarm device" comprises a showerhead 10, an alerting pod 20, a signal circuit device 30, an impeller 40, an internal panel 50 and a hood 60 in addition to conventional filter cartridge cylinder containing a filter cartridge 70 aforesaid as shown in FIGS. 4 to 14 and FIG. 21, wherein said showerhead 10, which is a plastic hollow casing extruded into unitary piece having a mantle 13 encompassed an obverse side 11 with a set of rim male threads 121 and a reverse side 12 as an integral body, has a handle butt 14 with a set of male tubular threads 16 formed on the tapered peripheral thereof to connect with the filter cartridge cylinder 70, a hollow water inlet orifice 15 created in the handle butt 14, a receptacle 17 inwardly created into the obverse side 11, a water exit bore base 19 and an impeller well 18 with a central impeller hub notch 181 further inwardly created into internal bottom of the receptacle 17, and a water inlet channel 182 created to communicate between the water inlet orifice 15 in the handle butt 14 and the adjacent side of the impeller well 18 while a water outlet channel 183 created to communicate between the water exit bore base 19 and the other side of the impeller well 18 (as dotted line portion shown in FIG. 6), as well as in the reverse side 12, a finger guiding groove 125 and a round docking socket 122 with a docking hole 123 inwardly created into the inner wall thereof in opposite manner, and a snap latching jut 124 upwardly created into the bottom wall thereof to let a detachable alerting pod 20 inserting therein (as indicated by two enlarged circular views shown in FIG. 5); said conventional filter cartridge cylinder includes a filter cartridge 70 in a detachable handle cylinder with a set of female tubular threads 72 formed in jointing end section thereof for being mated with the set of male tubular threads 16 of the handle butt 14 (as shown in FIG. 21); said internal lid 50, which is a planiform disk tightly attached on the bottom side of the receptacle 17 in the showerhead 10, has an inward surface 51 facing toward the obverse side 11 of the showerhead 10, a impeller hub notch 52 created therein to correspond with the impeller hub notch 181 of the impeller well 18, a water outlet 53 created therein to correspond with the water exit bore base 19 of the receptacle 17 in the showerhead 10, and a plurality of screw holes 54 peripherally created the marginal rim thereof such that the screw holes 54 spread around the impeller hub notch 52 and water outlet 33; said impeller 40, which is a cylindrical profile body with plural curved vanes equivalently extending radically, has two central protruding hubs 41 being coaxially disposed at top side and bottom side thereof respectively, and a magnetic element 42 embedded in the top cut of one vane (as shown in FIG. 8) such that the impeller 40 is freely rotatable in the impeller well 18 by means of two central protruding hubs 81 being mated with the impeller hub notch 181 of the impeller well 18 and the impeller hub notch 52 of the internal lid 50 respectively (as shown in FIG. 14); said hood 60, which is a plastic disk extruded into unitary piece, has a hoop female threads 61 created around the bottom rim thereof and a plurality of water spray holes 62 spread over the surface thereof so that the hoop female threads 91 can mate with the rim male threads 121 on the obverse side 11 of the showerhead 10 by screwing engagement (as shown in FIG. 9) while the water spray holes 62 enable the water in the receptacle 17 on the obverse side 11 of the showerhead 10 to jet out; said alerting pod 20, which is a plastic capsule made by a plastic transparent lid 21 and a plastic mounting cavity 22 via high frequency fusion method into a hermetically watertight integral body for being embedded into the round docking socket 122 of the reverse side 12 in the showerhead 10 (as shown in FIGS. 10 and 11), in the mounting cavity 22, has a docking jut 23 outwardly created on the peripheral surface thereof, and a snap latching nick 24 downwardly created into the bottom wall thereof, as well as two rechargeable electrodes 25 firmly inset in internal bottom wall of the mounting cavity 22 such that each individual end of each rechargeable electrode 25 protruding out of the mounting cavity 22 (as lower enlarged view shown in FIG. 11); and said signal circuit device 30, which is contained in the alerting pod 20, includes a microprocessor 31, a LCD display circuit 32 electrically connected to the microprocessor 31 with its location near the transparent lid 21, a rechargeable battery 33 electrically connected to the microprocessor 31, and a magnetic reed switch 34 securely inset on the internal bottom side of the mounting cavity 22 (as shown in FIG. 10) such that the rechargeable battery 33 is electrically connected with the rechargeable electrodes 25 of the alerting pod 20 via a pair of electric wires L (as lower enlarged view shown in FIG. 11), wherein the rechargeable battery 33 can be either nickel-chromium battery or lithium battery, and the magnetic reed switch 34 can be replaced by Hall-effect component.

For assembly steps for all components aforesaid, please further refer to FIGS. 12 to 19.

a. Align the protruding hub 41 (upper side in figure) of the impeller 40 having magnetic element 42 in one vane with the impeller hub notch 181 of the impeller well 18 in the obverse side 11 of the showerhead 10, then put the protruding hub 41 into the impeller hub notch 181 so that the magnetic element 42 of the impeller 40 faces toward the round docking socket 122 of the showerhead 10 (as shown in FIG. 12).

b. Attach the inward surface 51 of the internal lid 50 against the top surface of the receptacle 17 in the showerhead 10 so that the impeller hub notch 52 of the internal lid 50 sleeves over the other protruding hub 41 of the impeller 40 (as lower side shown in FIG. 13), drive every self-drilling screws S into the internal bottom wall of the receptacle 17 via corresponding screw hole 54 of the internal lid 50 respectively so that the internal lid 50 closely attach with the top surface of the receptacle 17 to allow the impeller 40 be freely rotatable in the impeller well 18 (as shown in FIG. 14).

c. Mate the hoop female threads 61 on the hood 60 with the rim male threads 121 on the obverse side 11 of the showerhead 10 by screwing engagement to complete the assembly for the obverse side 11 of the showerhead 10 (as shown in FIGS. 14 and 15).

d. Align and mate the docking jut 23 in the mounting cavity 22 of the alerting pod 20 with the docking hole 123 in the round docking socket 122 of the reverse side 12 of the showerhead 10 (as shown in FIG. 16 and left upper enlarged view shown in FIG. 17) so that the bottom side of the snap latching nick 24 in the mounting cavity 22 will contact with the top side of the snap latching jut 124 in the round docking socket 122 (as right upper enlarged view shown in FIG. 17). Then, thoroughly latch the snap latching nick 24 in the mounting cavity 22 with the snap latching jut 124 of the round docking socket 122 by forcibly applying downward force F1 over the transparent lid 21 (as right upper enlarged view shown in FIG. 18) so that the docking jut 23 in the mounting cavity 22 also fully latches with the docking hole 123 in the round docking socket 122 simultaneously (as two upper enlarged views shown in FIG. 19) to complete the assembly for the alerting pod 20 and showerhead 10. Thus the overall assembly steps in the "handheld showerhead with filter replacing pre-alarm device" are finished.

For practical use and operation mode, please further refer to FIGS. 20 to 22. Prior to operate the showerhead, firstly screw the female tubular threads 72 in the water outlet orifice 71 of the filter cartridge cylinder 70 with the male tubular threads 16 on the handle butt 14 of the showerhead 10 (as shown in FIG. 21), then connect a detachable water pipe P to the male tubular threads 74 on the water inlet orifice 73 of the filter cartridge cylinder 70 (as shown in FIGS. 20 and 21). Once the shower water W flows through the filter cartridge 70, it enters into the impeller well 18 orderly via the water inlet orifice 15 in the handle butt 14, and the water inlet channel 182 to drive the impeller 40 rotate. Then, the shower water W in the impeller well 18 flows out of the water outlet 53 in the internal lid 50 orderly via the water outlet channel 183 and the water exit bore base 19. Finally, the shower water W is jetted out of the water spray holes 62 in the hood 60 (as shown in FIGS. 21 and 22). Wherein, for each rotation of the impeller 40 driven by the running shower water W, the magnetic element 42 thereof simultaneously switches the magnetic reed switch 34 in the alerting pod 20 one time to induce a switching signal, which is relayed to the microprocessor 31 in the signal circuit device 30 for being processed to generate an accumulated data in certain preset interval for further transmitting to the LCD display circuit 32 for displaying related quantity of water flux thereon in accordance with following formula:

Quantity of water flux (Q)=Cross sectional area (A) times Flow velocity (V)

Thereby, a user of the showerhead can get real time statistical data of the total filtered water quantity flowed through filter cartridge 70 by simply means of looking at the LCD display circuit 32 via the transparent lid 21 of the alerting pod 20. Once the total filtered water quantity flowed through filter cartridge 70 reaches (or near reaches) a predetermined critical value for the rated service life time of the specific filter cartridge 70, the microprocessor 31 will send a alerting signal with current data of the total filtered water quantity to the LCD display circuit 32 for reminding the user to notice that it is the time to replace the filter cartridge 70 timely to assure good quality of the filter cartridge 70 and filtered water thereby. Therefore, the user can avoid the harmful consequences to the health caused by the unclean water incurred by missing the replacement time and still continuously use the ineffective filter cartridge 70.

For replacing the filter cartridge 70 or recharging the rechargeable battery 33, please further refer to FIGS. 23 to 28. The prior art hand held shower head with filter replacing pre-alarm device of the further comprises a battery recharging mount 80, which includes a battery charging cavity 81 with a pair of battery charging electrodes 82 to securely contact the corresponding pair protruding ends of the rechargeable electrodes 25 in the mounting cavity 22 of the alerting pod 20 for performing suitably recharging operation to the rechargeable battery 33 in the alerting pod 20. The power of the rechargeable battery 33 in the alerting pod 20 might run out when the filter cartridge 70 has been replaced several times. In operation mode of replacing the filter cartridge 70 or recharging the rechargeable battery 33, firstly, hook the marginal edge of the transparent lid 21 in the alerting pod 20 by one finger along the finger guiding groove 125 in the reverse side 12 of the showerhead 10 (as shown in FIG. 23), then apply an upward force F2 on the mounting cavity 22 (as shown in FIG. 24), the snap latching nick 24 of the alerting pod 20 will bounce off the snap latching jut 124 in the round docking socket 122 of the showerhead 10 (as right upper enlarged view shown in FIG. 24); secondly, continuously apply an upward force F2 on the mounting cavity 22, the entire alerting pod 20 will fully detach off the round docking socket 122 in the reverse side 12 of the showerhead 10 (as shown in FIGS. 25 and 26); and finally, insert the detached alerting pod 20 into the battery recharging cavity 81 of the battery recharging mount 80, the rechargeable battery 33 in the alerting pod 20 will be properly recharged (as shown in FIGS. 27 and 28).

The prior art "handheld showerhead with filter replacing pre-alarm device", which is already published by R.O.C. patent published No. 201406337 and US patent published No. 20140042240, does have achieved the expected effects after having been practically tested for many times. However, some issues such as top-heavy awkwardness, quickened aging fatigue and redundant purchase waste are also found as below.

1. Top-Heavy Awkwardness:

Please refer to FIGS. 1, 4, 10, 20 and 21. For prior art "handheld showerhead with filter replacing pre-alarm device", some components such as alerting pod 20 with related parts are inserted into the round docking socket 122 of the shower head 10, while some components such as signal circuit device 30, impeller 40, and internal lid 50 with related parts are inserted into the impeller well 18 of the shower head 10 so that the bulky showerhead 10 becomes heavier at the top than the slender handle of the filter cartridge cylinder 70 at the bottom. Contrarily, for marketing product of conventional "handheld shower head with built-in filter", there is no such status that the bulky showerhead 10 is heavier at the top than the slender handle of the filter cartridge cylinder 70 at the bottom. Accordingly, the showerhead set easily falling to hit the floor carelessly during shower owing to the top-heavy awkwardness in the prior art "handheld showerhead with filter replacing pre-alarm device". Consequently, the components in the showerhead set not only easily shorten the service life but also quickly get into malfunction of water quantity measurement and pre-alarm.

2. Quickened Aging Fatigue:

Please refer to FIGS. 25 to 28. For operation of recharging the rechargeable battery 33 in the prior art hand held shower head with filter replacing pre-alarm device, the alerting pod 20 must be taken off from the round docking socket 122 of the showerhead 10 and reinsert into the round docking socket 122 of the showerhead 10. By frequently reiterative such recharging operation, the snap latching jut 124 in the round docking socket 122 of the showerhead 10 will be hastened into damaged incurred by aging fatigue. Consequently, the round docking socket 122 of the showerhead 10 not only easily shorten the service life but also forcibly oblige the user to replace the integral showerhead 10 unpunctually.

3. Redundant Purchase Waste:

Please refer to FIGS. 1 and 4. If the user wants to replace showerhead set from the conventional "handheld shower head with built-in filter" into prior art "handheld showerhead with filter replacing pre-alarm device" for health consideration, he/she must discard the conventional "handheld shower head with built-in filter". Consequently, the conventional "handheld shower head with built-in filter", which is to be discarded, not only causes the extra burden of environment protection but also causes extra cost burden for the user.

In addressing to the issues aforesaid, the inventor of the present invention enthusiastically researched and developed a new contrivance to overcome foregoing issues to work out the present invention eventually.

SUMMARY OF THE INVENTION

The primary object of the present invention is to provide a "warning device dedicated for replacing aged-filter in a handheld showerhead" for solving the "top-heavy awkwardness" issue. The "warning device dedicated for replacing aged-filter in a handheld showerhead" comprises a showerhead stem, an impeller mount, an impeller, a signal circuit device and a transparent lid.

The showerhead stem includes an upper adapting section, a lower adapting section, and a mounting cavity for containing parts of impeller and signal circuit device. With upper adapting section and lower adapting section, the warning device can be easily sandwiched between showerhead and filter cylinder of conventional "handheld showerhead with built-in filter".

With balanced design in offsetting the light weight of the filter cartridge cylinder 70 for the showerhead stem 100 of the present invention, the shower user can easily manipulate it almost without possibility in falling out it to hit on the floor.

Thus, other than inherent measuring display for quantity of shower water and alerting function for timely replacing filter cartridge, the warning device also solves "top-heavy awkwardness" issue, which happened in the prior arts of "handheld showerhead with filter replacing pre-alarm device" or "handheld showerhead with filter replacing pre-display device" and conventional "handheld showerhead with built-in filter". Wherein, the prior art "handheld showerhead with filter replacing pre-alarm device" is already granted by U.S. Pat. No. 7,468,127 in filed records while the prior art "handheld showerhead with filter replacing pre-display device" is already published by US patent application published No. 20140042241.

Another object of the present invention is to provide a "warning device dedicated for replacing aged-filter in a handheld showerhead" for solving the "quickened aging fatigue" issue. The "warning device dedicated for replacing aged-filter in a handheld showerhead" comprises a showerhead stem, an impeller mount, an impeller, a signal circuit device and a transparent lid as well as a recharging receptacle disposed in one flank of the recharging receptacle. With adapting recharging receptacle design for the showerhead stem of the present invention, the shower user can easily recharge old battery without need in detaching the existing conventional handheld showerhead or filter cartridge cylinder out off the showerhead stem. Thus, other than inherent measuring display for quantity of shower water and alerting function for timely replacing filter cartridge, the warning device also solves "quickened aging fatigue" issue, which happened in the prior arts of "handheld showerhead with filter replacing pre-alarm device" or "handheld showerhead with filter replacing pre-display device" and conventional "handheld showerhead with built-in filter".

The other object of the present invention is to provide a "warning device dedicated for replacing aged-filter in a handheld showerhead" for solving the "redundant purchase waste" issue. The "warning device dedicated for replacing aged-filter in a handheld showerhead" can be easily sandwiched between the shower head and filter of the conventional "handheld shower head with built-in filter". With adapting sandwiched design for the showerhead stem 100 of the present invention, the shower user can only buy a "warning device dedicated for replacing aged-filter in a handheld showerhead" of the present invention to easily sandwich between the shower head and filter of the conventional "handheld shower head with built-in filter" aforesaid without discarding it. Thus, other than inherent measuring display for quantity of shower water and alerting function for timely replacing filter cartridge, the warning device also solves "redundant purchase waste" issue, which happened in the prior arts of "handheld showerhead with filter replacing pre-alarm device" or "handheld showerhead with filter replacing pre-display device" and conventional "handheld showerhead with built-in filter".

BRIEF DESCRIPTION OF THE DRAWINGS

FIG. 1 is an exploded cross sectional view for conventional "handheld shower head with built-in filter".

FIG. 2 is an assembled cross sectional view for conventional "handheld shower head with built-in filter".

FIG. 31 is an exploded perspective view for the first exemplary embodiment of the present invention.

FIG. 32 is an exploded perspective view for a showerhead stem in the first exemplary embodiment of the present invention.

FIG. 62 is an exploded perspective view for the second exemplary embodiment of the present invention.

FIG. 63 is an exploded perspective view for a showerhead stem in the second exemplary embodiment of the present invention.

FIG. 115 is the second perspective view showing the assembly for the third exemplary embodiment of the present invention into a conventional "handheld shower head with built-in filter".

FIG. 116 is a cross sectional view taken against the section line of 116-116 from previous FIG. 115.

DETAILED DESCRIPTION OF THE PREFERRED EMBODIMENTS

Figure 35:
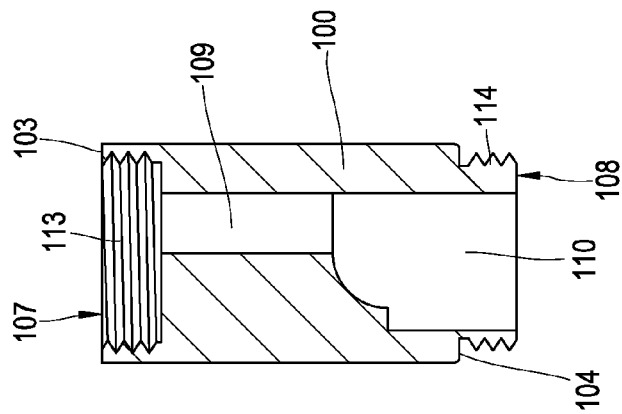
FIG. 35 is a cross sectional view taken against the section line of 35-35 from previous FIG. 33.
Figure 34:
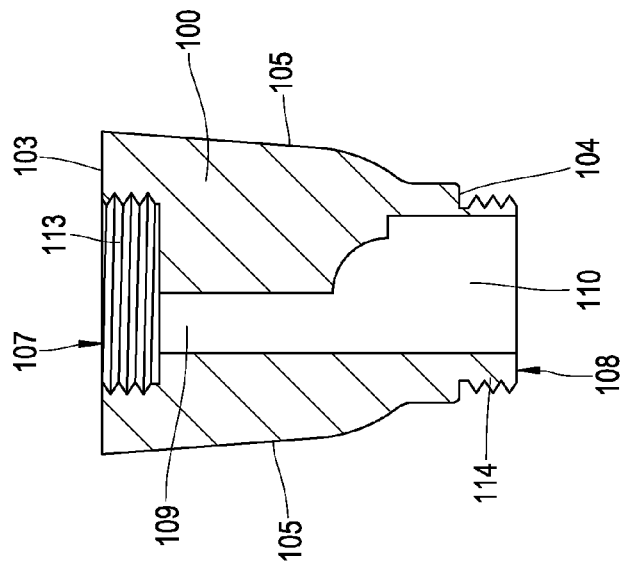
FIG. 34 is a cross sectional view taken against the section line of 34-34 from previous FIG. 33.
Figure 33:
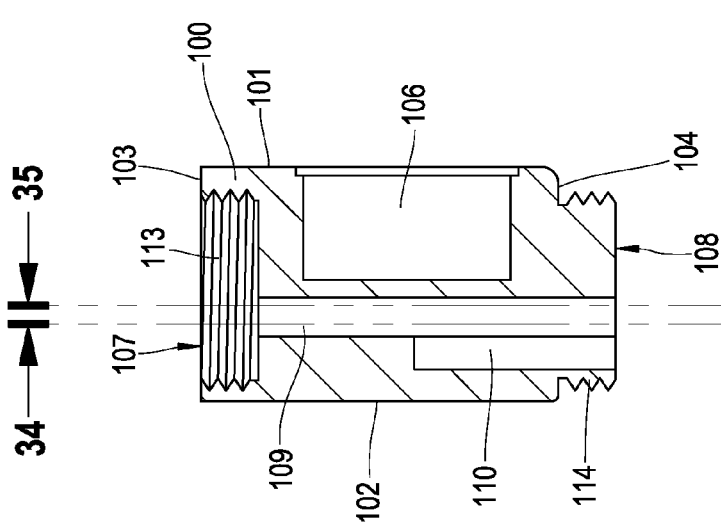
FIG. 33 is a cross sectional view taken against the section line of 33-33 from previous FIG. 32.
Figure 37:
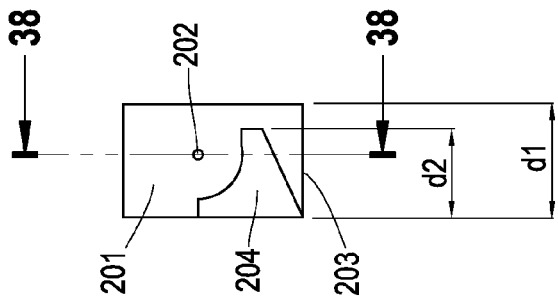
FIG. 37 is a front view for an impeller well in the first exemplary embodiment of the present invention.
Figure 38:
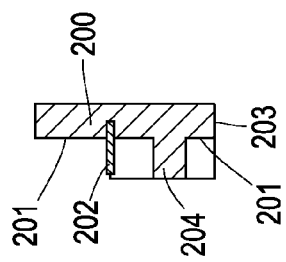
FIG. 38 is a cross sectional view taken against the section line of 38-38 from previous FIG. 37.
Figure 39:
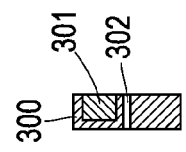
FIG. 39 is a cross sectional view taken against the section line of 39-39 from previous FIG. 31.
Figure 36:
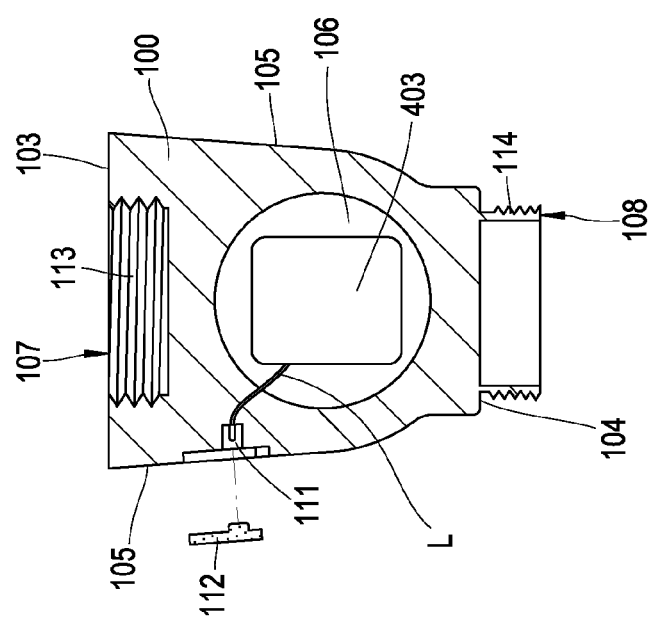
FIG. 36 is a cross sectional view taken against the section line of 36-36 from previous FIG. 32.
Figure 41:
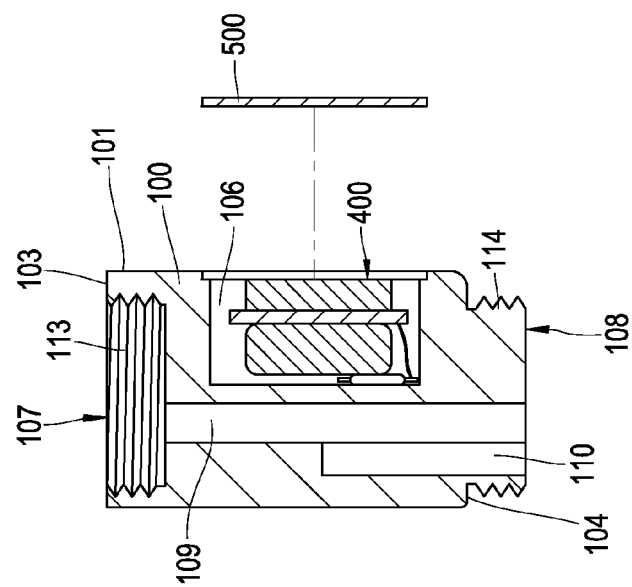
FIG. 41 is the second cross sectional view showing assembly for the first exemplary embodiment of the present invention.
Figure 42:
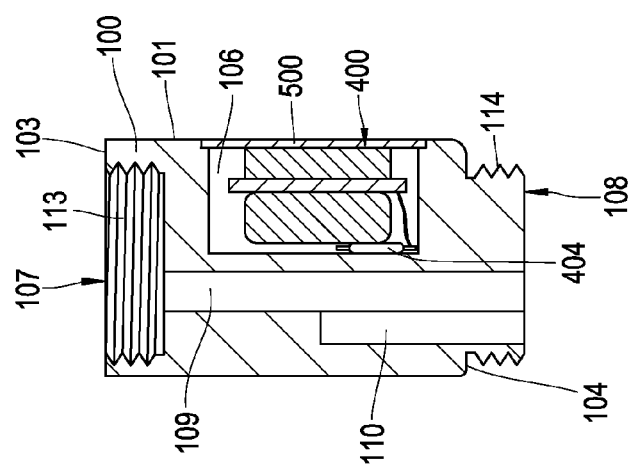
FIG. 42 is the third cross sectional view showing assembly for the first exemplary embodiment of the present invention.
Figure 49:
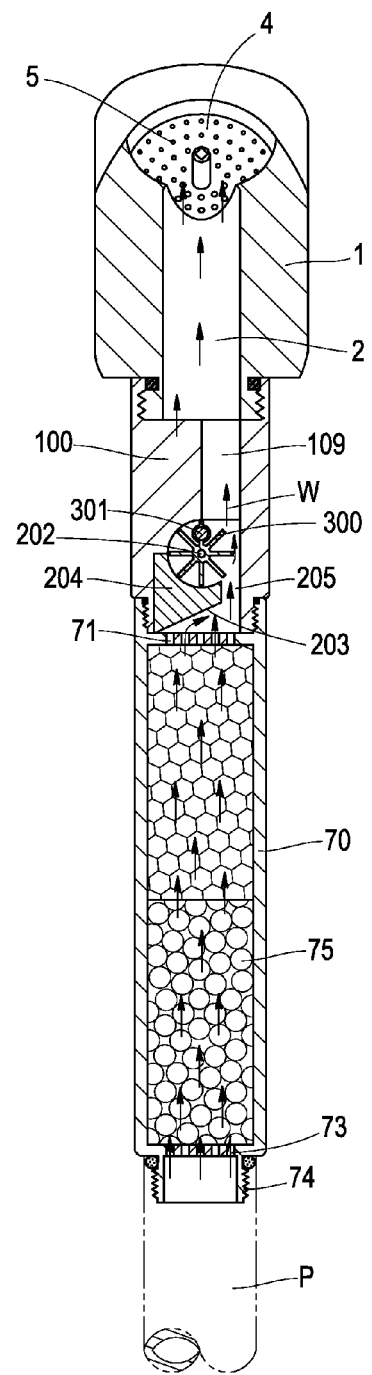
FIG. 49 is a cross sectional view taken against the section line of 49-49 from previous FIG. 48.

Please refer to FIGS. 29 to 42 and FIG. 49. The "warning device dedicated for replacing aged-filter in a handheld shower head" for the first exemplary embodiment of the present invention comprises a showerhead stem 100, an impeller mount 200, an impeller 300, a signal circuit device 400 and a transparent lid 500 in addition to conventional handheld showerhead 1 containing a showerhead 10 with a detachable filter cartridge cylinder 70 aforesaid, wherein said showerhead stem 100, which is an integral plastic hollow casing body with a front side 101, a back side 102, a top side 103, a bottom side 104 and two flanks 105 by unitary piece extrusion mold, includes a mounting cavity 106, an upper adapting section 107, a lower adapting section 108, a water channel 109, an impeller well 110 and a recharging receptacle 111 with a waterproof cover 112, wherein the mounting cavity 106 is inwardly created in the front side 101, the upper adapting section 107 is inwardly created in the top side 103 for screwing engagement with corresponding male tubular threads 3 on the water inlet orifice 2 of the handheld showerhead 1, the lower adapting section 108 is outwardly created on the bottom side 104 for screwing engagement with corresponding female tubular threads 72 on the water outlet 71 of the filter cartridge cylinder 70, the water channel 109 is internally created between the upper adapting section 107 in the top side 103 and the lower adapting section 108 on the bottom side 104 (as shown in FIGS. 33 to 35), the impeller well 110 is inwardly created at the intersection of the bottom side 104 and the water channel 109, and the recharging receptacle 111 is inwardly created in one flank 105 (as shown in FIGS. 32 and 36); said impeller mount 200, which is a slab with a front side 201 and a bottom side 203 for being inserted into the impeller well 110 of the showerhead stem 100, includes a rotation axle 202 disposed on the front side 201, and a water directing lump 204 disposed on the front side 201 near the bottom side 203 such that the width d2 of the water directing lump 204 is less than the width d1 of the front side 201 (as shown in FIGS. 31 and 37) so that the a water directing channel 205 is created between the water directing lump 204 and water channel 109 after the impeller mount 200 having inserted into the impeller well 110 of the showerhead stem 100 (as shown in FIG. 49); said impeller 300, which is windmill-shaped wheel with multiple radial vanes, includes a magnetic element 301 disposed on one vane (as shown in FIGS. 31 and 39) and a central axial bushing 302 run through for coupling with corresponding rotation axle 202 on the front side 201 of the impeller mount 200 to let the impeller 300 rotate freely (as shown in FIG. 49); said signal circuit device 400, which is contained in the mounting cavity 106 of the showerhead stem 100, includes a microprocessor 401, a LCD display circuit 402 electrically connected to the microprocessor 401, a rechargeable battery 403 electrically connected to the microprocessor 401, and a magnetic reed switch 404 securely inset on the internal bottom side of the mounting cavity 106 in the showerhead stem 100 (as shown in FIG. 31) such that the rechargeable battery 403 is electrically connected with the recharging receptacle 111 of the showerhead stem 100 via a pair of electric wires L (as shown in FIG. 36); and said transparent lid 500 is made of plastic material via high frequency fusion method to hermetically watertight cover the mounting cavity 106 in the showerhead stem 100 (as shown in FIGS. 41 and 42) to avoid the shower water W from seeping into the mounting cavity 106 in the showerhead stem 100 so that all components of the signal circuit device 400 in the mounting cavity 106 are free from short-circuit incurred by seeping shower water W.

Wherein, the upper adapting section 107 in the top side 103 of the showerhead stem 100 is a tubular threaded female fitting 113 of cylindrical cavity while the lower adapting section 108 on the bottom side 104 of the showerhead stem 100 is a tubular threaded male fitting 114 of cylindrical protrusion (as shown in FIGS. 31 to 36), as well as the rechargeable battery 403 in the signal circuit device 400 can be either nickel-chromium battery or nickel battery or lithium battery, and the magnetic reed switch 404 can be replaced by Hall-effect component.

Please refer to FIGS. 40 to 46. The assembly procedure for the first exemplary embodiment of the present invention is stepwise performed as below.

Figure 40:
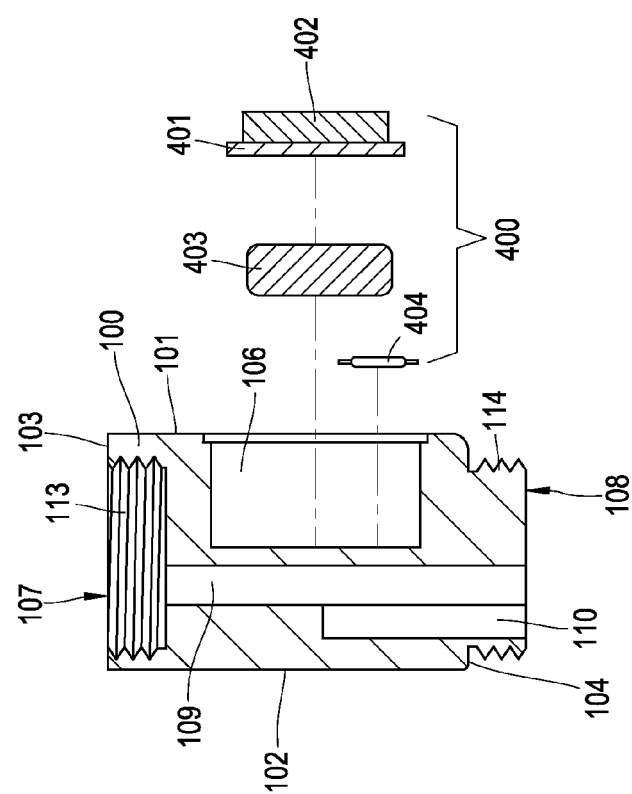
FIG. 40 is the first cross sectional view showing assembly for the first exemplary embodiment of the present invention.
Figure 43:
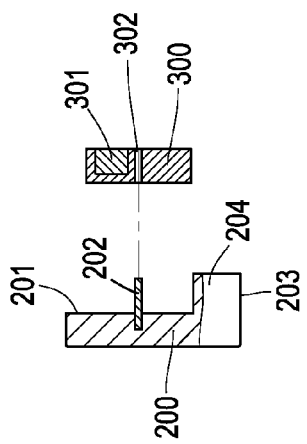
FIG. 43 is the fourth cross sectional view showing assembly for the first exemplary embodiment of the present invention.
Figure 44:
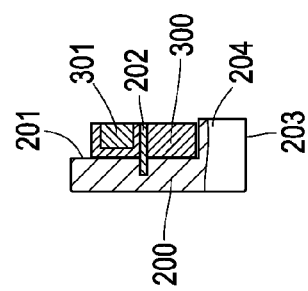
FIG. 44 is the fifth cross sectional view showing assembly for the first exemplary embodiment of the present invention.
Figure 46:
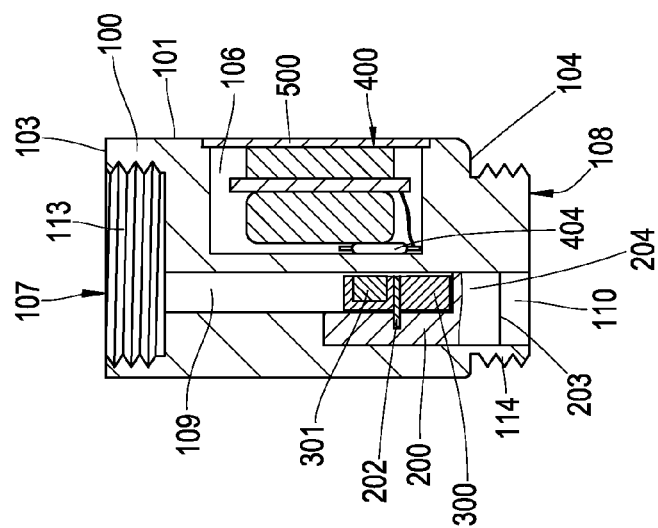
FIG. 46 is the seventh cross sectional view showing assembly for the first exemplary embodiment of the present invention.
Figure 45:
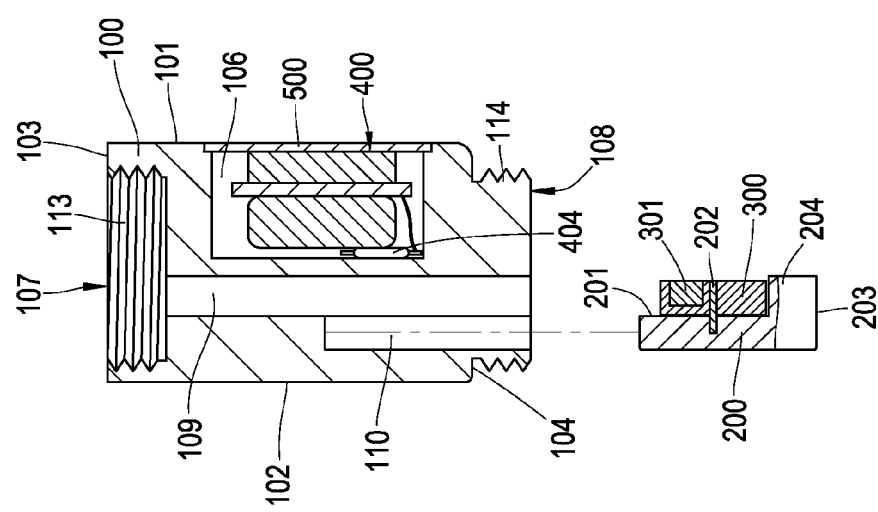
FIG. 45 is the sixth cross sectional view showing assembly for the first exemplary embodiment of the present invention.

A. Firstly, fix the magnetic reed switch 404 of the signal circuit device 400 on the mounting cavity 106 of the showerhead stem 100 by suitable adhesive material, and orderly put the rechargeable battery 403, microprocessor 401 and LCD display circuit 402 into the mounting cavity 106 of the showerhead stem 100 (as shown in FIGS. 40 and 41), then hermetically cover the transparent lid 500 on the mounting cavity 106 of the showerhead stem 100 (as shown in FIG. 42) to avoid all components of the signal circuit device 400 in the mounting cavity 106 from short-circuit incurred by seeping shower water W;

B. Subsequently, sleeve the central axial bushing 302 of the impeller 300 over the rotation axle 202 of the impeller mount 200 (as shown in FIG. 43), and try to rotate the impeller 300 for testing the impeller 300 is able to freely rotate (as shown in FIG. 44); and C. Finally, insert the integral unit of impeller mount 200 and impeller 300 into the impeller well 110 in the bottom side 104 of the showerhead stem 100 by facing the bottom side 203 outwardly (as shown in FIG. 45) to finish the assembly procedure for the first exemplary embodiment of the present invention (as shown in FIG. 46).

Please refer to FIG. 30 and FIGS. 47 to 49. The installation for the first exemplary embodiment of the present invention into a conventional "handheld shower head with built-in filter", which is very simple, is described as below.

Figure 47:
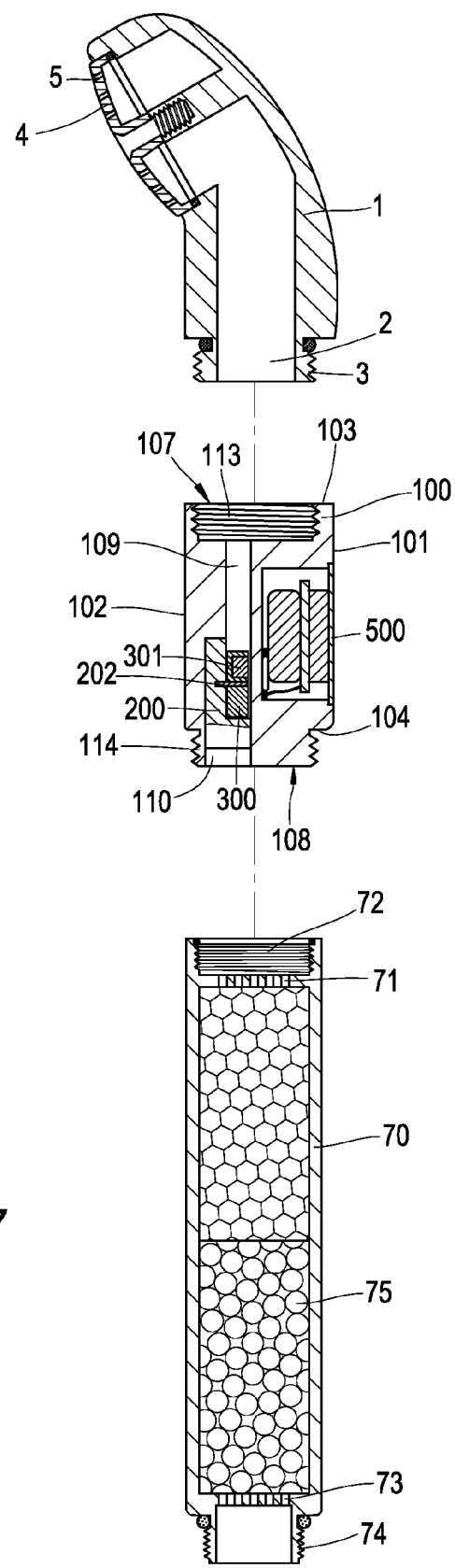
FIG. 47 is a decomposed cross sectional view showing the installation for the first exemplary embodiment of the present invention into a conventional "handheld shower head with built-in filter".
Figure 48:
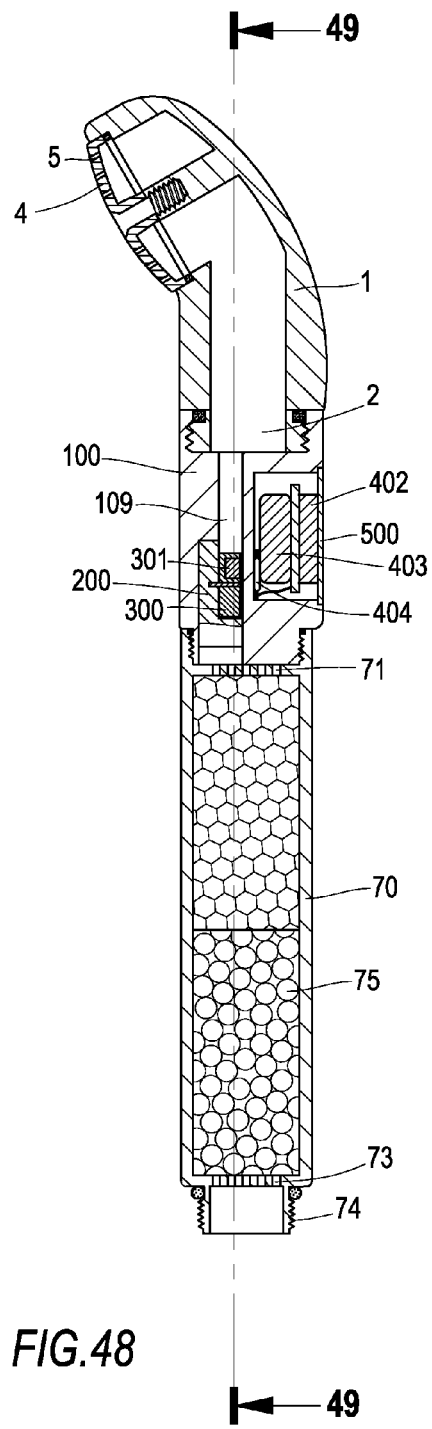
FIG. 48 is an assembled cross sectional view showing the installation for the first exemplary embodiment of the present invention into a conventional "handheld shower head with built-in filter".

Firstly, screw the tubular threaded female fitting 113 of the upper adapting section 107 in the top side 103 of the showerhead stem 100 to engage with corresponding male tubular threads 3 of the water inlet orifice 2 on the handheld showerhead 1 (as shown in FIG. 47), secondly, screw the tubular threaded male fitting 114 of the lower adapting section 108 On the bottom side 104 of the showerhead stem 100 to engage with corresponding female tubular threads 72 in the water outlet orifice 71 of the filter cartridge cylinder 70 (as shown in FIG. 48), and finally, screw the external water pipe P to engage with corresponding male tubular threads 74 on the water inlet orifice 73 of the filter cartridge cylinder 70 (as shown in FIG. 49).

Figure 50:
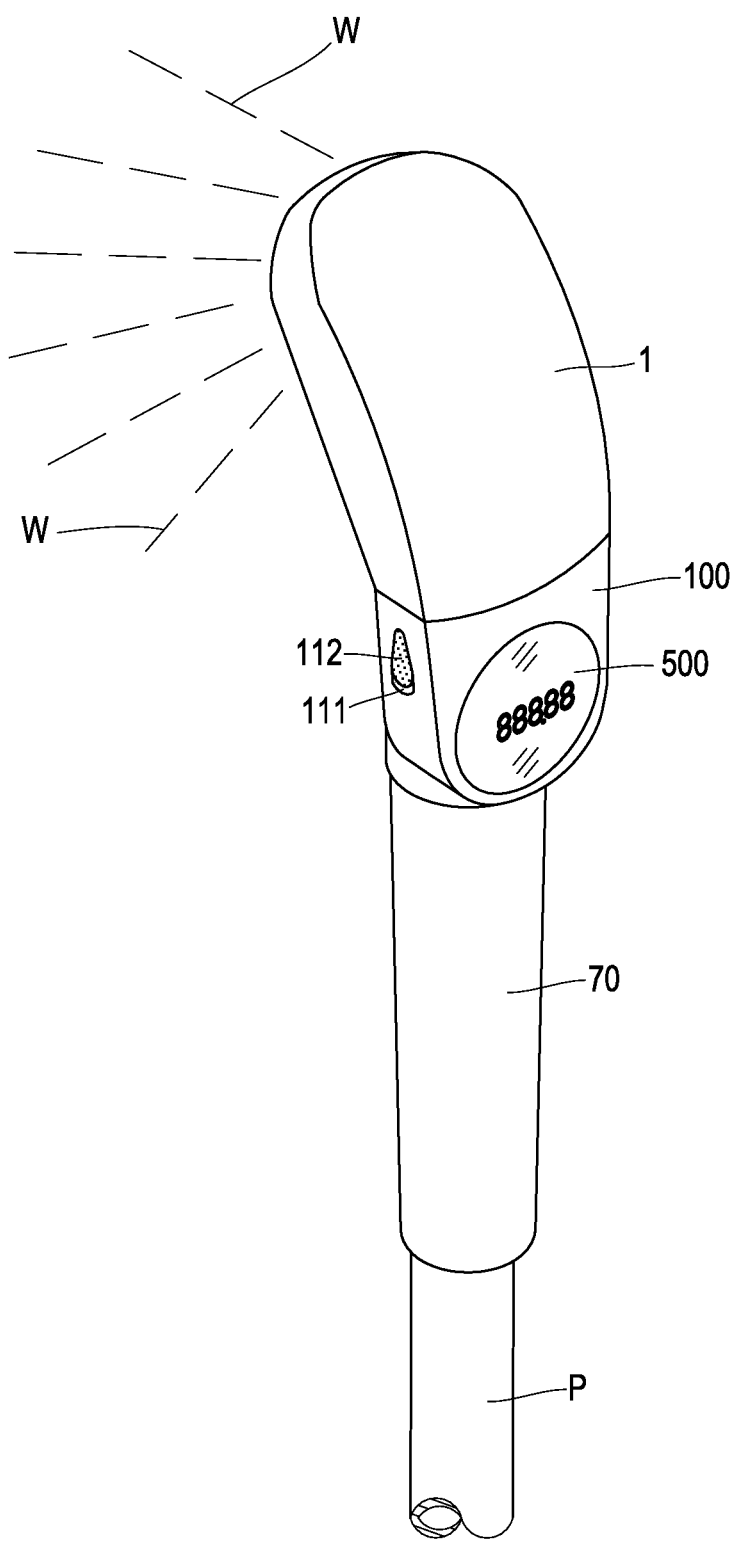
FIG. 50 is a perspective view showing the installation for the first exemplary embodiment of the present invention with connected water pipe into a conventional "handheld shower head with built-in filter".

Please refer to FIGS. 49 and 50. The operation for the first exemplary embodiment of the present invention into a conventional "handheld shower head with built-in filter" is described as below.

Once the shower water W from the water pipe P flows through the water outlet 71 of the filter cartridge 70, it orderly passes through the water directing lump 204 and water directing channel 205 in the impeller mount 200 to drive the impeller 300 in the impeller well 110 rotate (as shown in FIGS. 45 and 46). Then the shower water W flows into the water inlet orifice 2 of the handheld showerhead 1 (as shown in FIG. 49). Finally, the shower water W is jetted out of the water spray holes 5 of the cap 4 in the handheld showerhead 1 (as shown in FIGS. 49 and 50). Wherein, for each rotation of the impeller 300 driven by the running shower water W, the magnetic element 402 thereof simultaneously switches the magnetic reed switch 404 in the mounting cavity 106 of the showerhead stem 100 one time to induce a switching signal, which is relayed to the microprocessor 401 in the signal circuit device 400 for being processed to generate an accumulated data in certain preset interval for further transmitting to the LCD display circuit 402 for displaying related quantity of water flux thereon in accordance with following formula:

Quantity of water flux (Q)=Cross sectional area (A) times Flow velocity (V)

Thereby, a user of the showerhead can get real time statistical data of the total filtered water quantity flowed through filter cartridge 70 by simply means of looking at the LCD display circuit 402 via the transparent lid 500 on the front side 101 of the showerhead stem 100 (as shown in FIG. 48). Once the total filtered water quantity flowed through filter cartridge 70 reaches (or near reaches) a predetermined critical value for the rated service life time of the specific filter cartridge 70, the microprocessor 401 will send a alerting signal with current data of the total filtered water quantity to the LCD display circuit 402 for reminding the user to notice that it is the time to replace the filter cartridge 70 timely to assure good quality of the filter cartridge 70 and filtered water thereby. Therefore, the user can avoid the harmful consequences to the health caused by the unclean shower water W incurred by missing the replacement time and still continuously use the ineffective filter cartridge 70.

Comparing to the prior arts of "handheld showerhead with filter replacing pre-alarm device" or "handheld showerhead with filter replacing pre-display device" and conventional "handheld showerhead with built-in filter", the present invention has following advantages.

1. Solve the "Top-Heavy Awkwardness" Issue:

Please refer to FIG. 50. Because the showerhead stem 100 of the present invention is sandwiched between the conventional handheld showerhead 1 and filter cartridge cylinder 70 for conventional "handheld shower head with built-in filter", the top-heavy awkwardness issue happened in the prior art "handheld showerhead with filter replacing pre-alarm device", which is already published by R.O.C. patent published No. 201406337 and US patent published No. 20140042240, will not happen here. For prior art "handheld showerhead with filter replacing pre-alarm device", some components such as alerting pod 20 with related parts are inserted into the round docking socket 122 of the shower head 10, while some components such as signal circuit device 30, impeller 40, and internal lid 50 with related parts are inserted into the impeller well 18 of the shower head 10 so that the bulky showerhead 10 becomes heavier at the top than the slender handle of the filter cartridge cylinder 70 at the bottom. With balanced design in offsetting the light weight of the filter cartridge cylinder 70 for the showerhead stem 100 of the present invention, the shower user can easily manipulate it almost without possibility in falling out it to hit on the floor. Consequently, all the harmful effects, which are incurred by the top-heavy awkwardness issue happened in the prior art "handheld showerhead with filter replacing pre-alarm device", can be avoided.

Figure 51:
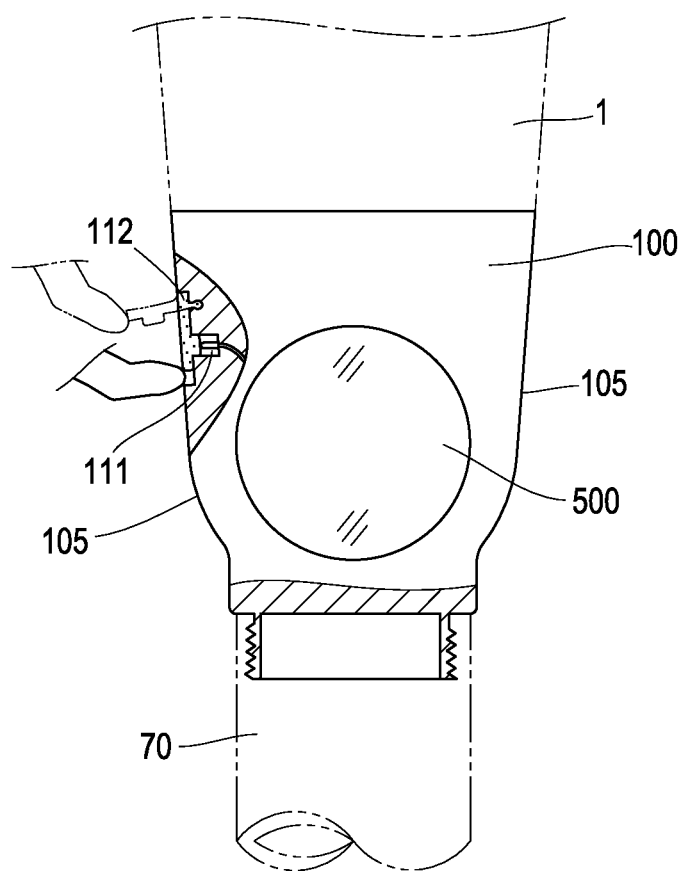
FIG. 51 is the first illustrative view showing a recharging operation for the first exemplary embodiment of the present invention.
Figure 52:
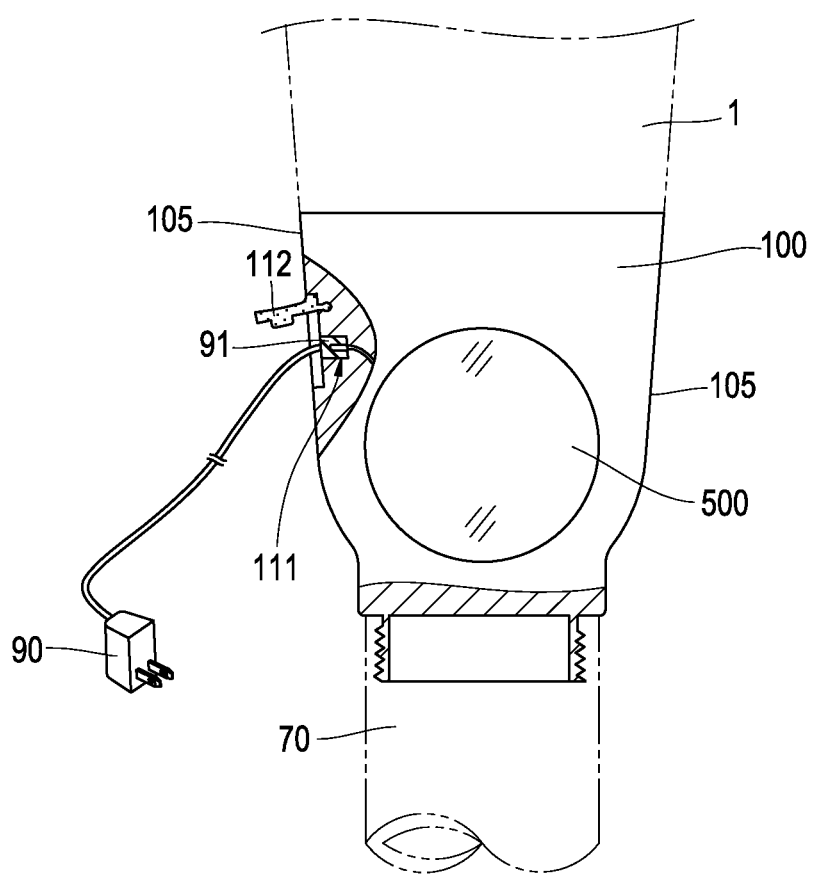
FIG. 52 is the second illustrative view showing a recharging operation for the first exemplary embodiment of the present invention.

2. Solve the "Quickened Aging Fatigue" Issue:

Please further refer to FIGS. 51 and 52. Because the showerhead stem 100 of the present invention is sandwiched between the conventional handheld showerhead 1 and filter cartridge cylinder 70 for conventional "handheld shower head with built-in filter", the quickened aging fatigue issue happened in the prior art "handheld showerhead with filter replacing pre-alarm device", which is already published by R.O.C. patent published No. 201406337 and US patent published No. 20140042240, will not happen here. For operation of recharging the rechargeable battery 33 in the prior art hand held shower head with filter replacing pre-alarm device, the alerting pod 20 must be taken off from the round docking socket 122 of the showerhead 10 and reinsert into the round docking socket 122 of the showerhead 10. By frequently reiterative such recharging operation, the snap latching jut 124 in the round docking socket 122 of the showerhead 10 will be hastened into damaged incurred by aging fatigue. With adapting recharging receptacle 111 design for the showerhead stem 100 of the present invention, the shower user can easily recharge old battery without need in detaching the existing conventional handheld showerhead 1 or filter cartridge cylinder 70 out off the showerhead stem 100 (as shown in FIGS. 51 and 52). Consequently, all the harmful effects, which are incurred by the quickened aging fatigue issue happened in the prior art "handheld showerhead with filter replacing pre-alarm device", can be avoided.

3. Solve the "Redundant Purchase Waste" Issue:

In the prior arts, if the user wants to replace showerhead set from the conventional "handheld shower head with built-in filter" into prior art "handheld showerhead with filter replacing pre-alarm device" for health consideration, he/she must discard the conventional "handheld shower head with built-in filter". With adapting sandwiched design for the showerhead stem 100 of the present invention, the shower user can only buy a "warning device dedicated for replacing aged-filter in a handheld showerhead" of the present invention to easily sandwich between the shower head and filter of the conventional "handheld shower head with built-in filter" aforesaid without discarding it.

Figure 54:
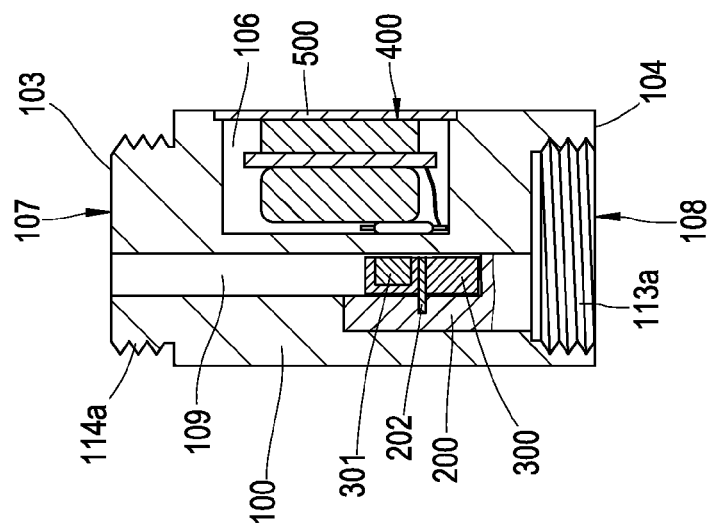
FIG. 54 is a cross sectional view taken against the section line of 54-54 from previous FIG. 53.
Figure 53:
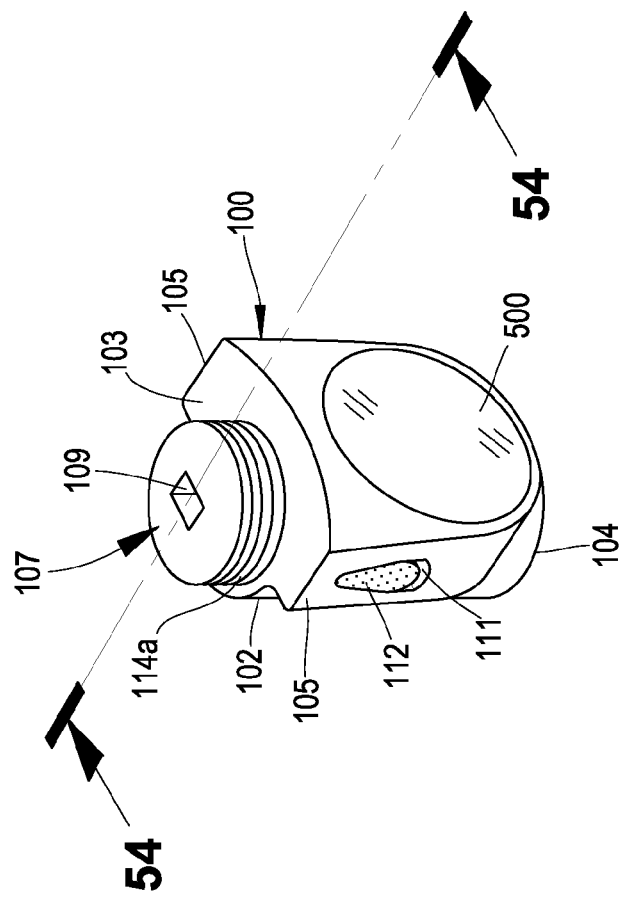
FIG. 53 is a perspective view showing modified upper adapting section and lower adapting section for a showerhead stem in the first exemplary embodiment of the present invention.

Please refer to FIGS. 53 and 54. The upper adapting section 107 of the top side 103 and the lower adapting section 108 of the bottom side 104 in the showerhead stem 100 for the first exemplary embodiment of the present invention can be changed into a tubular threaded male fitting 114a and a tubular threaded female fitting 113a (as shown in FIG. 54).

Figure 56:
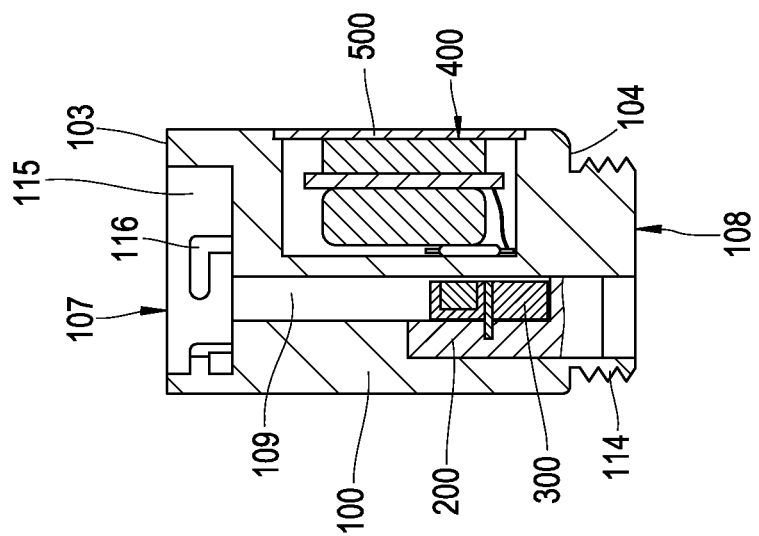
FIG. 56 is a cross sectional view taken against the section line of 56-56 from previous FIG. 55.
Figure 55:
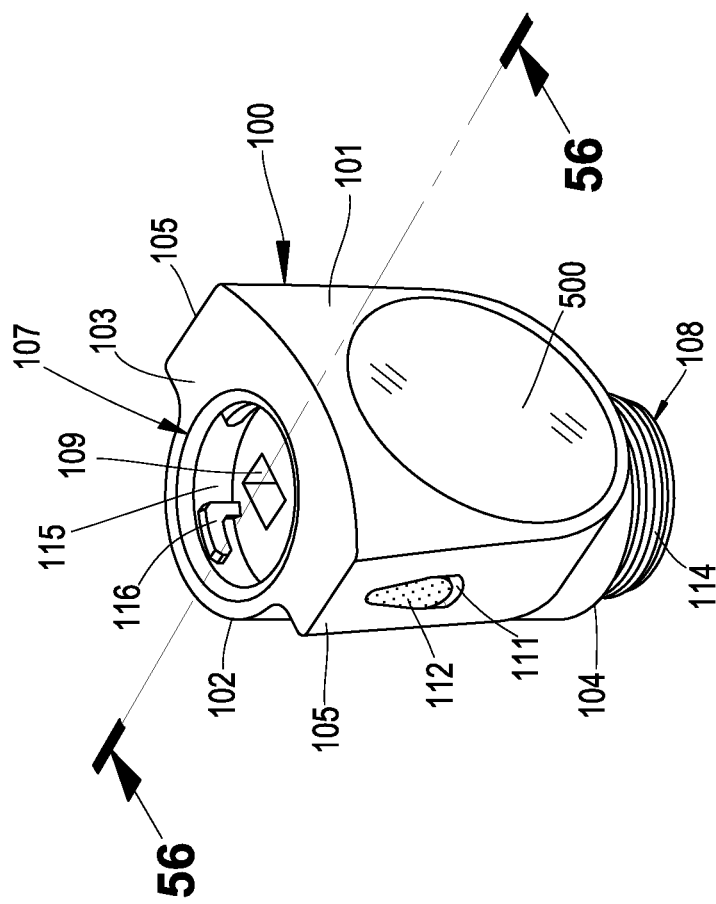
FIG. 55 is a perspective view showing adapted upper adapting section and lower adapting section for a showerhead stem in the first exemplary embodiment of the present invention.
Figure 58:
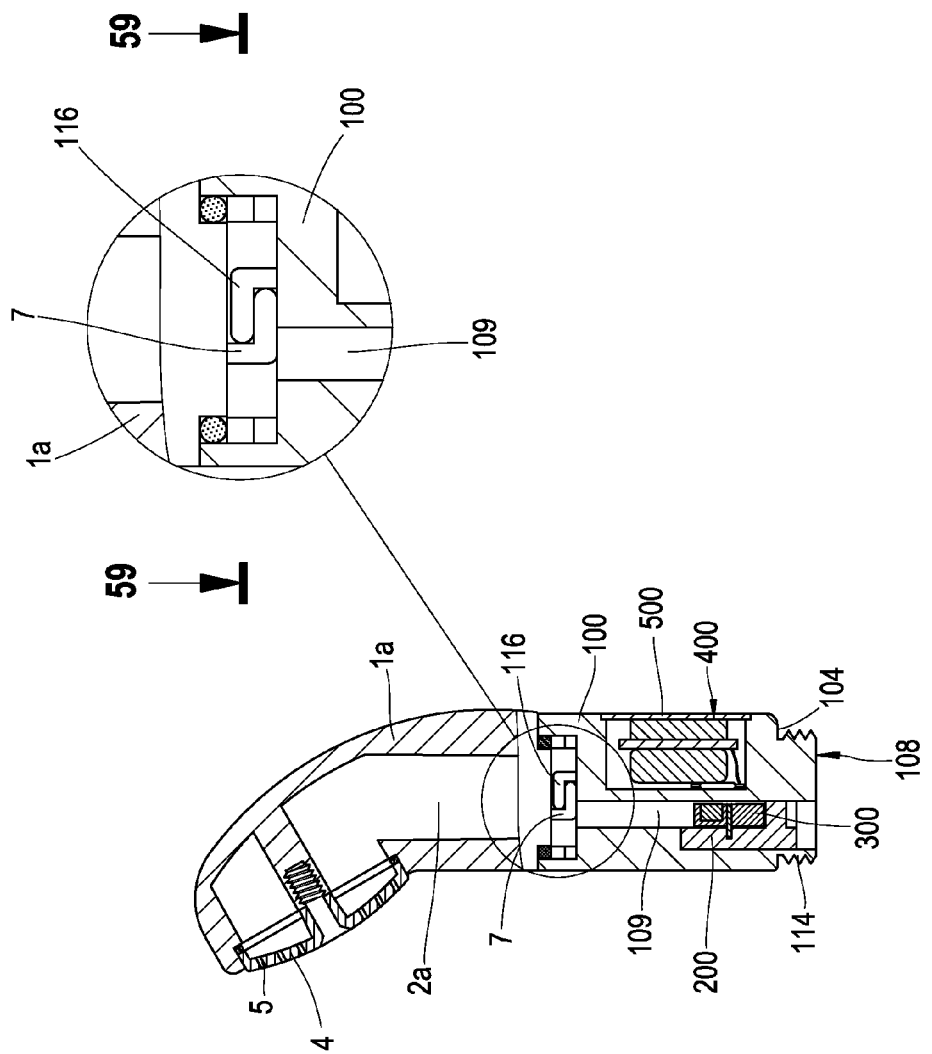
FIG. 58 is a cross sectional view showing the engaging assembly of the adapted upper adapting section and lower adapting section for a showerhead stem in the first exemplary embodiment of the present invention with the modified handheld showerhead for conventional "handheld shower head with built-in filter".
Figure 57:
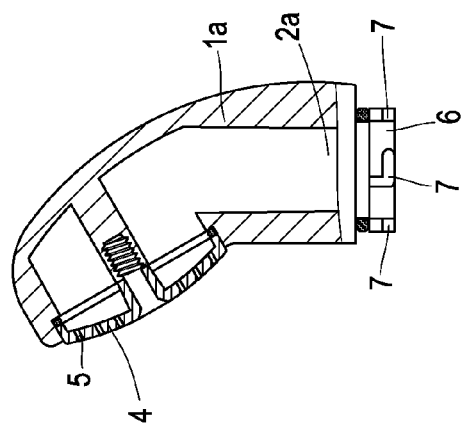
FIG. 57 is a cross sectional view showing a modified handheld showerhead for conventional "handheld shower head with built-in filter".
Figure 60:
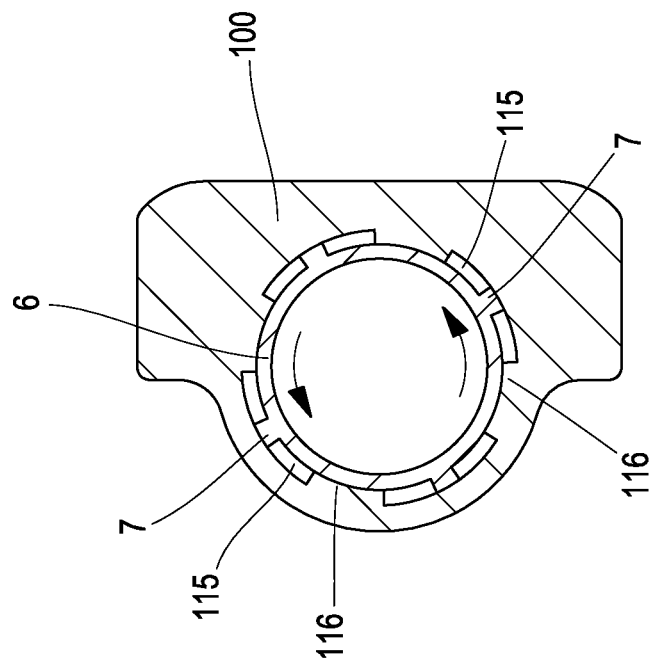
FIG. 60 is a cross sectional view taken against the section line of 59-59 from previous FIG. 58 showing the CCW-screwing disengagement for the adapted showerhead stem in the first exemplary embodiment of the present invention and the modified handheld showerhead for conventional "handheld shower head with built-in filter".
Figure 59:
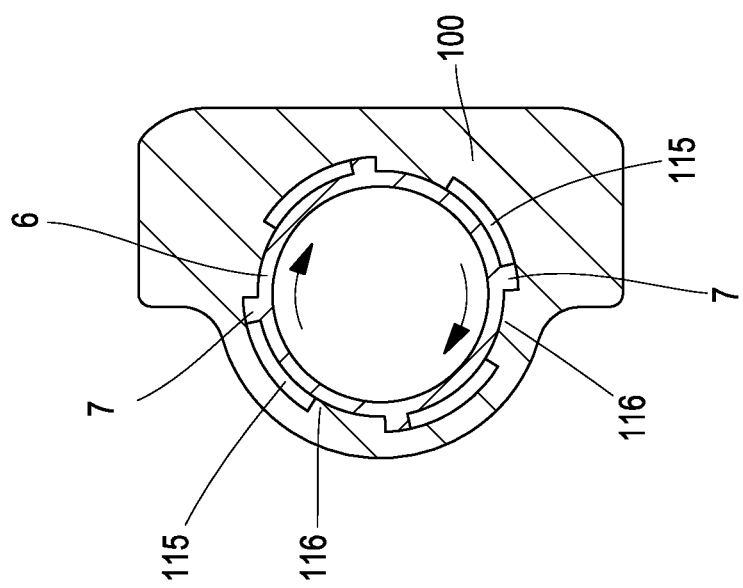
FIG. 59 is a cross sectional view taken against the section line of 59-59 from previous FIG. 58 showing the CW-screwing engagement for the adapted showerhead stem in the first exemplary embodiment of the present invention and the modified handheld showerhead for conventional "handheld shower head with built-in filter".
Figure 61:
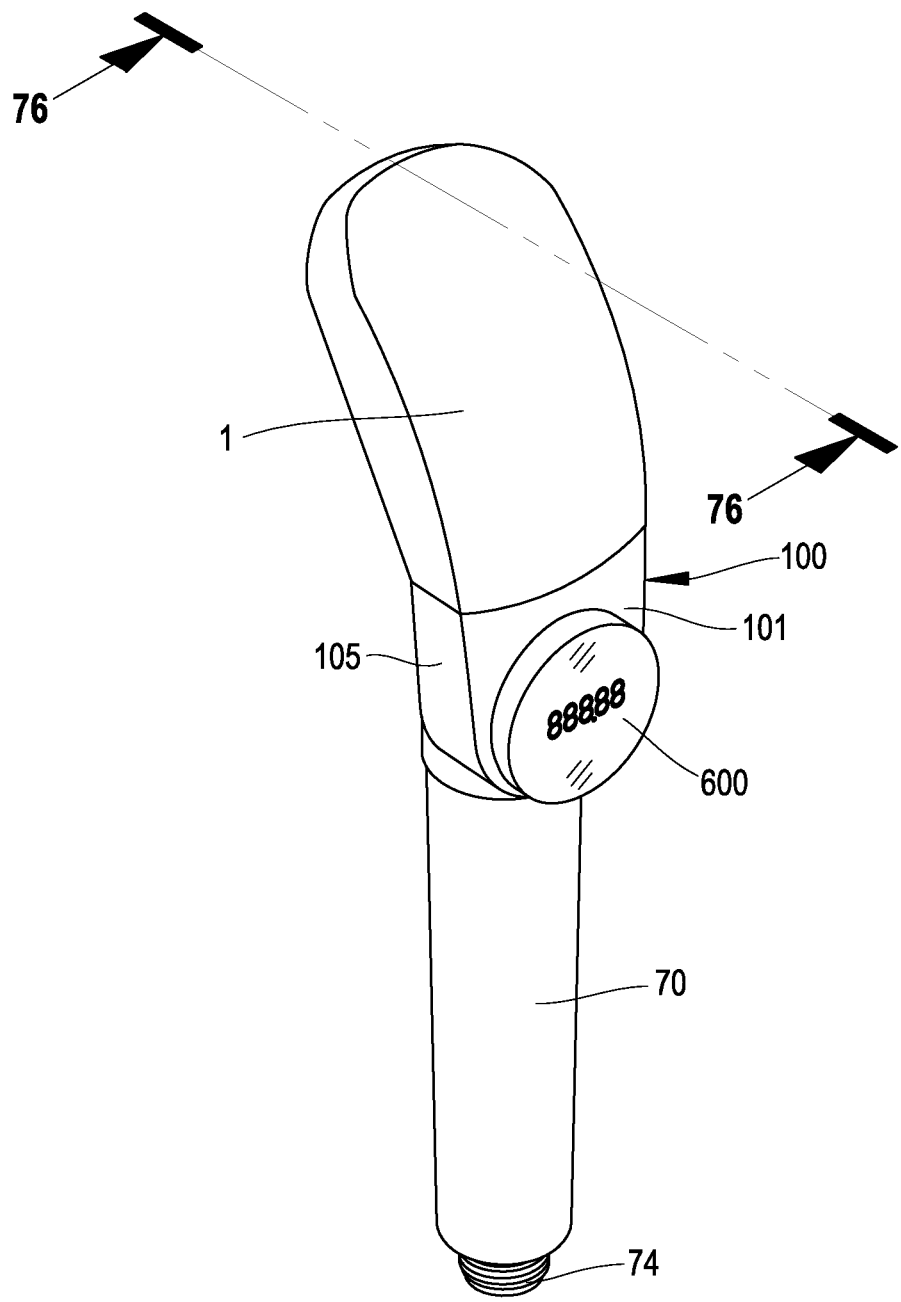
FIG. 61 is an assembled perspective view showing the installation for the second exemplary embodiment of the present invention into a conventional "handheld shower head with built-in filter".

Please refer to FIGS. 55 to 60. The upper adapting section 107 of the top side 103 in the showerhead stem 100 for the first exemplary embodiment of the present invention can be adapted into a round recess socket 115 with an inverted L-shaped latching jut 116 (as shown in FIGS. 55 and 56) for matching with the corresponding L-shaped latching lump 7 in the cylindrical peripheral 6 on the water inlet orifice 2a of the modified handheld showerhead 1a (as shown in FIG. 57). The FIG. 59 shows the CW-screwing engagement for the adapted showerhead stem 100 in the first exemplary embodiment of the present invention and the modified handheld showerhead 1a for conventional "handheld shower head with built-in filter". The FIG. 60 shows the CCW-screwing disengagement for the adapted showerhead stem 100 in the first exemplary embodiment of the present invention and the modified handheld showerhead 1a for conventional "handheld shower head with built-in filter".

Figure 65:
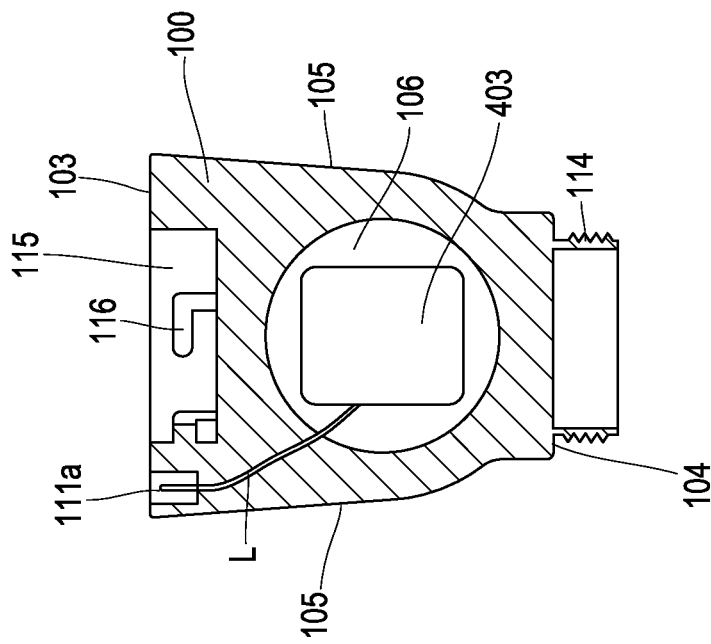
FIG. 65 is a cross sectional view taken against the section line of 65-65 from previous FIG. 63.
Figure 64:
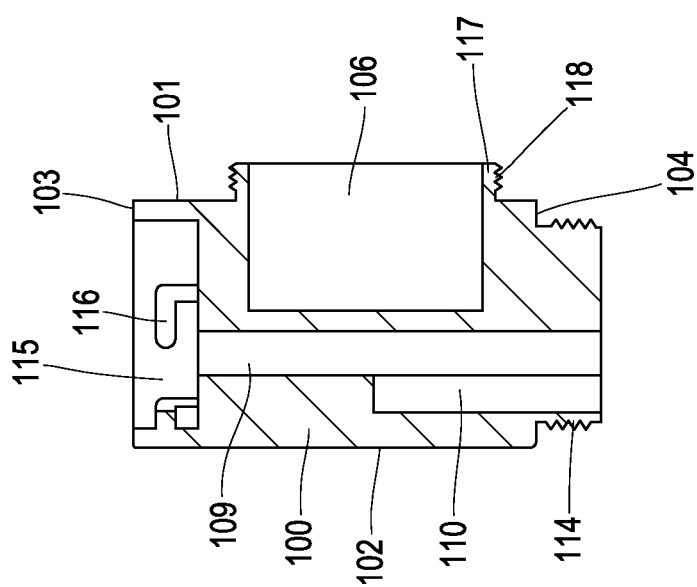
FIG. 64 is a cross sectional view taken against the section line of 64-64 from previous FIG. 63.
Figure 66:
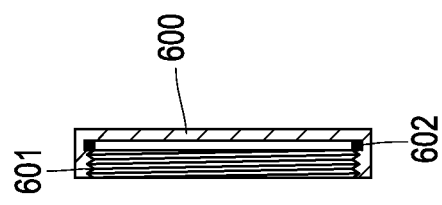
FIG. 66 is a cross sectional view taken against the section line of 66-66 from previous FIG. 62.
Figure 77:
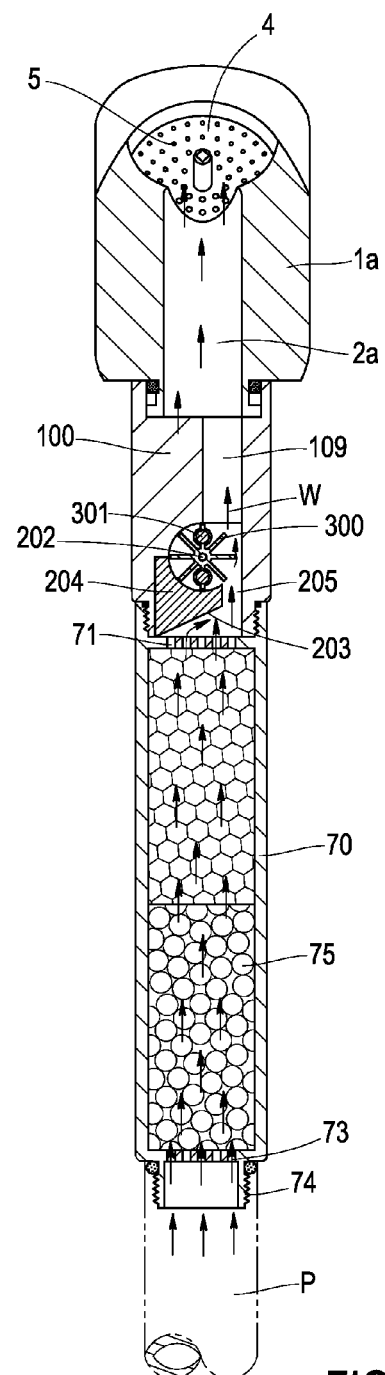
FIG. 77 is a cross sectional view taken against the section line of 77-77 from previous FIG. 76.

Please refer to FIGS. 61 to 66 and FIGS. 72 to 75. The "warning device dedicated for replacing aged-filter in a handheld shower head" for the second exemplary embodiment of the present invention comprises a showerhead stem 100, an impeller mount 200, an impeller 300, a signal circuit device 400 and a transparent cover 600 in addition to modified conventional handheld showerhead 1a containing a detachable filter cartridge cylinder 70 aforesaid, wherein said showerhead stem 100, which is an integral plastic hollow casing body with a front side 101, a back side 102, a top side 103, a bottom side 104 and two flanks 105 by unitary piece extrusion mold, includes a mounting cavity 106, a tubular threaded male fitting 114, a round recess socket 115, an inverted L-shaped latching jut 116, a circular flange 117, a water channel 109, an impeller well 110 and a recharging receptacle 111a, wherein the mounting cavity 106 is inwardly created in the front side 101 such that the tubular threaded male fitting 114 is outwardly created on the bottom side 104 for screwing engagement with corresponding female tubular threads 72 on the water outlet 71 of the filter cartridge cylinder 70, the round recess socket 115 and inverted L-shaped latching jut 116 are inwardly created in the top side 103 (as shown in FIGS. 63 and 64) such that the inverted L-shaped latching jut 116 is served for snap engagement with or detachment off the corresponding L-shaped latching lump 7 in the cylindrical peripheral 6 on the water inlet orifice 2a of the modified handheld showerhead 1a (as shown in FIGS. 72 to 75), the circular flange 117 with peripheral rim male threads 118 is outwardly formed at the mounting cavity 106, the water channel 109 is internally created between the round recess socket 115 in the top side 103 and the tubular threaded male fitting 114 on the bottom side 104 (as shown in FIG. 64), the impeller well 110 is inwardly created at the intersection of the bottom side 104 and the water channel 109 such that it is communicable between the water channel 109 and impeller well 110 (as shown in FIG. 64), and the recharging receptacle 111a is inwardly created in the top side 103 in a position near the round recess socket 115 (as shown in FIGS. 62, 63 and 65); said impeller mount 200, which is a slab with a front side 201 and a bottom side 203 for being inserted into the impeller well 110 of the showerhead stem 100, includes a vertical rotation axle 202 disposed on the front side 201, and a water directing lump 204 disposed on the front side 201 near the bottom side 203 such that the width d2 of the water directing lump 204 is less than the width d1 of the front side 201 (as shown in FIGS. 31 and 37) so that the a water directing channel 205 is created between the water directing lump 204 and water channel 109 after the impeller mount 200 having inserted into the impeller well 110 of the showerhead stem 100 (as shown in FIG. 77); said impeller 300, which is windmill-shaped wheel with multiple radial vanes, includes a magnetic element 301 disposed on one vane and a central axial bushing 302 run through (as shown in FIG. 62) for coupling with corresponding rotation axle 202 on the front side 201 of the impeller mount 200 to let the impeller 300 rotate freely (as shown in FIG. 77); said signal circuit device 400, which is contained in the mounting cavity 106 of the showerhead stem 100, includes a microprocessor 401, a LCD display circuit 402 electrically connected to the microprocessor 401, a rechargeable battery 403 electrically connected to the microprocessor 401, and a magnetic reed switch 404 securely inset on the internal bottom side of the mounting cavity 106 in the showerhead stem 100 such that the rechargeable battery 403 is electrically connected with the recharging receptacle 111a of the showerhead stem 100 via a pair of electric wires L (as shown in FIG. 65); and said transparent cover 600, which is made of plastic material into planar disk, has a protrusion with hoop female threads 601 formed at the backside thereof (as shown in FIG. 66) such that the protrusion with hoop female threads 601 is screwing engaged with the corresponding rim male threads 118 of the circular flange 117 in the mounting cavity 106 of the showerhead stem 100, and a rubber sealing ring 602 sleeved over the hoop female threads 601 to avoid the shower water W from seeping into the mounting cavity 106 in the showerhead stem 100 so that all components of the signal circuit device 400 in the mounting cavity 106 are free from short-circuit incurred by seeping shower water W.

Please refer to FIGS. 67 to 71. The assembly procedure for the second exemplary embodiment of the present invention is stepwise performed as below.

Figure 67:
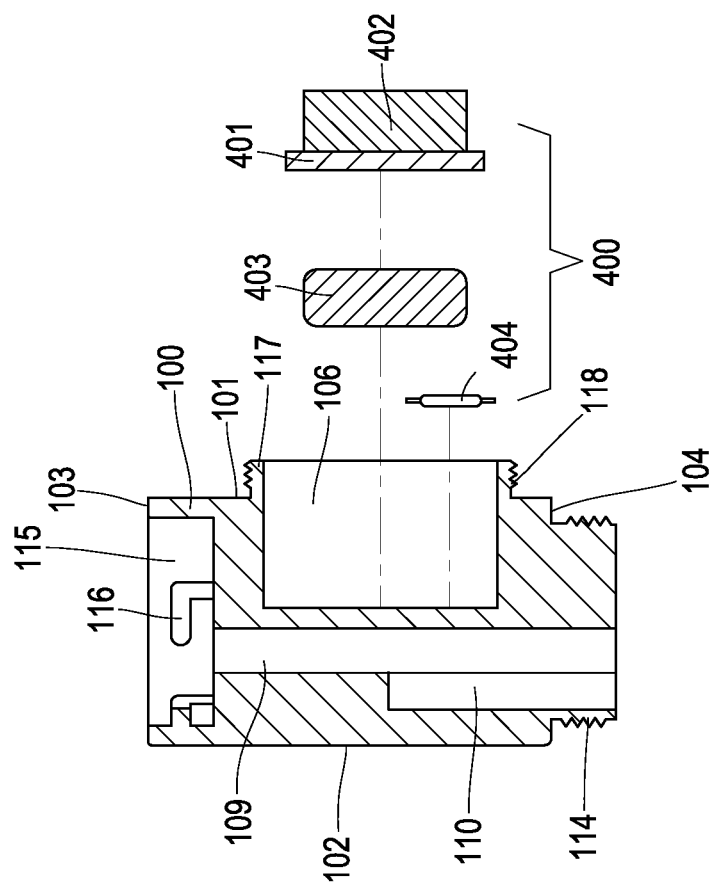
FIG. 67 is the first cross sectional view showing assembly for the second exemplary embodiment of the present invention.
Figure 69:
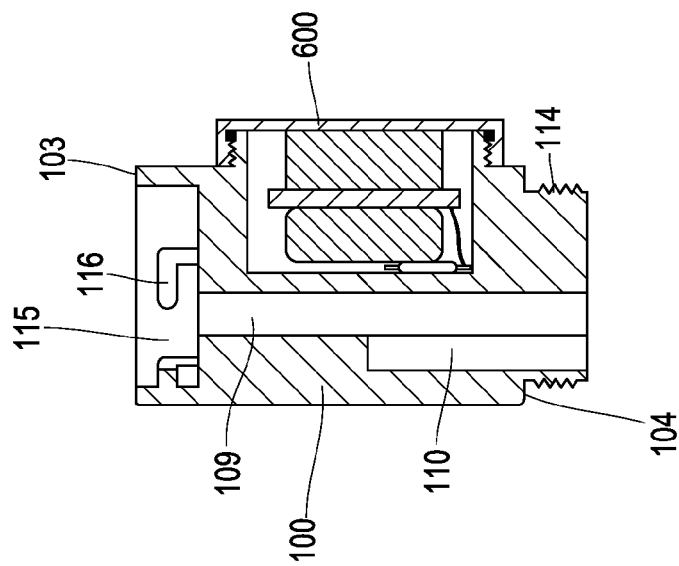
FIG. 69 is the third cross sectional view showing assembly for the second exemplary embodiment of the present invention.
Figure 68:
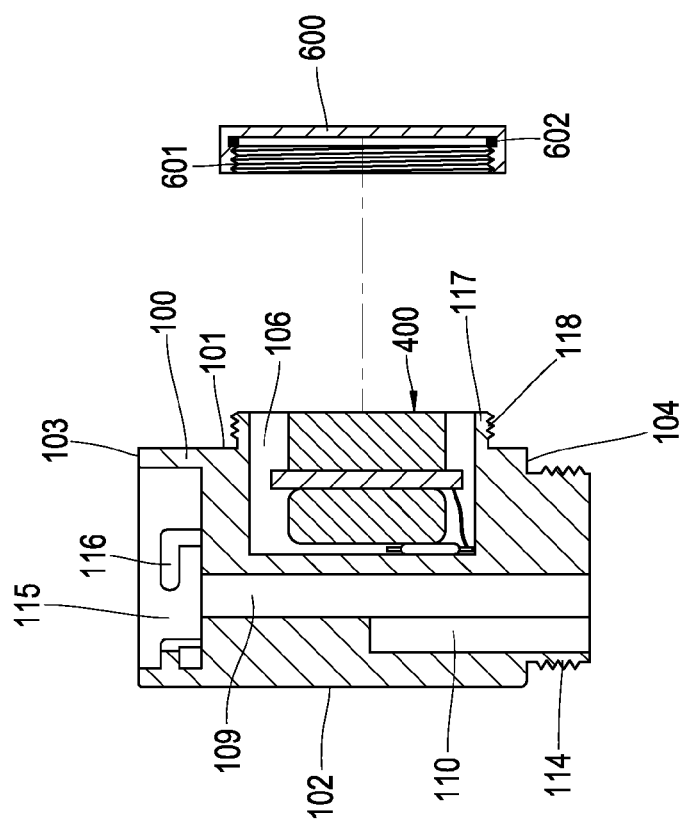
FIG. 68 is the second cross sectional view showing assembly for the second exemplary embodiment of the present invention.
Figure 71:
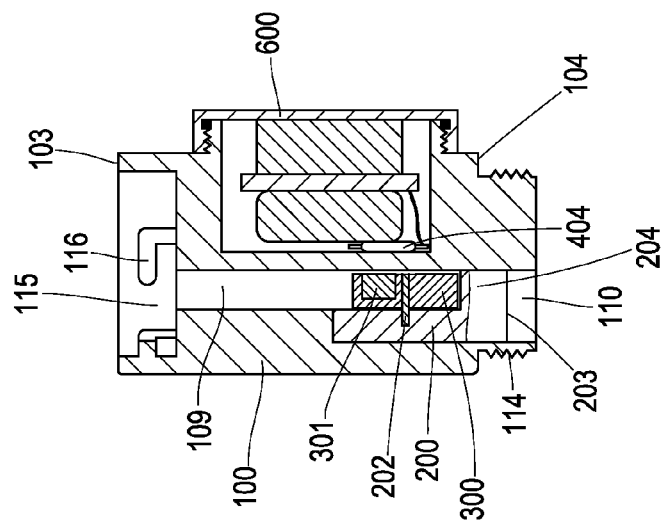
FIG. 71 is the fifth cross sectional view showing assembly for the second exemplary embodiment of the present invention.
Figure 70:
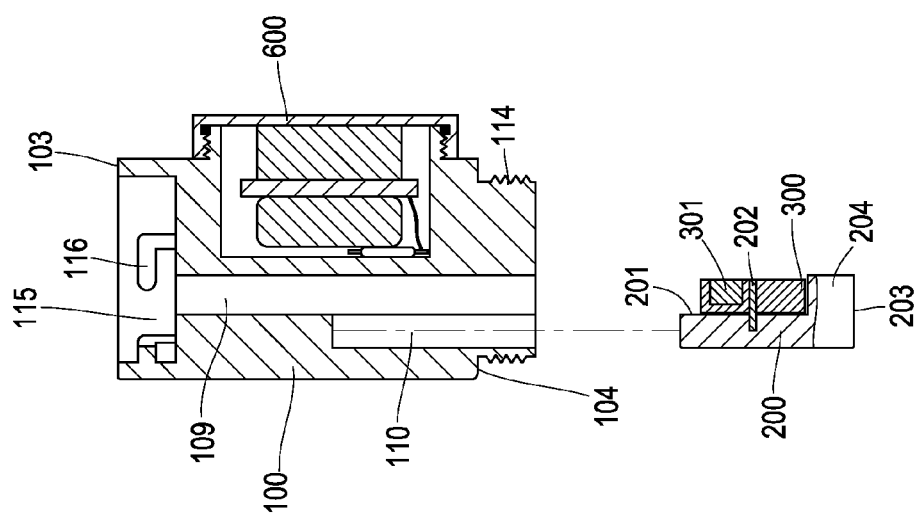
FIG. 70 is the fourth cross sectional view showing assembly for the second exemplary embodiment of the present invention.
Figure 73:
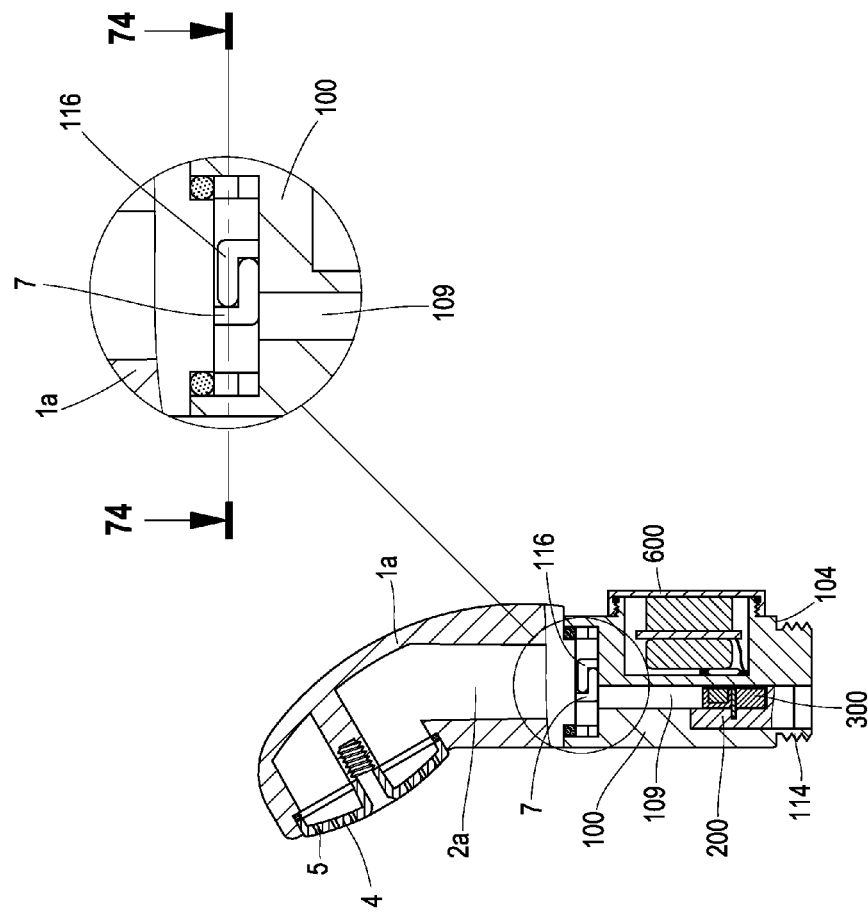
FIG. 73 is an assembled cross sectional view showing the installation for the second exemplary embodiment of the present invention into a conventional "handheld shower head with built-in filter" with a modified handheld showerhead.

A. Firstly, fix the magnetic reed switch 404 of the signal circuit device 400 on the mounting cavity 106 of the showerhead stem 100 by suitable adhesive material, and orderly put the rechargeable battery 403, microprocessor 401 and LCD display circuit 402 into the mounting cavity 106 of the showerhead stem 100 (as shown in FIGS. 67 and 68), then screw the transparent cover 600 to engage with corresponding rim male threads 118 of the circular flange 117 on the mounting cavity 106 of the showerhead stem 100 (as shown in FIG. 69) to avoid all components of the signal circuit device 400 in the mounting cavity 106 from short-circuit incurred by seeping shower water W;

B. Subsequently, sleeve the central axial bushing 302 of the impeller 300 over the rotation axle 202 of the impeller mount 200, and try to rotate the impeller 300 for testing the impeller 300 is able to freely rotate (as shown in FIG. 70); and C. Finally, insert the integral unit of impeller mount 200 and impeller 300 into the impeller well 110 in the bottom side 104 of the showerhead stem 100 by facing the bottom side 203 outwardly (as shown in FIG. 70) to finish the assembly procedure for the second exemplary embodiment of the present invention (as shown in FIG. 71).

Figure 76:
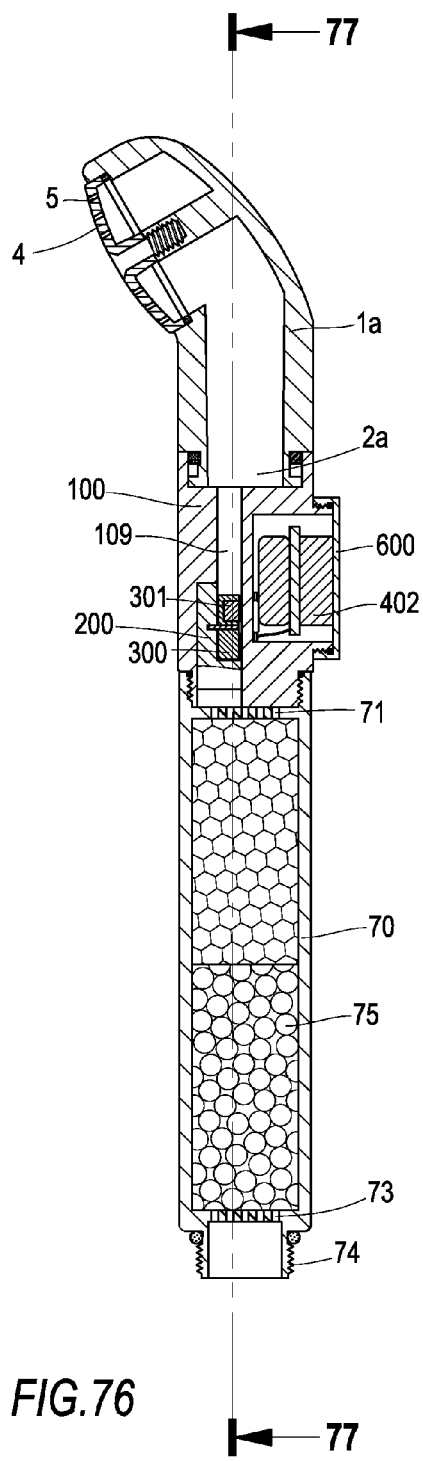
FIG. 76 is a cross sectional view taken against the section line of 76-76 from previous FIG. 61.

Please refer to the installation for the second exemplary embodiment of the present invention into a conventional "handheld shower head with built-in filter", which is shown in FIGS. 72 to 76. With inverted L-shaped latching jut 116 in the round recess socket 115 of the top side 103, the showerhead stem 100 can be easily snap engagement with or detachment off the corresponding L-shaped latching lump 7 in the cylindrical peripheral 6 on the water inlet orifice 2a of the modified handheld showerhead 1a (as shown in FIGS. 72 to 75), while with tubular threaded male fitting 114 of the bottom side 104, the showerhead stem 100 can be easily screwing engagement with or detachment off corresponding female tubular threads 72 in the water outlet orifice 71 of the filter cartridge cylinder 70 (as shown in FIG. 76).

Please refer to FIGS. 76 and 77. The operation for the second exemplary embodiment of the present invention into a conventional "handheld shower head with built-in filter" is described as below.

Once the shower water W from the water pipe P flows through the water outlet 71 of the filter cartridge 70, it orderly passes through the water directing lump 204 and water directing channel 205 in the impeller mount 200 to drive the impeller 300 in the impeller well 110 rotate. Then the shower water W flows into the water inlet orifice 2a of the handheld showerhead 1a. Finally, the shower water W is jetted out of the water spray holes 5 of the cap 4 in the handheld showerhead 1 (as shown in FIG. 77). Wherein, for each rotation of the impeller 300 driven by the running shower water W, the magnetic element 402 thereof simultaneously switches the magnetic reed switch 404 in the mounting cavity 106 of the showerhead stem 100 one time to induce a switching signal, which is relayed to the microprocessor 401 in the signal circuit device 400 for being processed to generate an accumulated data in certain preset interval for further transmitting to the LCD display circuit 402 for displaying related quantity of water flux thereon in accordance with following formula:

Quantity of water flux (Q)=Cross sectional area (A) times Flow velocity (V)

Thereby, a user of the showerhead can get real time statistical data of the total filtered water quantity flowed through filter cartridge 70 by simply means of looking at the LCD display circuit 402 via the transparent cover 600 on the front side 101 of the showerhead stem 100 (as shown in FIG. 76). Once the total filtered water quantity flowed through filter cartridge 70 reaches (or near reaches) a predetermined critical value for the rated service life time of the specific filter cartridge 70, the microprocessor 401 will send a alerting signal with current data of the total filtered water quantity to the LCD display circuit 402 for reminding the user to notice that it is the time to replace the filter cartridge 70 timely to assure good quality of the filter cartridge 70 and filtered water thereby. Therefore, the user can avoid the harmful consequences to the health caused by the unclean shower water W incurred by missing the replacement time and still continuously use the ineffective filter cartridge 70.

Figure 72:
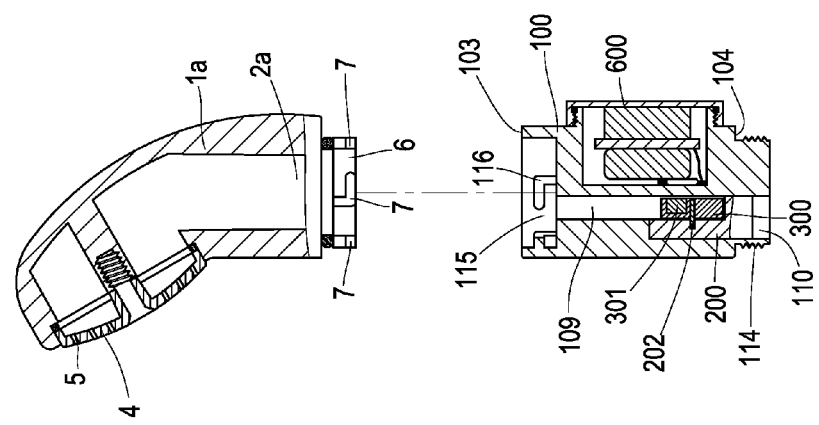
FIG. 72 is an exploded cross sectional view showing the installation for the second exemplary embodiment of the present invention into a conventional "handheld shower head with built-in filter" with a modified handheld showerhead.
Figure 75:
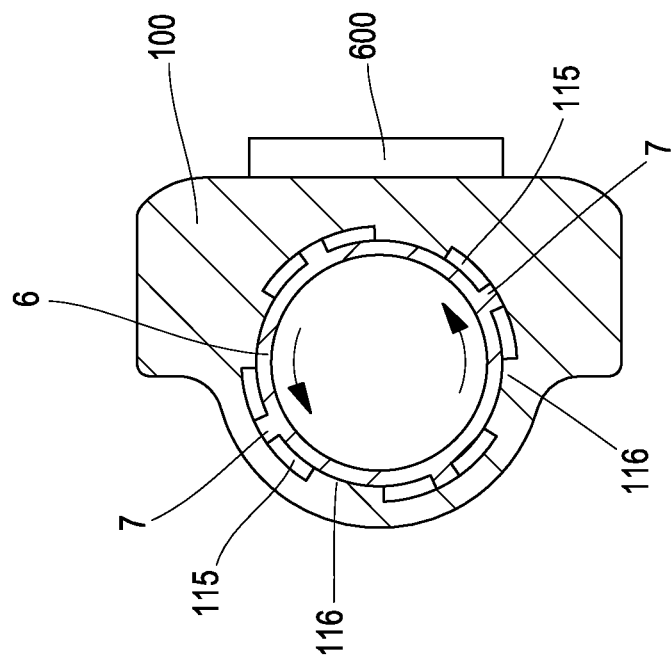
FIG. 75 is an operational cross sectional view showing the installation for the second exemplary embodiment of the present invention into a conventional "handheld shower head with built-in filter" with a modified handheld showerhead.
Figure 74:
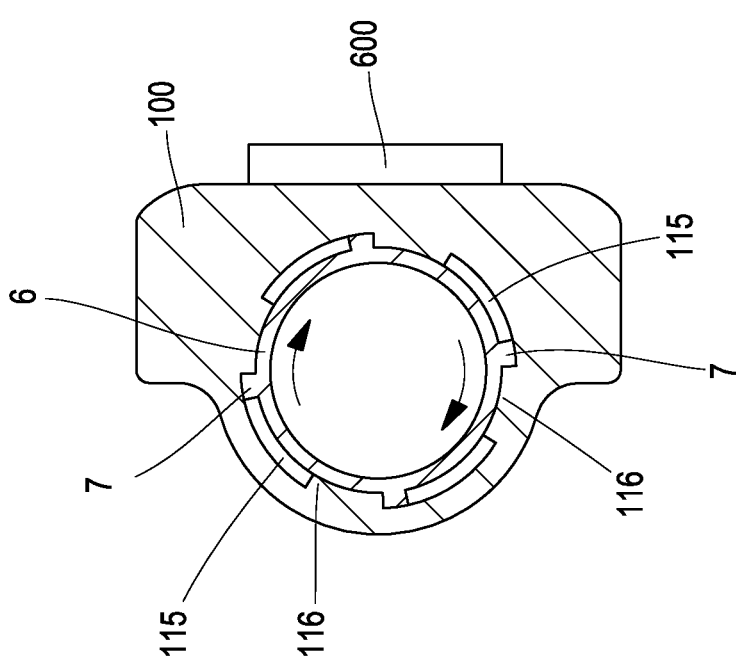
FIG. 74 is a cross sectional view taken against the section line of 74-74 from previous FIG. 73.
Figure 79:
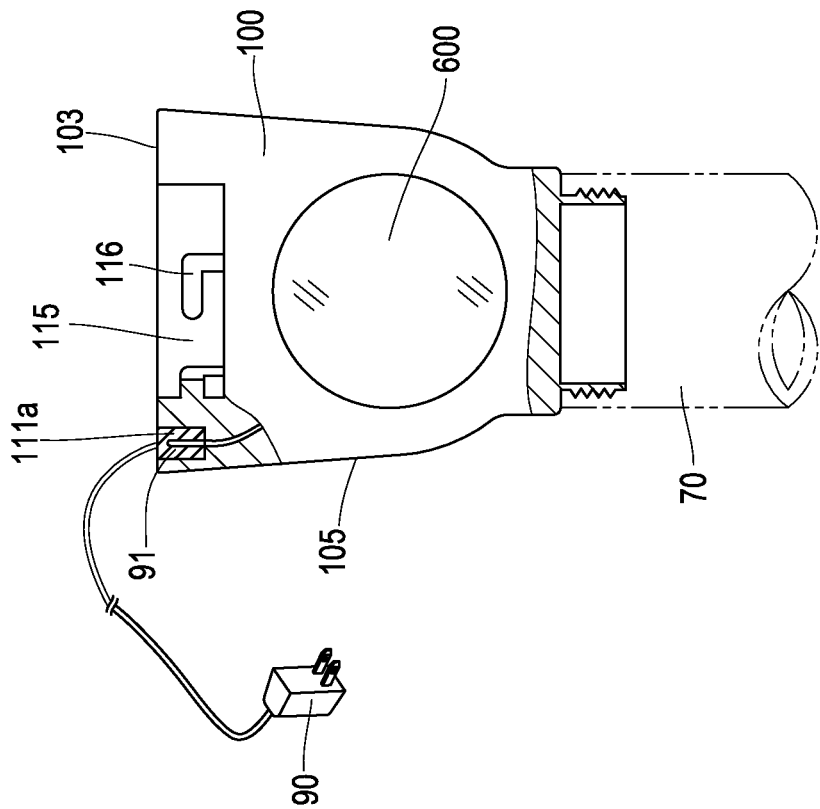
FIG. 79 is the second illustrative view showing a recharging operation for the second exemplary embodiment of the present invention.
Figure 78:
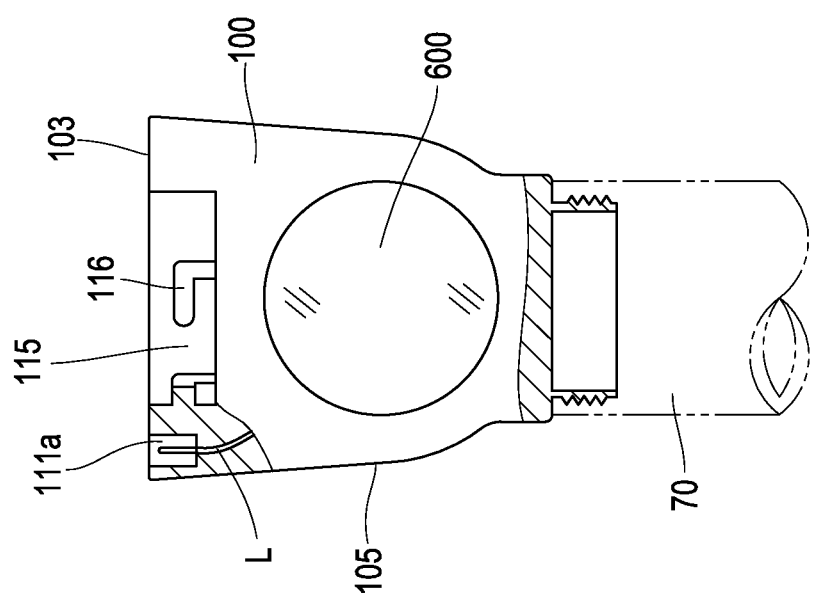
FIG. 78 is the first illustrative view showing a recharging operation for the second exemplary embodiment of the present invention.

Please refer to FIGS. 72, 78 and 79. In the second exemplary embodiment of the present invention, when the rechargeable battery 403 in the signal circuit device 400 is necessary to recharge due to running out of the battery energy, after disengaging the modified handheld showerhead 1*a* off the showerhead stem 100 (as shown in FIG. 72), the receptacle adapter 91 of the battery charging plug 90 can directly inset into the recharging receptacle 111*a* on the top side 103 of the showerhead stem 100 (as shown in FIGS. 78 and 79) to finish the recharging operation.

Figure 81:
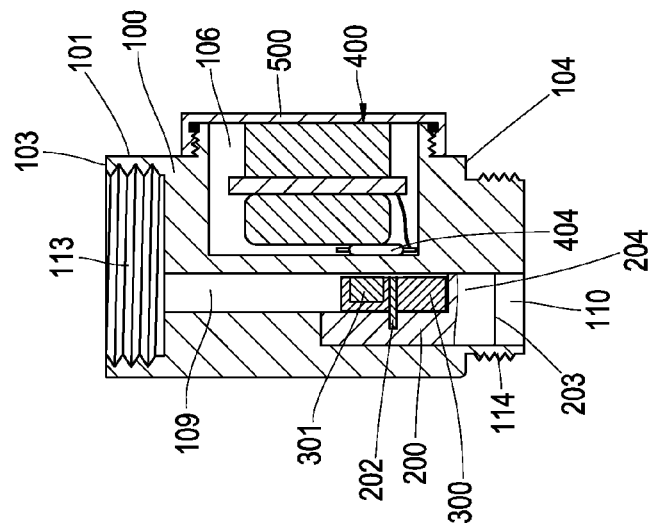
FIG. 81 is a cross sectional view taken against the section line of 81-81 from previous FIG. 80.
Figure 80:
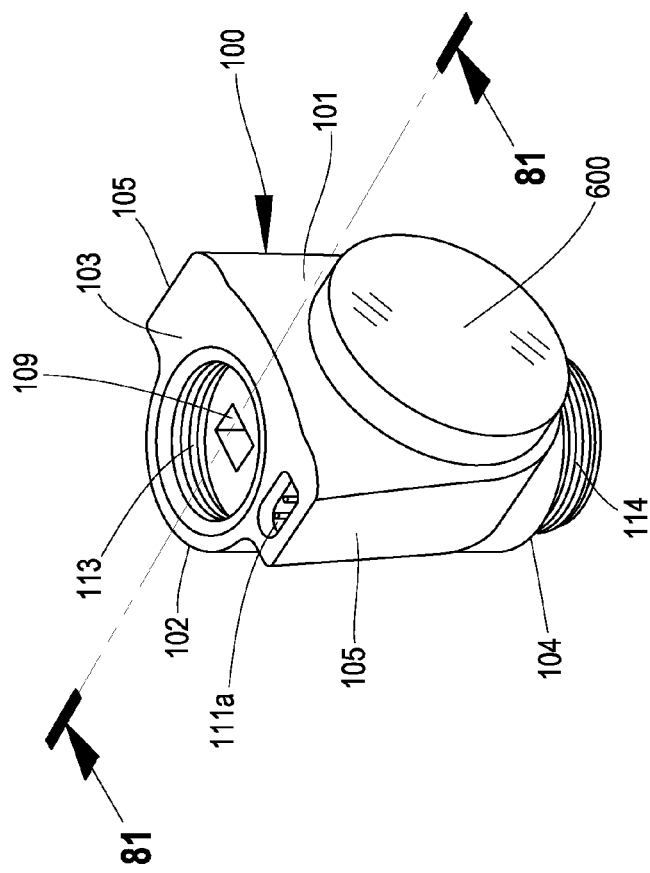
FIG. 80 is a perspective view showing modified upper adapting section and lower adapting section for a showerhead stem in the second exemplary embodiment of the present invention.
Figure 83:
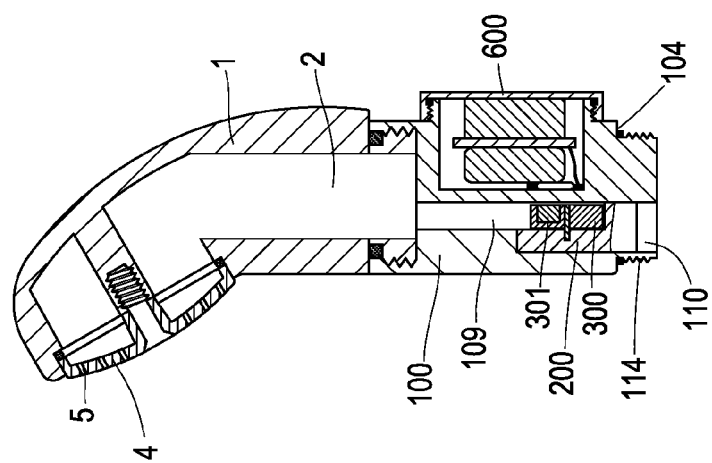
FIG. 83 is the second operational cross sectional view showing the assembly of the modified upper adapting section and lower adapting section for a showerhead stem in the second exemplary embodiment of the present invention with the modified handheld showerhead for conventional "handheld shower head with built-in filter".
Figure 82:
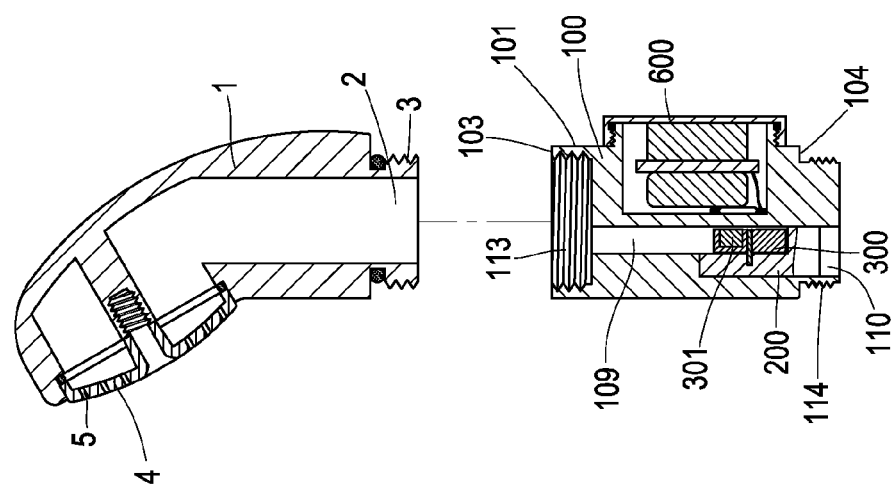
FIG. 82 is the first operational cross sectional view showing the assembly of the modified upper adapting section and lower adapting section for a showerhead stem in the second exemplary embodiment of the present invention with the modified handheld showerhead for conventional "handheld shower head with built-in filter".
Figure 85:
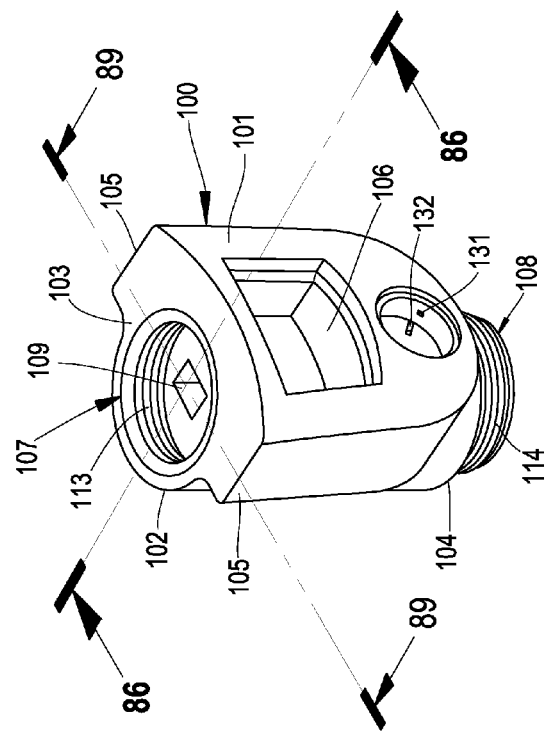
FIG. 85 is a perspective illustrative view for a showerhead stem in the third exemplary embodiment of the present invention.

Please refer to FIGS. 80 to 83. The upper adapting section 107 of the top side 103 in the showerhead stem 100 for the second exemplary embodiment of the present invention can be adapted into a tubular threaded female fitting 113 (as shown in FIGS. 80 and 81) for matching with the corresponding male tubular threads 3 in the water inlet orifice 2 of the handheld showerhead 1 (as shown in FIGS. 82 and 83).

Figure 3:
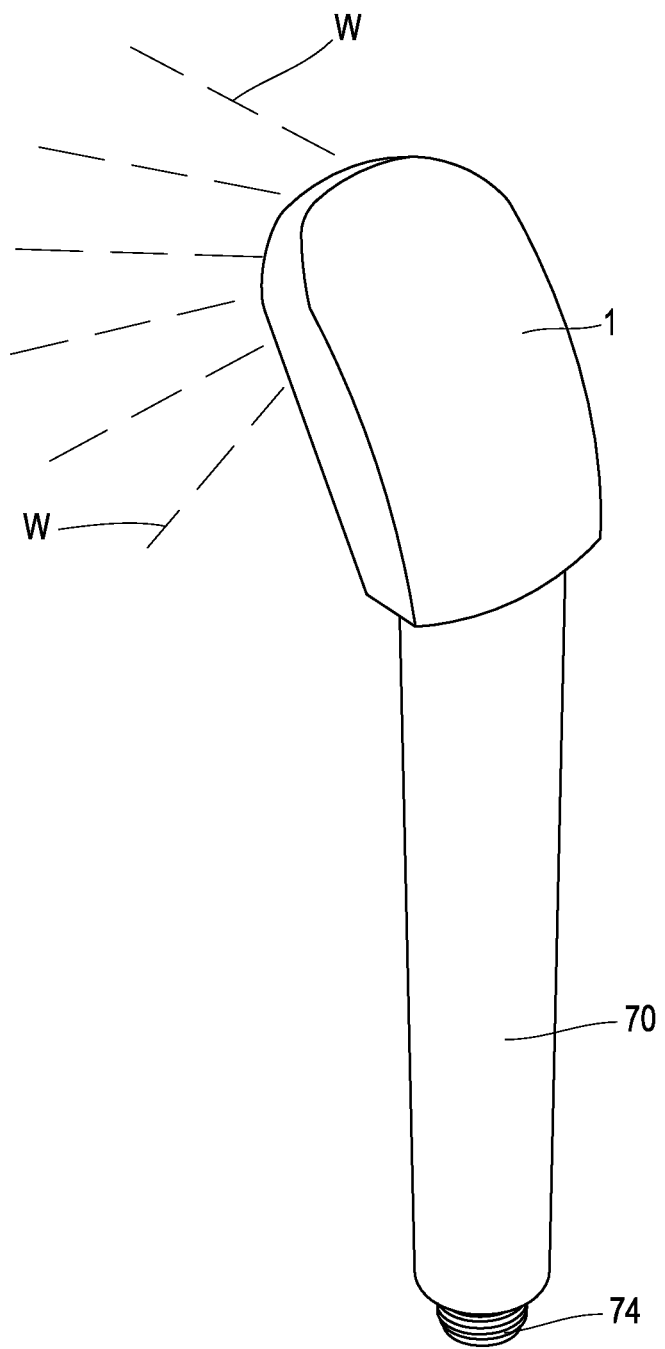
FIG. 3 is a perspective schematic view for conventional "handheld shower head with built-in filter".
Figure 4:
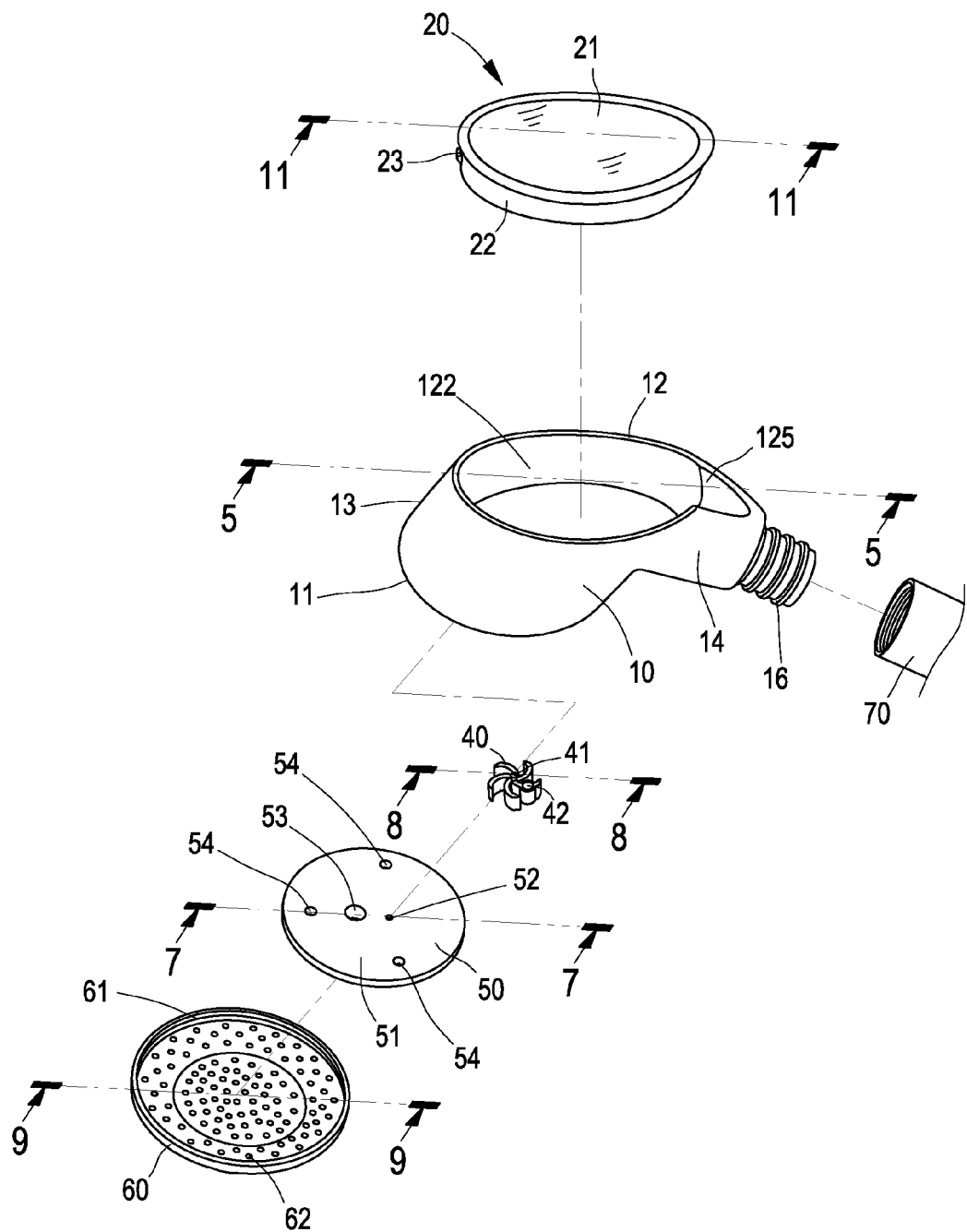
FIG. 4 is an exploded perspective view for conventional "handheld shower head with filter replacing pre-display device".
Figure 5:
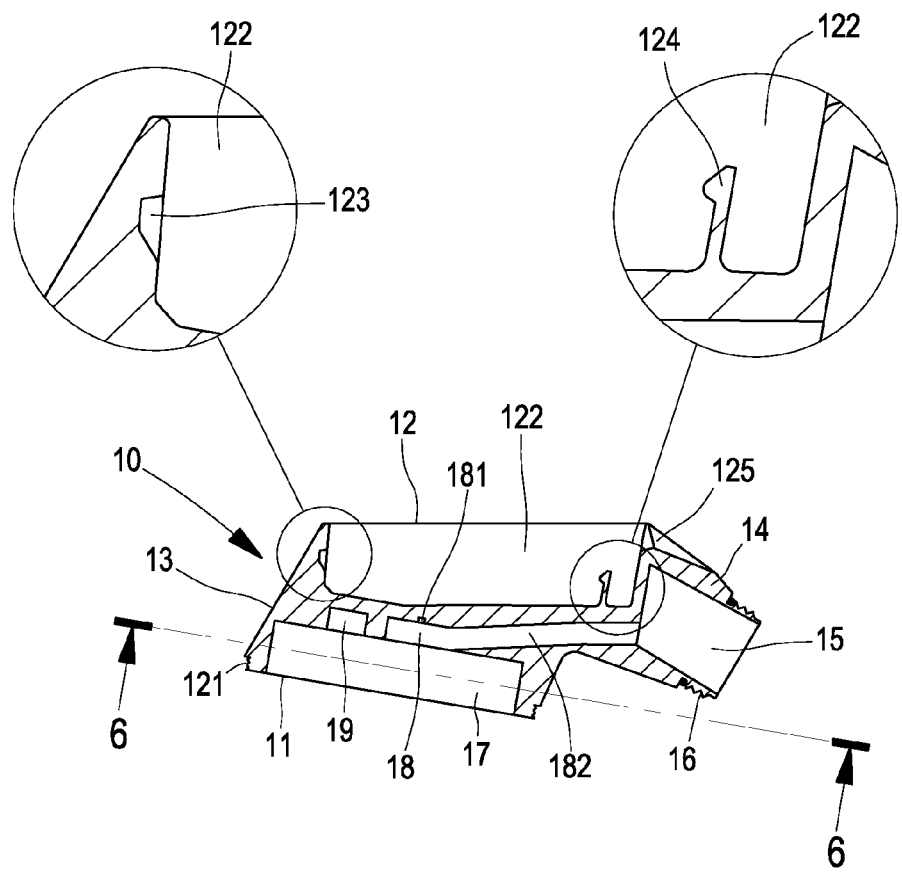
FIG. 5 is a cross sectional view taken against the section line of 5-5 from previous FIG. 4.
Figure 6:
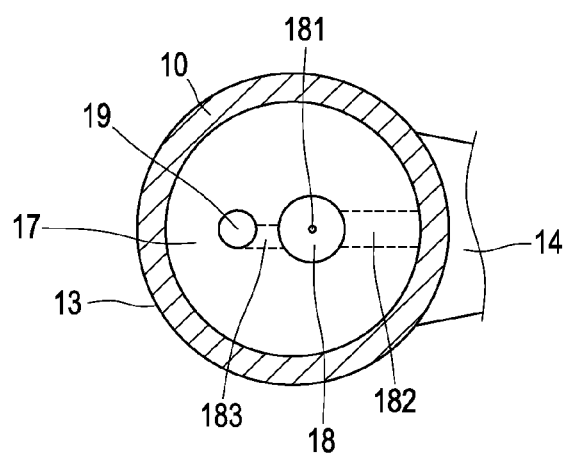
FIG. 6 is a cross sectional view taken against the section line of 6-6 from previous FIG. 5.
Figure 7:
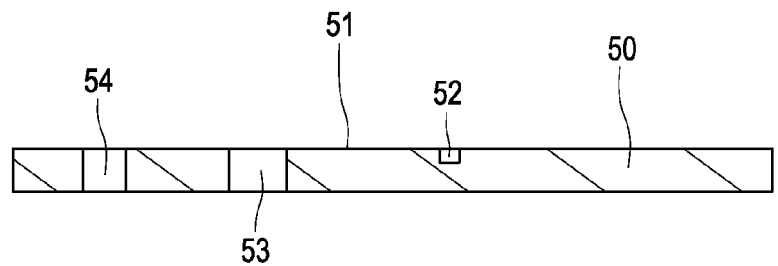
FIG. 7 is a cross sectional view taken against the section line of 7-7 from previous FIG. 4.
Figure 8:
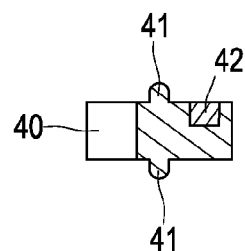
FIG. 8 is a cross sectional view taken against the section line of 8-8 from previous FIG. 4.
Figure 9:
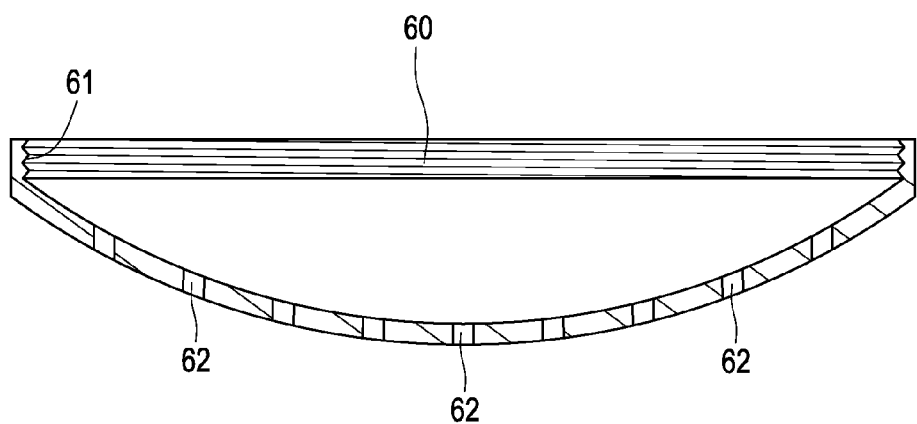
FIG. 9 is a cross sectional view taken against the section line of 9-9 from previous FIG. 4.
Figure 10:
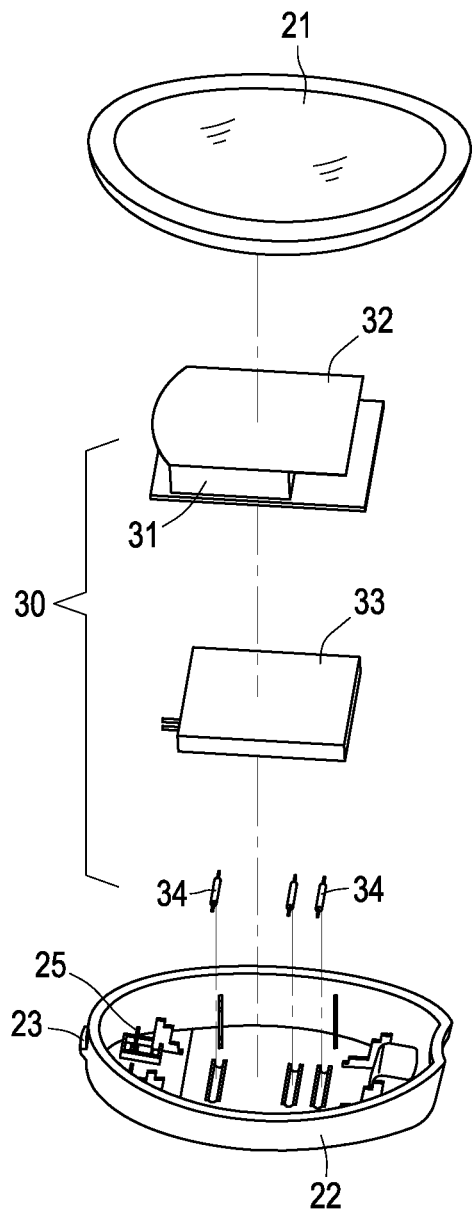
FIG. 10 is an exploded perspective view showing an alerting pod for conventional "handheld shower head with filter replacing pre-display device".
Figure 11:
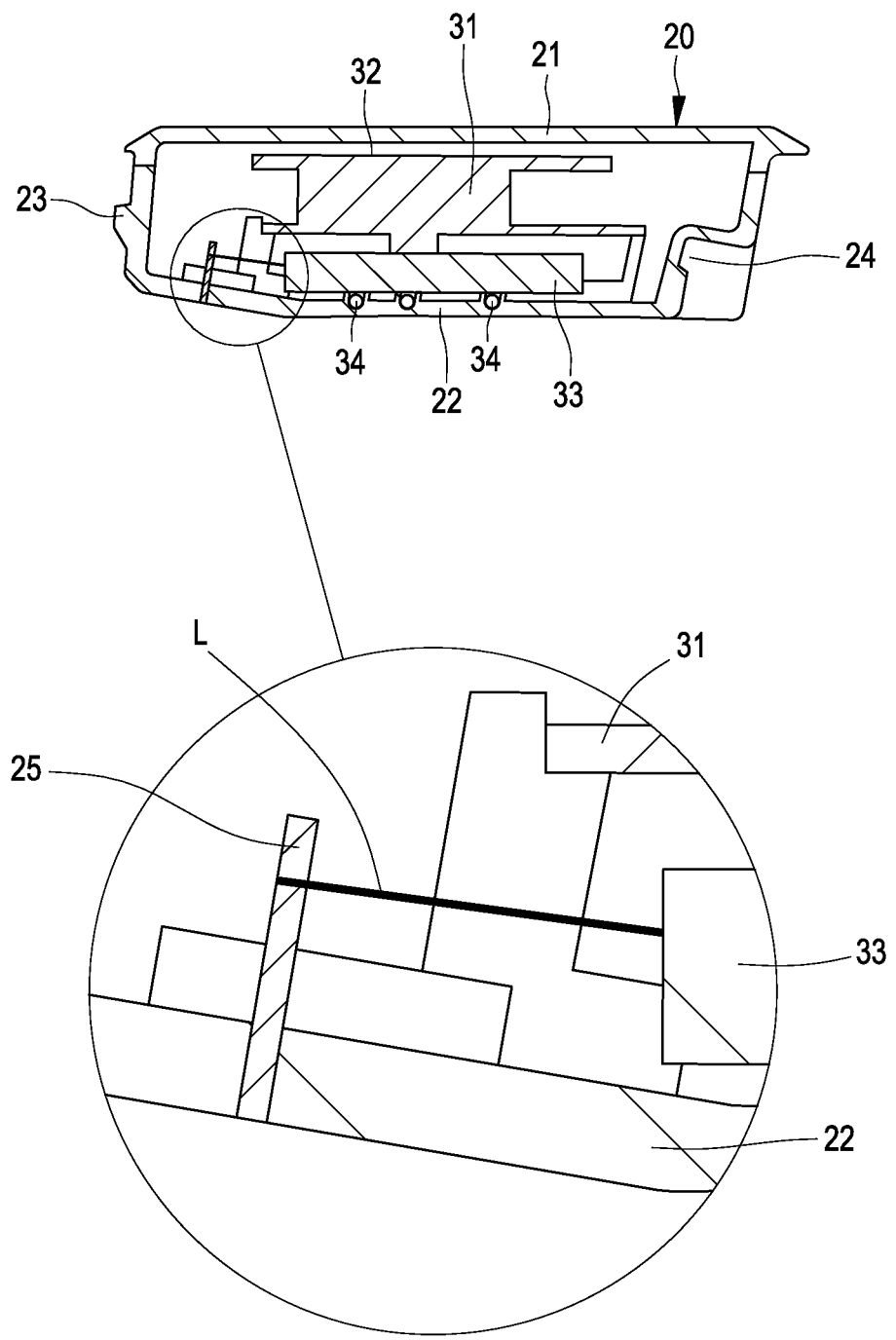
FIG. 11 is a cross sectional view taken against the section line of 11-11 from previous FIG. 4.
Figure 12:
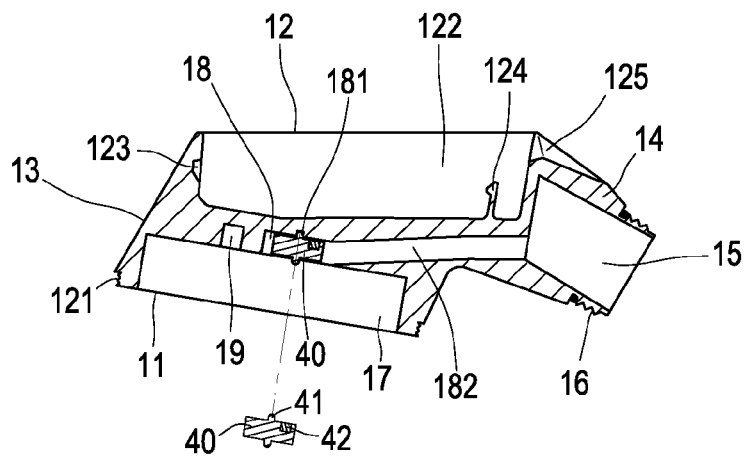
FIG. 12 is the first assembling illustrative view for conventional "handheld shower head with filter replacing pre-display device".
Figure 13:
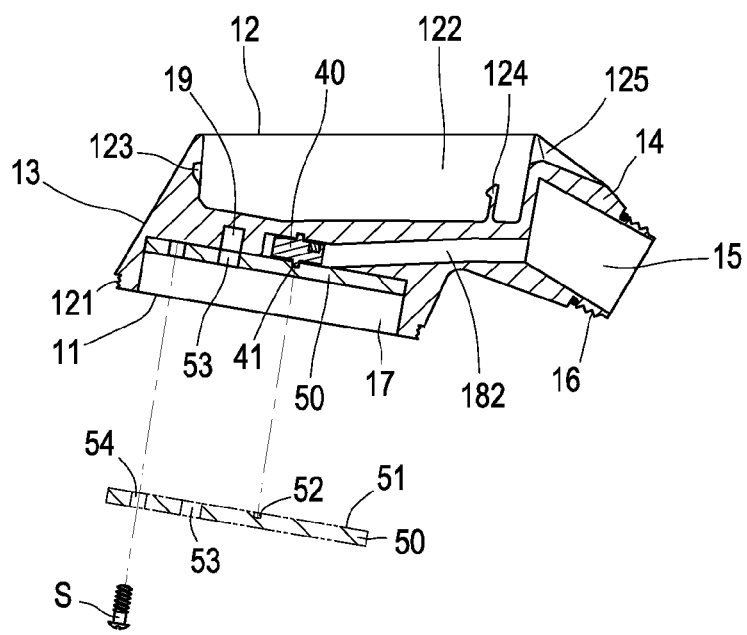
FIG. 13 is the second assembling illustrative view for conventional "handheld shower head with filter replacing pre-display device".
Figure 14:
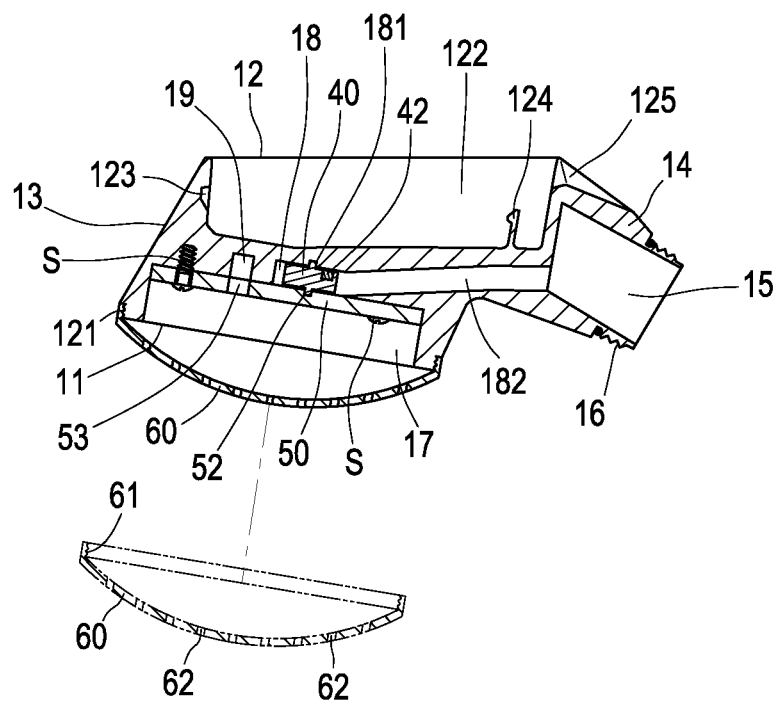
FIG. 14 is the third assembling illustrative view for conventional "handheld shower head with filter replacing pre-display device".
Figure 15:
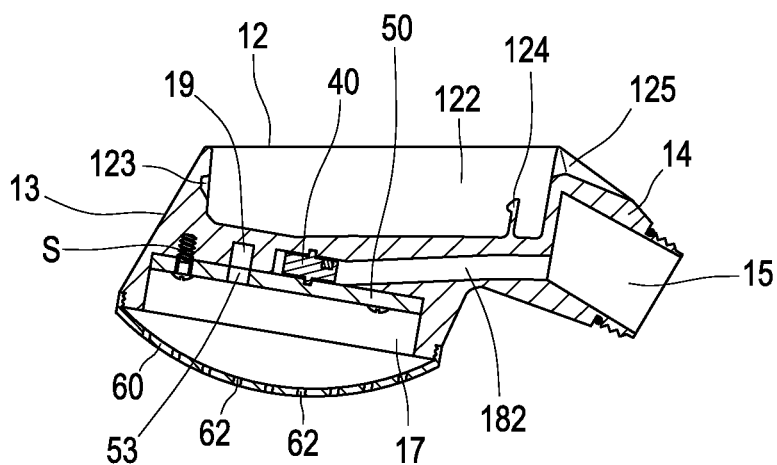
FIG. 15 is the fourth assembling illustrative view for conventional "handheld shower head with filter replacing pre-display device".
Figure 16:
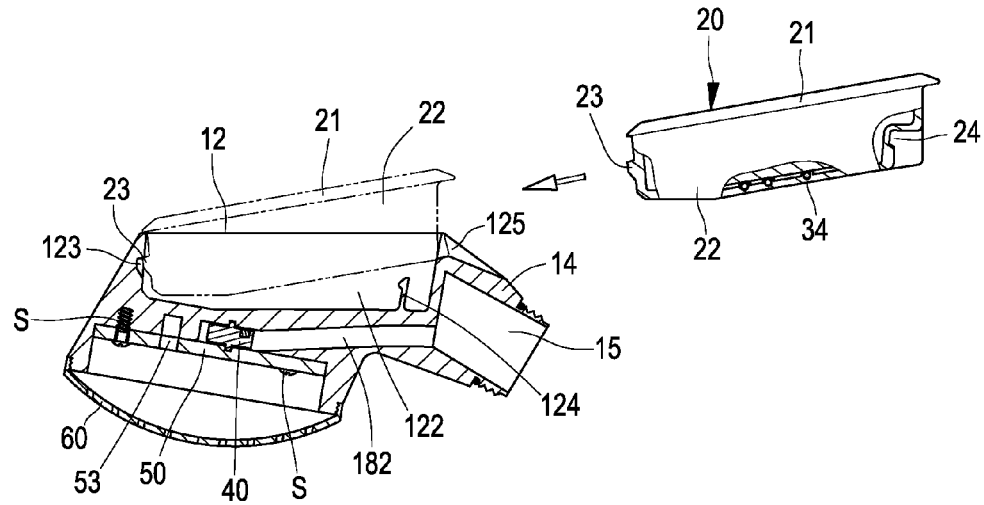
FIG. 16 is the first illustrative view showing the coupling of an alerting pod with a showerhead for conventional "handheld shower head with filter replacing pre-display device".
Figure 17:
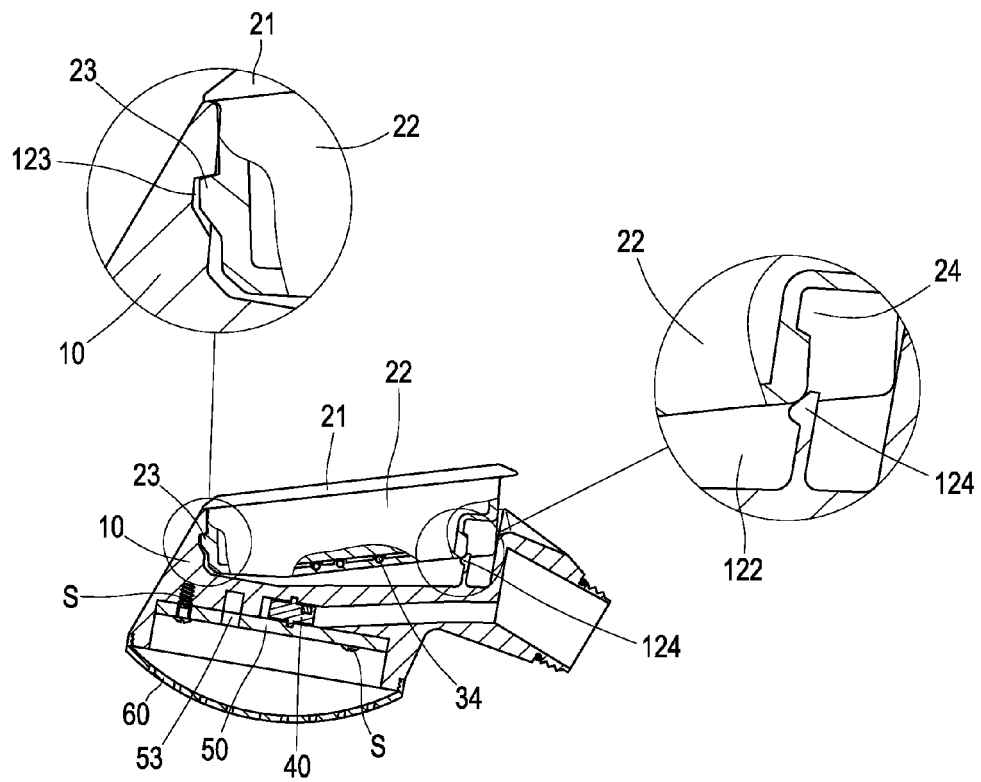
FIG. 17 is the second illustrative view showing the coupling of an alerting pod with a showerhead for conventional "handheld shower head with filter replacing pre-display device".
Figure 18:
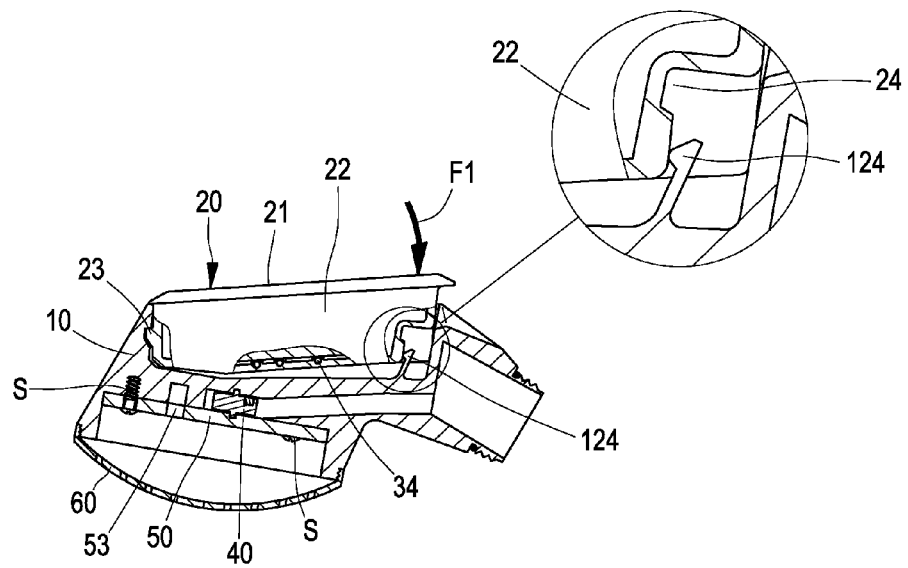
FIG. 18 is the third illustrative view showing the coupling of an alerting pod with a showerhead for conventional "handheld shower head with filter replacing pre-display device".
Figure 19:
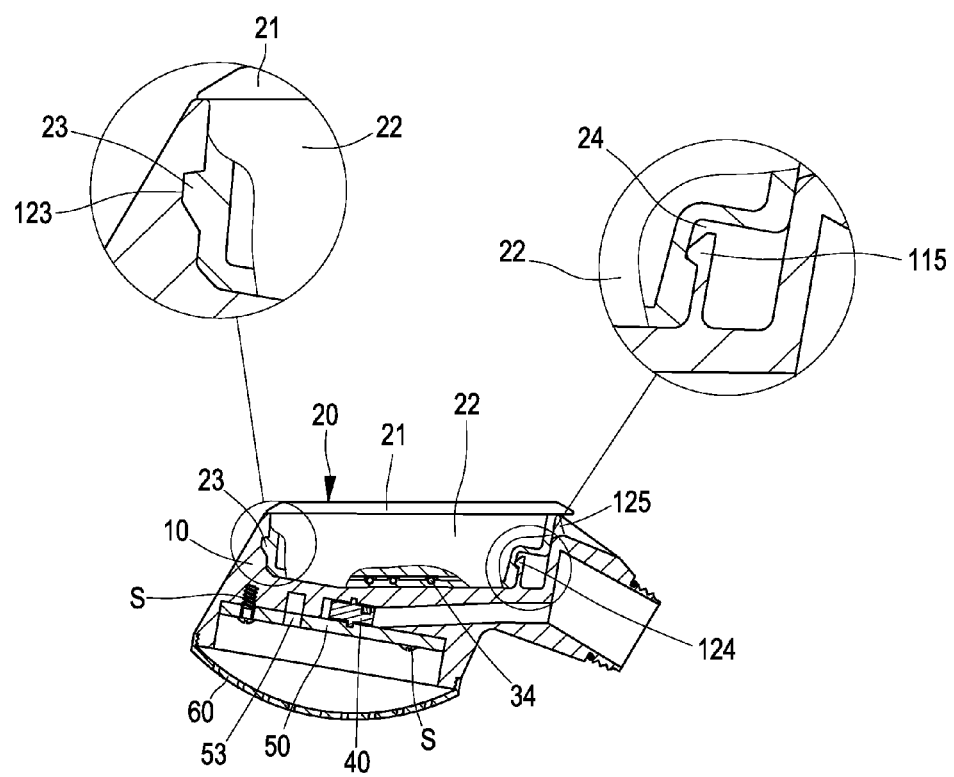
FIG. 19 is the fourth illustrative view showing the coupling of an alerting pod with a showerhead for conventional "handheld shower head with filter replacing pre-display device".
Figure 20:
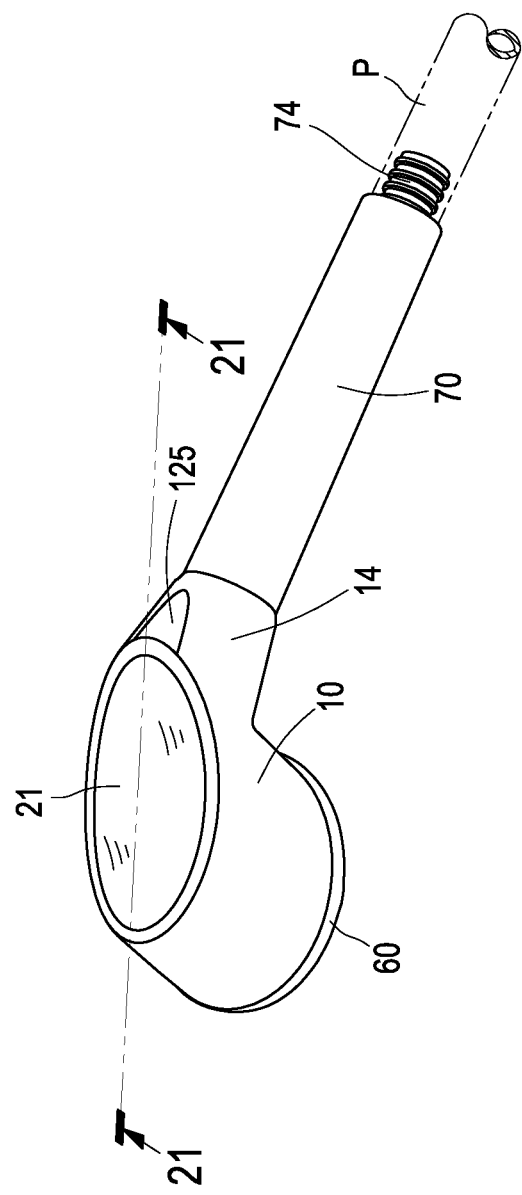
FIG. 20 is a perspective view showing assemble of a filter cartridge with a showerhead for conventional "handheld shower head with filter replacing pre-display device".
Figure 21:
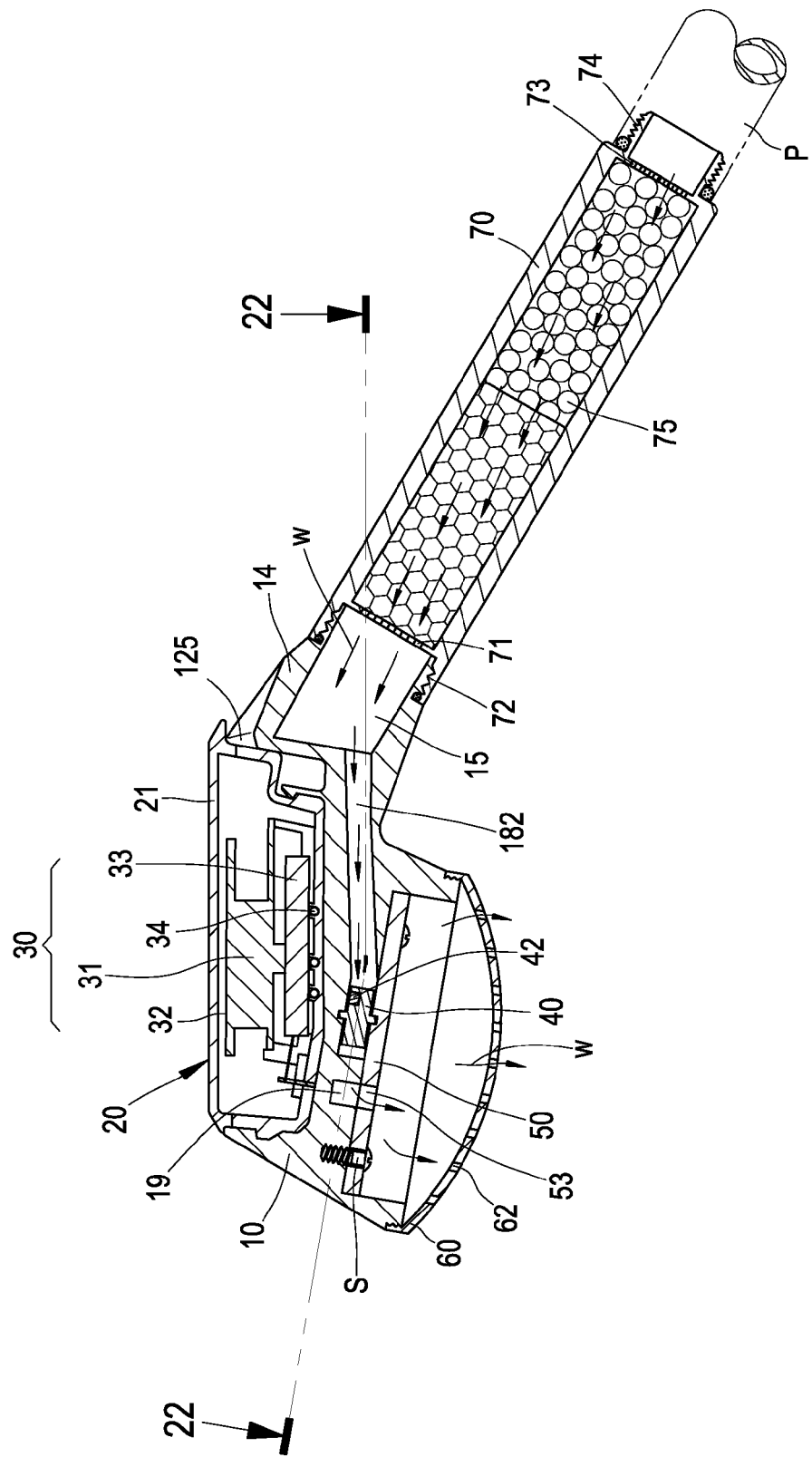
FIG. 21 is a cross sectional view taken against the section line of 21-21 from previous FIG. 20.
Figure 22:
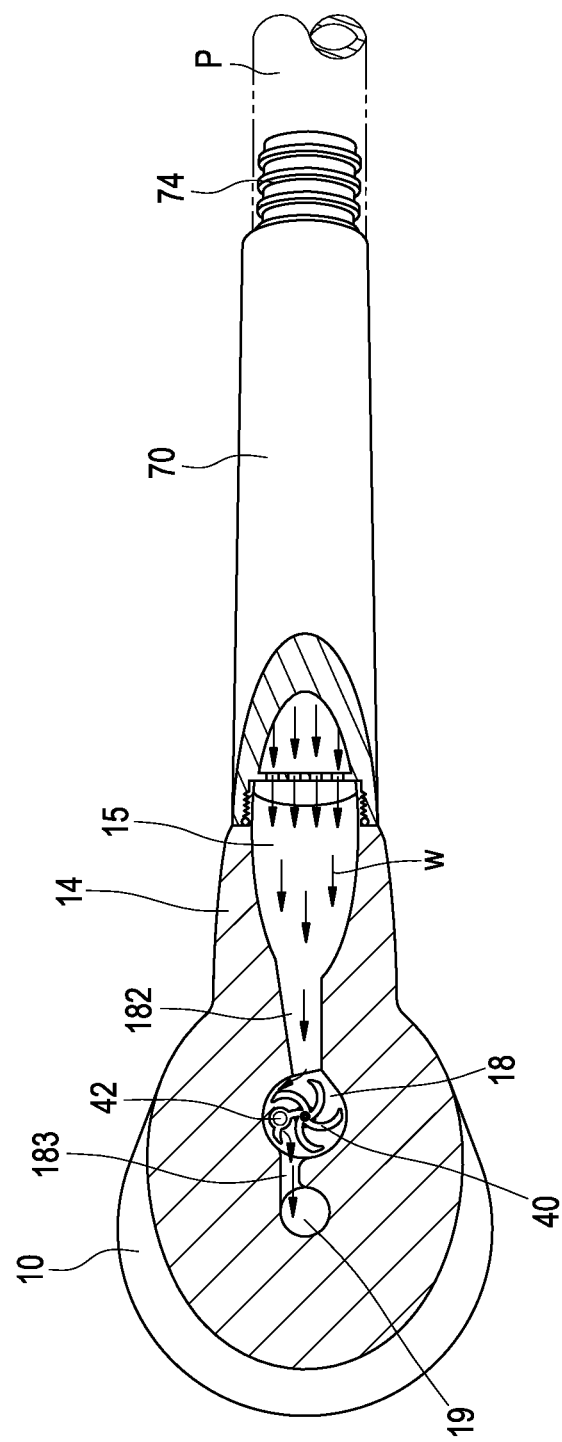
FIG. 22 is a cross sectional view taken against the section line of 22-22 from previous FIG. 21.
Figure 23:
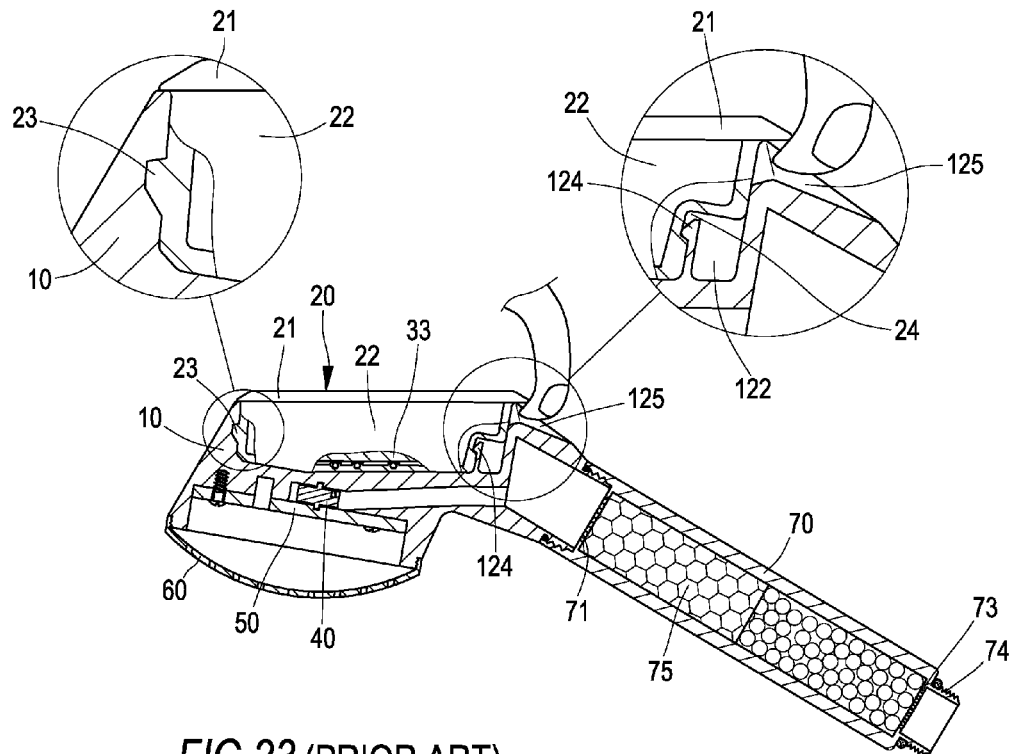
FIG. 23 is the first illustrative view showing the lifting transparent lid of an alerting pod from a showerhead for conventional "handheld shower head with filter replacing pre-display device".
Figure 24:
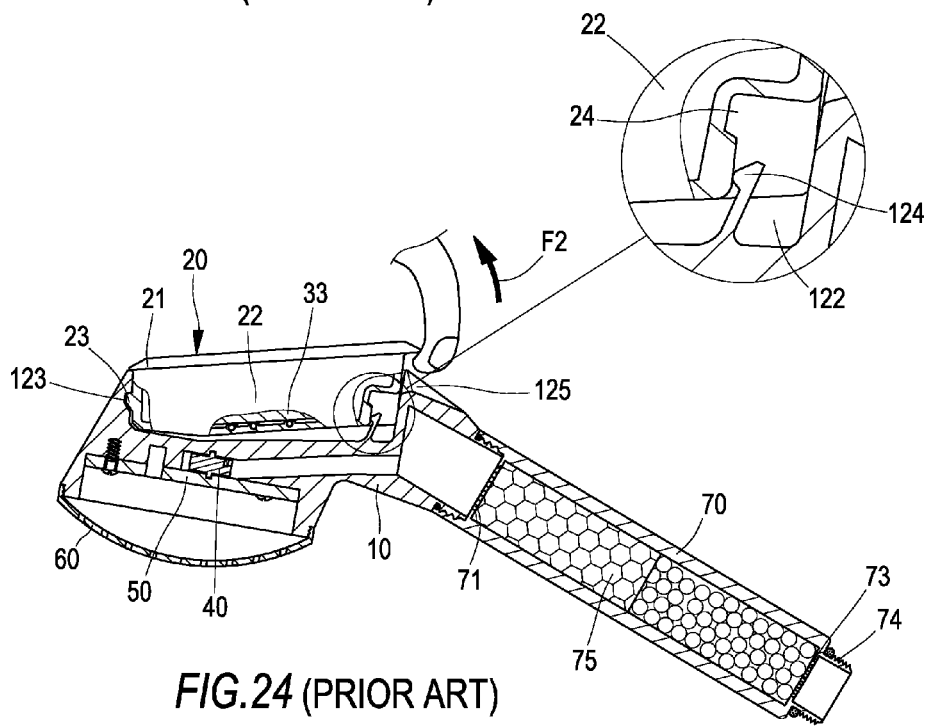
FIG. 24 is the second illustrative view showing the lifting transparent lid of an alerting pod from a showerhead for conventional "handheld shower head with filter replacing pre-display device".
Figure 25:
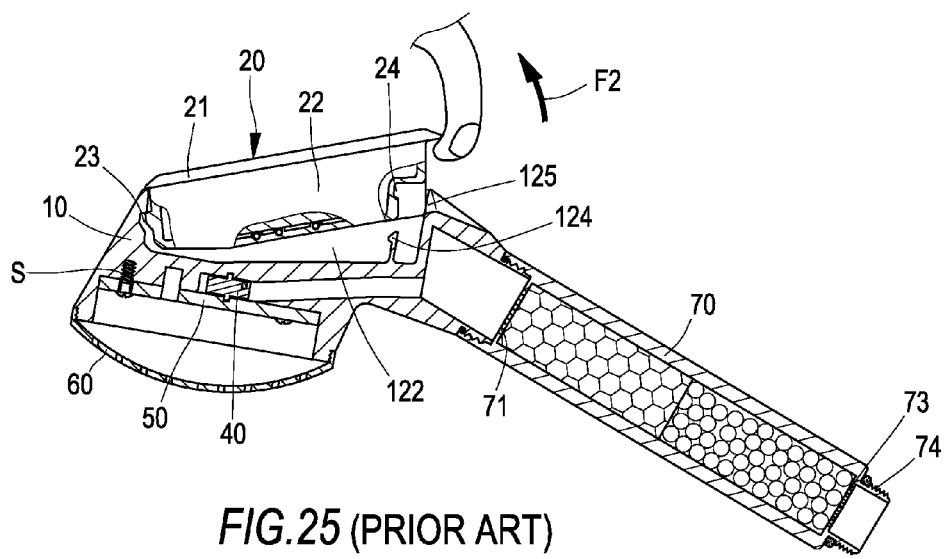
FIG. 25 is the third illustrative view showing the lifting transparent lid of an alerting pod from a showerhead for conventional "handheld shower head with filter replacing pre-display device".
Figure 26:
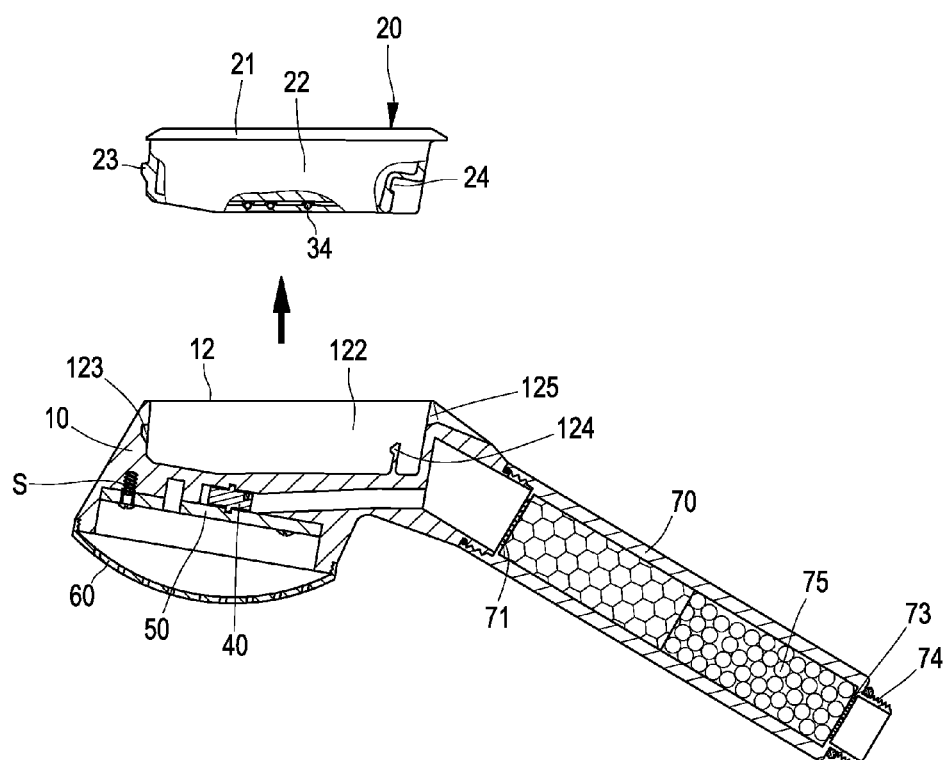
FIG. 26 is the fourth illustrative view showing the lifting transparent lid of an alerting pod from a showerhead for conventional "handheld shower head with filter replacing pre-display device".
Figure 28:
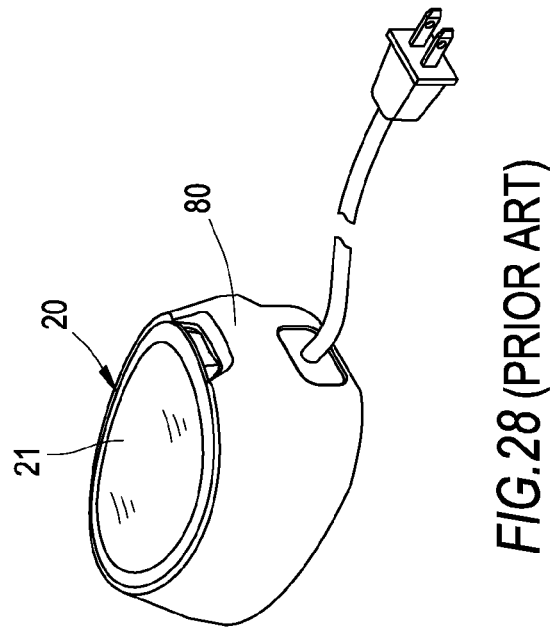
FIG. 28 is a perspective view showing an alerting pod is inserted into a showerhead for conventional "handheld shower head with filter replacing pre-display device".
Figure 27:
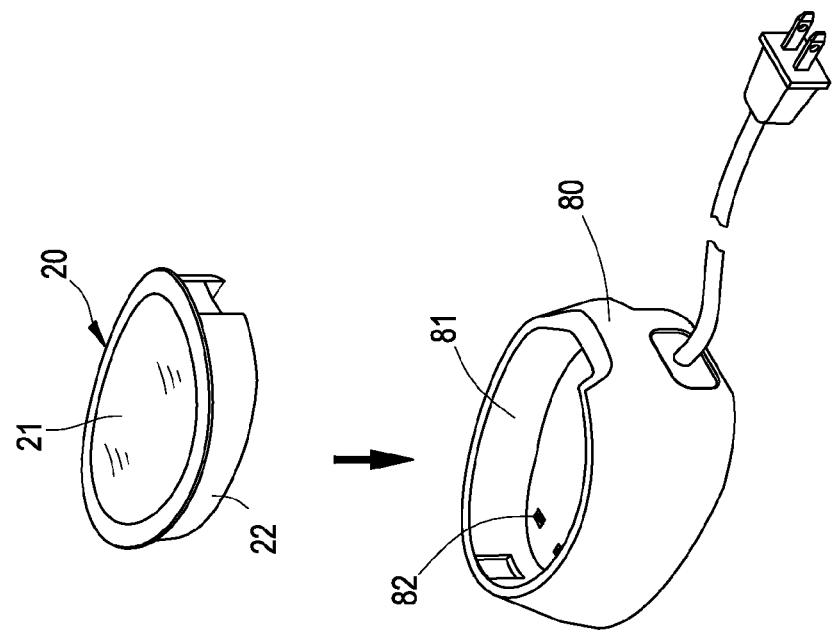
FIG. 27 is a perspective view showing a separated alerting pod is going to insert into a showerhead for conventional "handheld shower head with filter replacing pre-display device".
Figure 29:
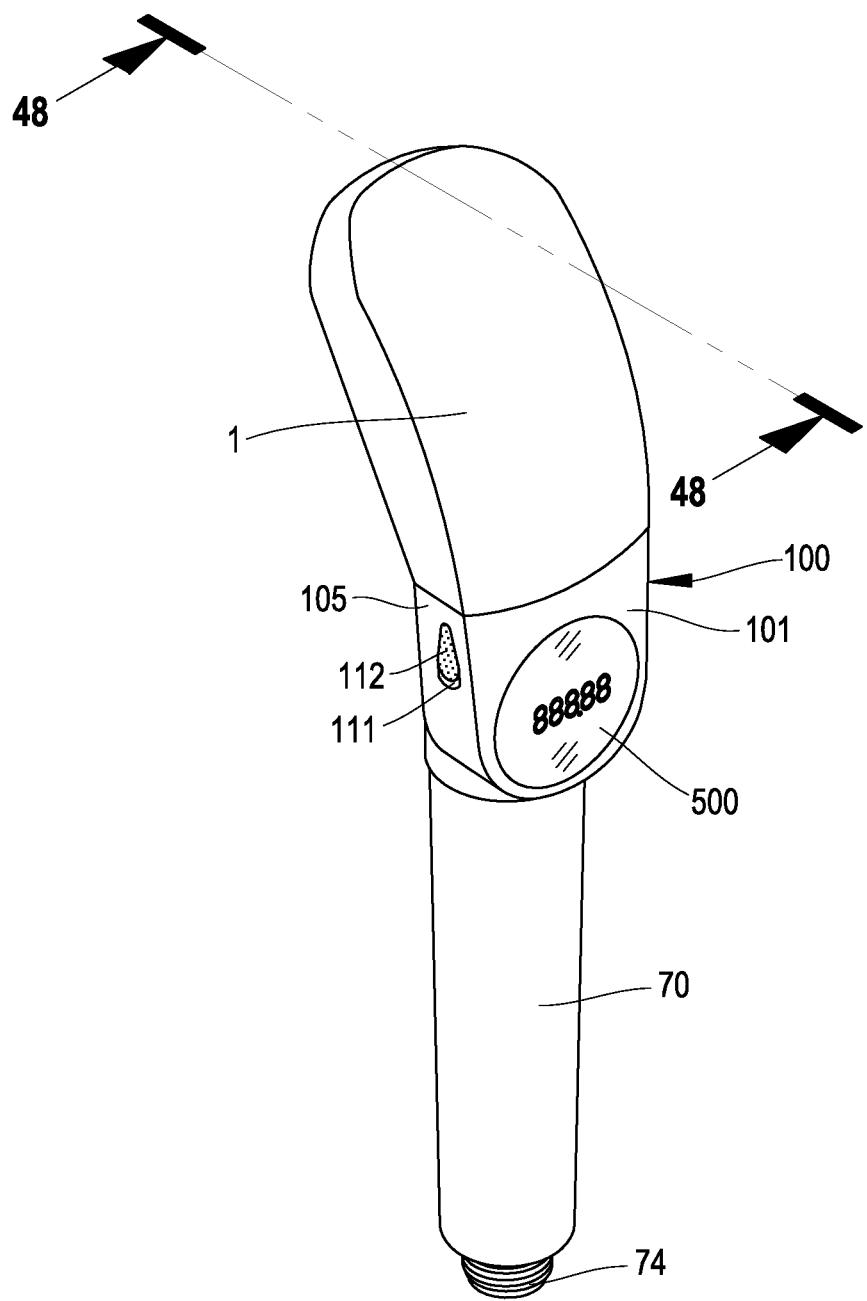
FIG. 29 is an assembled perspective view showing the installation for the first exemplary embodiment of the present invention into a conventional "handheld shower head with built-in filter".
Figure 30:
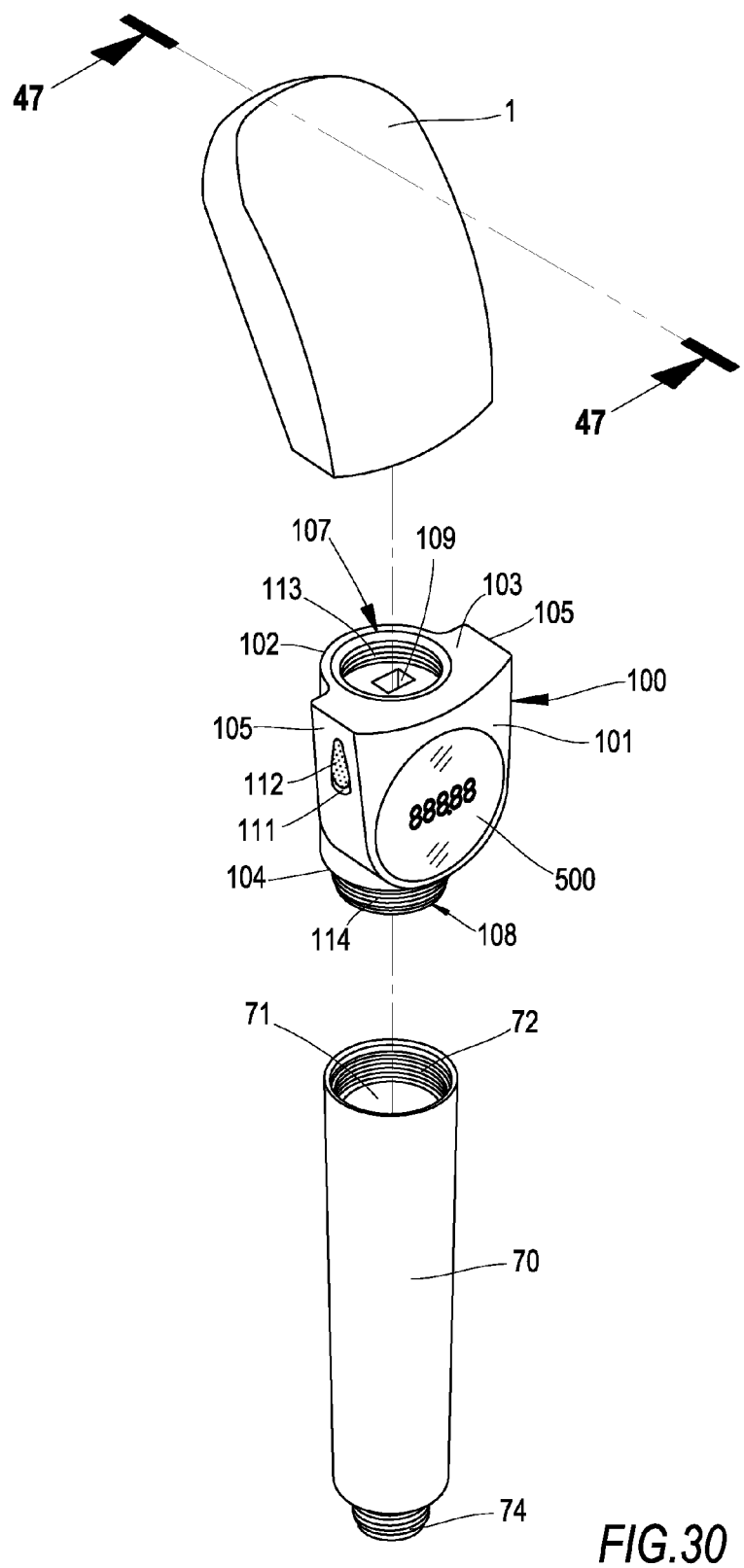
FIG. 30 is a decomposed perspective view showing the installation for the first exemplary embodiment of the present invention into a conventional "handheld shower head with built-in filter".
Figure 84:
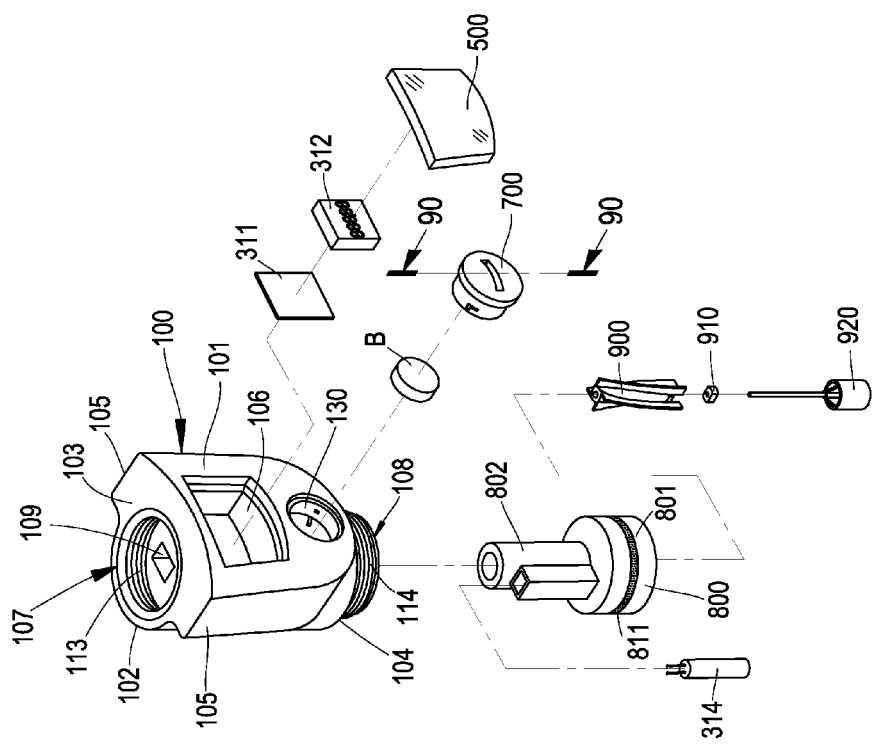
FIG. 84 is an exploded perspective view for a showerhead stem in the third exemplary embodiment of the present invention.
Figure 86:
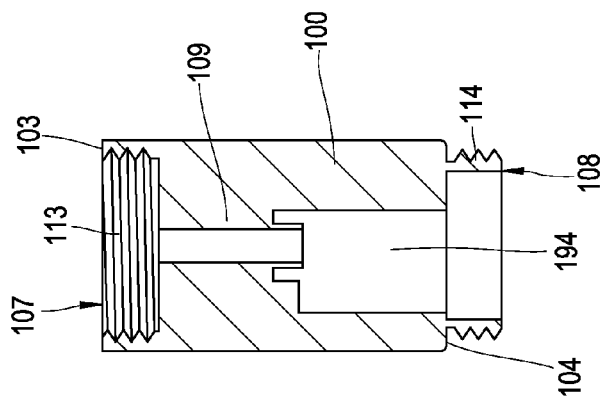
FIG. 86 is a cross sectional view taken against the section line of 86-86 from previous FIG. 85.
Figure 87:
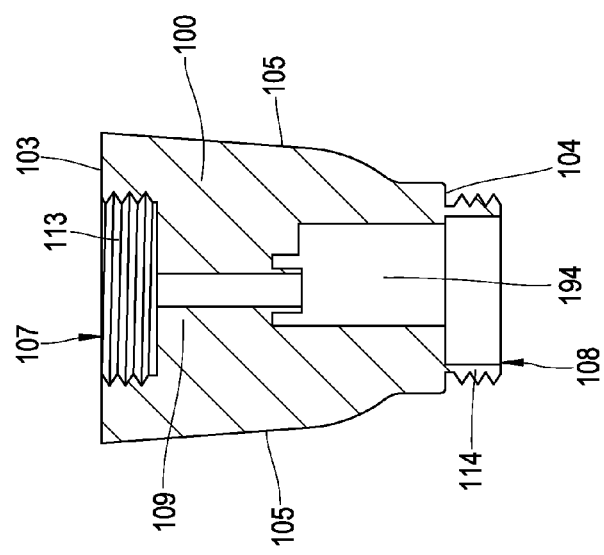
FIG. 87 is a cross sectional view taken against the section line of 87-87 from previous FIG. 86.
Figure 88:
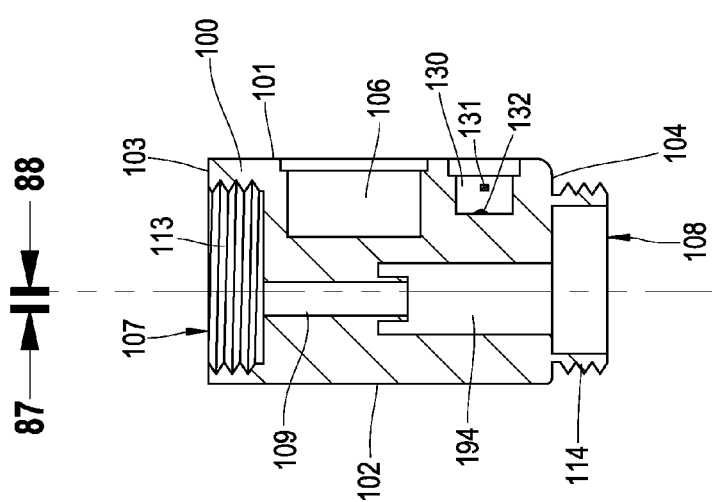
FIG. 88 is a cross sectional view taken against the section line of 88-88 from previous FIG. 86.
Figure 90:
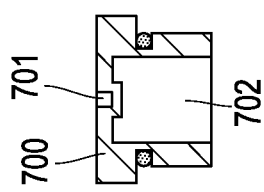
FIG. 90 is a cross sectional view taken against the section line of 90-90 from previous FIG. 84.
Figure 91:
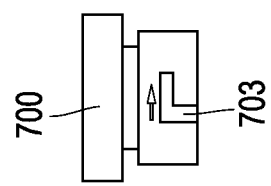
FIG. 91 is a lateral illustrative view for a cover of battery receptacle in the third exemplary embodiment of the present invention.
Figure 89:
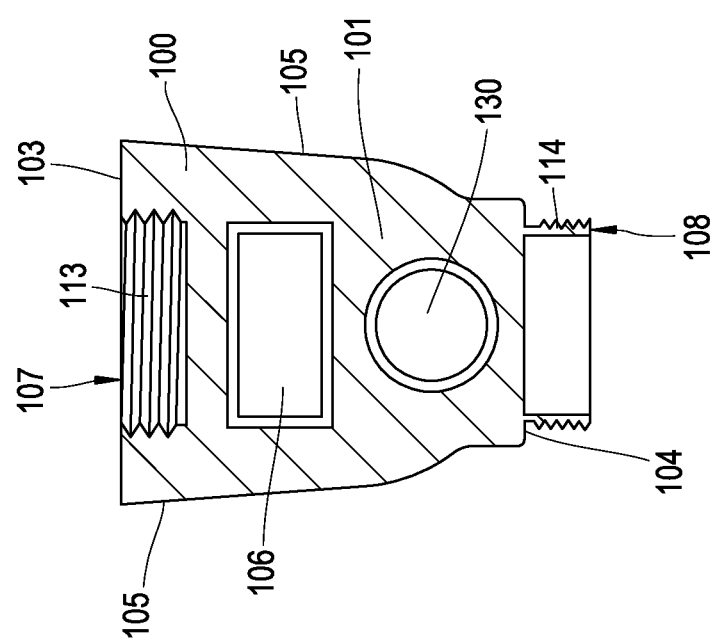
FIG. 89 is a cross sectional view taken against the section line of 89-89 from previous FIG. 85.
Figure 92:
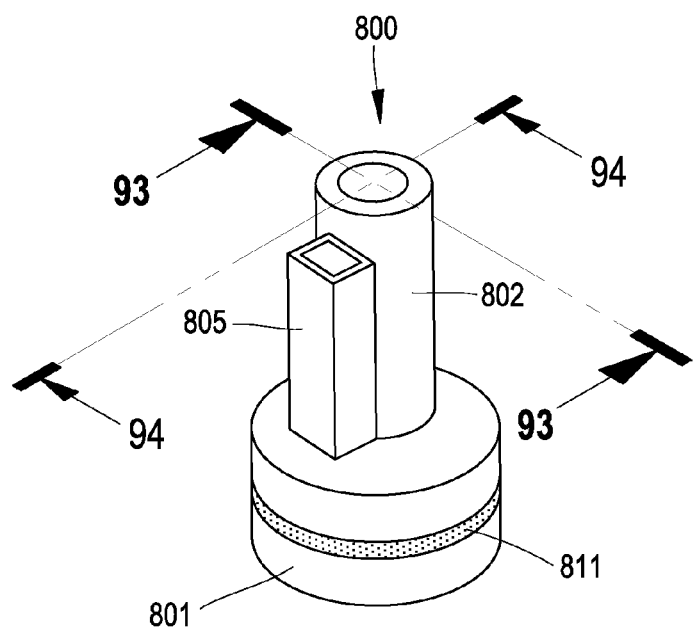
FIG. 92 is a perspective illustrative view for a water flux measuring unit in the third exemplary embodiment of the present invention.
Figure 93:
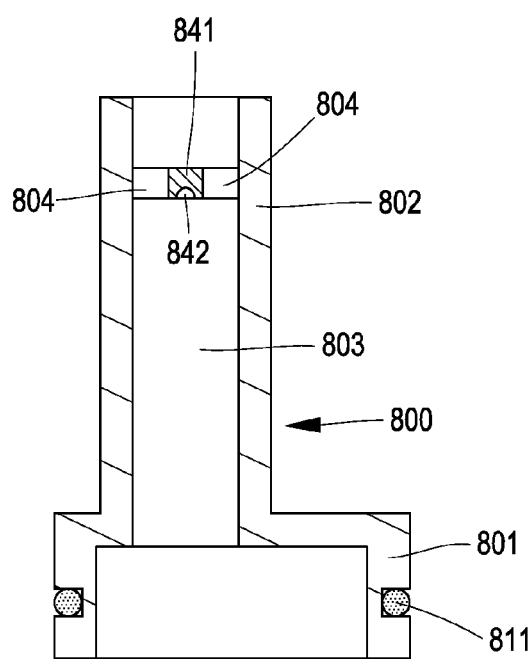
FIG. 93 is a cross sectional view taken against the section line of 93-93 from previous FIG. 92.
Figure 95:
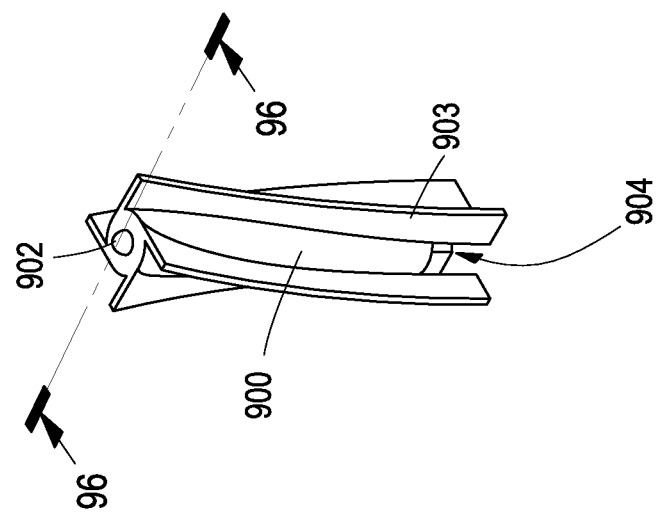
FIG. 95 is a perspective illustrative view for an impeller shaft in axial flow mode for the third exemplary embodiment of the present invention.
Figure 94:
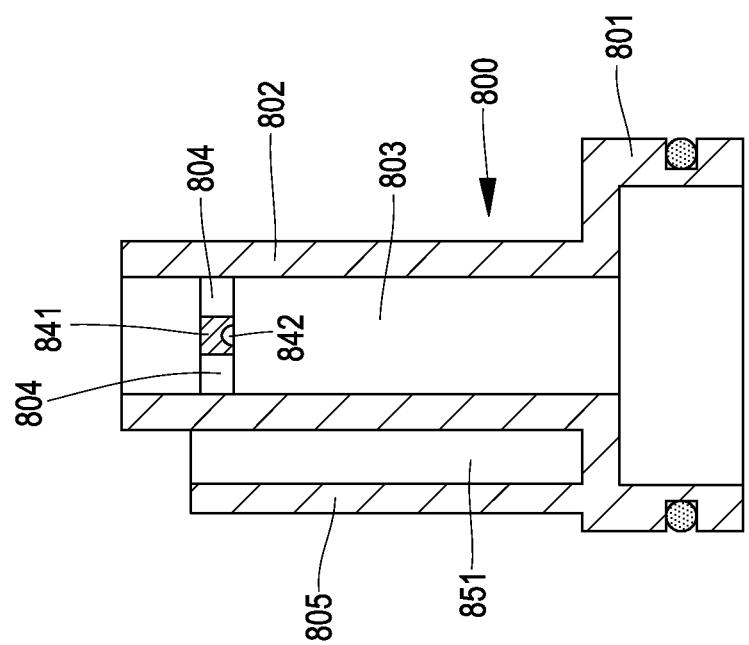
FIG. 94 is a cross sectional view taken against the section line of 94-94 from previous FIG. 92.
Figure 98:
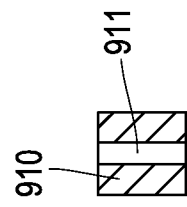
FIG. 98 is a cross sectional view taken against the section line of 98-98 from previous FIG. 97.
Figure 97:
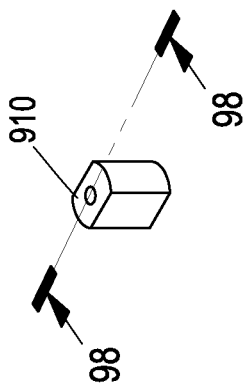
FIG. 97 is a perspective illustrative view for an inducting magnet in the third exemplary embodiment of the present invention.
Figure 96:
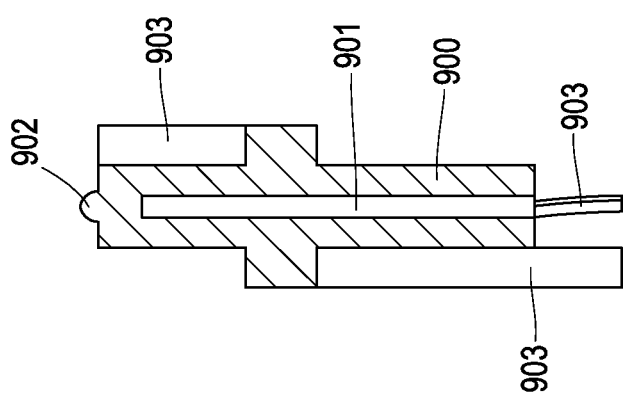
FIG. 96 is a cross sectional view taken against the section line of 96-96 from previous FIG. 95.
Figure 101:
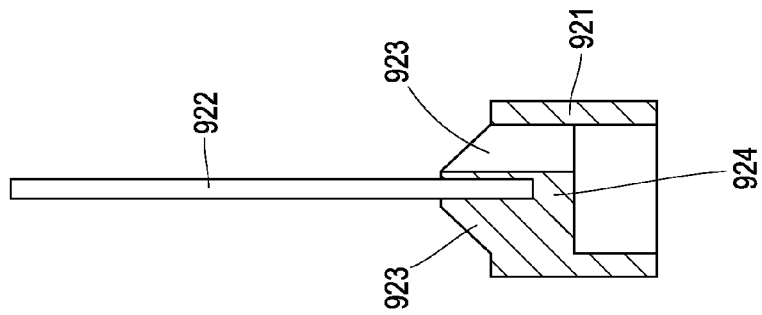
FIG. 101 is a cross sectional view taken against the section line of 101-101 from previous FIG. 99.
Figure 100:
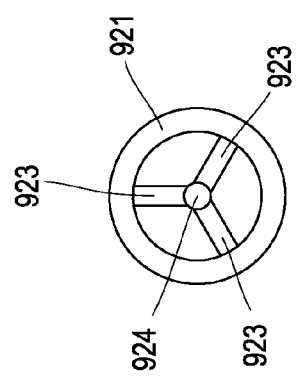
FIG. 100 is a lateral illustrative view for a supporter in axial flow mode for the third exemplary embodiment of the present invention.
Figure 99:
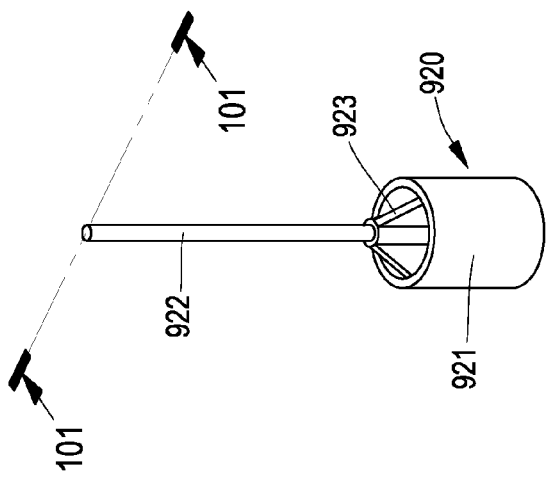
FIG. 99 is a perspective illustrative view for a supporter in axial flow mode for the third exemplary embodiment of the present invention.

Please refer to FIGS. 84 to 101 and FIGS. 105 to 109. The "warning device dedicated for replacing aged-filter in a handheld shower head" for the third exemplary embodiment of the present invention comprises a showerhead stem 100, a transparent lid 500, a cover of a battery receptacle 700, a water flux measuring unit 800, a impeller shaft in axial flow mode 900, as well as a signal circuit device 310, and a button-shaped battery B in addition to conventional handheld showerhead 1 containing a showerhead 10 with a detachable filter cartridge cylinder 70 aforesaid, wherein said showerhead stem 100, which is an integral plastic hollow casing body by unitary piece extrusion mold, includes a front side 101, a back side 102, a top side 103, a upper adapting section 107 with a tubular threaded female fitting 113, a bottom side 104, a lower adapting section 108 with a tubular threaded male fitting 114, and two flanks 105, a mounting cavity 106, a water channel 109 communicably connecting with a cavity 194 for the water flux measuring unit 800, as well as a battery cavity mount 130 with two opposed latching juts 131 and a resilient piece 132 for the button-shaped battery B, wherein the mounting cavity 106 is inwardly created in the front side 101, the tubular threaded female fitting 113 is inwardly created on the top side 104 for screwing engagement with corresponding male tubular threads 3 of the shower head 1 while the tubular threaded male fitting 114 is outwardly created on the bottom side 104 for screwing engagement with corresponding female tubular threads 72 on the water outlet 71 of the filter cartridge cylinder 70, the water channel 109 and cavity 194 are internally and communicably created between the upper adapting section 107 and the lower adapting section 108, as well as the battery cavity mount 130 is inwardly created in the front side 101; said transparent lid 500 is made of plastic material via high frequency fusion method to hermetically watertight cover the mounting cavity 106 in the showerhead stem 100; said cover of a battery receptacle 700, which is bunged into the cavity mount 130 of the showerhead stem 100, includes a handling groove 701 disposed in the top thereof, a battery receptacle 702 disposed in the bottom thereof for accommodating the button-shaped battery B (as shown in FIGS. 108 and 109) and two opposed L-shaped latching fillisters 703 mating with the two opposed latching juts 131 in the battery cavity mount 130 (as shown in FIGS. 90 and 91); said water flux measuring unit 800, which is to be plugged into the cavity 194 in the showerhead stem 100, is a stacked body of two-section configuration having an upper section containing an upper hollow column 802 with a water channel 803 and a flanked hollow pillar 805 with a tubular hollow 851 for accommodating a magnetic reed switch 314 (as shown in FIGS. 84 and 94) as well as a lower section containing a base hollow column 801 with a sealing ring 811 inlaid the circumference thereof such that the outer diameter of the base hollow column 801 is bigger than that of the upper hollow column 802, wherein the water channel 803 includes a plurality of blocking vanes 804 radially disposed in the upper portion thereof such that each blocking vane 804 embraces a heaped body of an upper baffle 841 and a lower docking notch 842; said impeller shaft 900, which is inserted into the water channel 803 in the water flux measuring unit 800, includes a bottom central bushing 901, an upper axial docking jut 902, a plurality of circumferential spiral vanes 903 and a bottom round gapped receptacle 904 encompassed by the bottom ends of the spiral vanes 903 (as shown in FIG. 95), as well as an inducting magnet 910 (as shown in FIG. 97) and a supporter in axial flow mode 920 (as shown in FIG. 99), wherein the inducting magnet 910, which is placed in the round gapped receptacle 904 of the impeller shaft 900, includes a central bushing 911 run through such that the diameter of the central bushing 911 is the same as and in alignment with that of the central bushing 901 in the impeller shaft 900 (as shown in FIGS. 96 through 98); the supporter 920, which is to couple the impeller shaft 900 via the inducting magnet 910, includes a cylindrical mount 921, a metallic supporting shaft 922, a supporting tripod 923 with three radial ribs (as shown in FIG. 100) and a supporting base 924 (as shown in FIGS. 99 and 101) such that the supporting base 924 is configured under the radial ribs of the supporting tripod 923 (as shown in FIG. 101); said signal circuit device 310, which is accommodated in the lower adapting section 106 of the showerhead stem 100, includes a microprocessor 311 and a LCD display circuit 312 (as shown in FIG. 10), as well as a magnetic reed switch 314 in the tubular hollow 851 of the flanked hollow pillar 805 for the water flux measuring unit 800 (as shown in FIG. 105), wherein the microprocessor 311 is connected to the resilient piece 132 in the battery cavity mount 130 of the showerhead stem 100 via an electric wire L (as shown in FIG. 107); and said button-shaped battery B, which is embedded in the cover 700 of the battery receptacle 702, functions for supplying power to the signal circuit device 310.

Wherein, the button-shaped battery B can be either nickel-chromium battery or nickel battery or lithium battery, and the magnetic reed switch 314 can be replaced by Hall-effect component.

Figure 102:
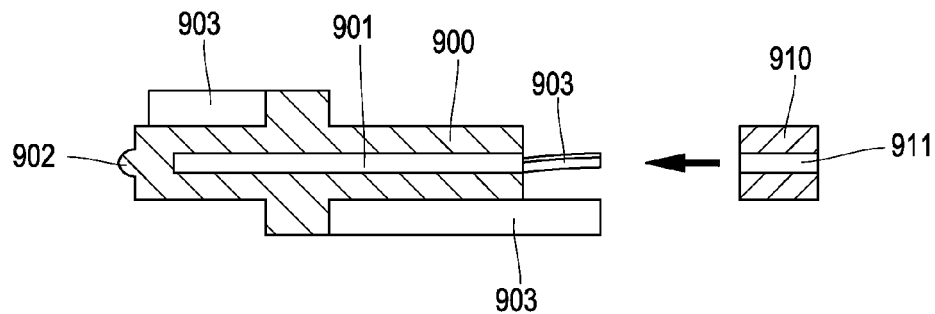
FIG. 102 is the first cross sectional view showing assembly for the third exemplary embodiment of the present invention.
Figure 103:
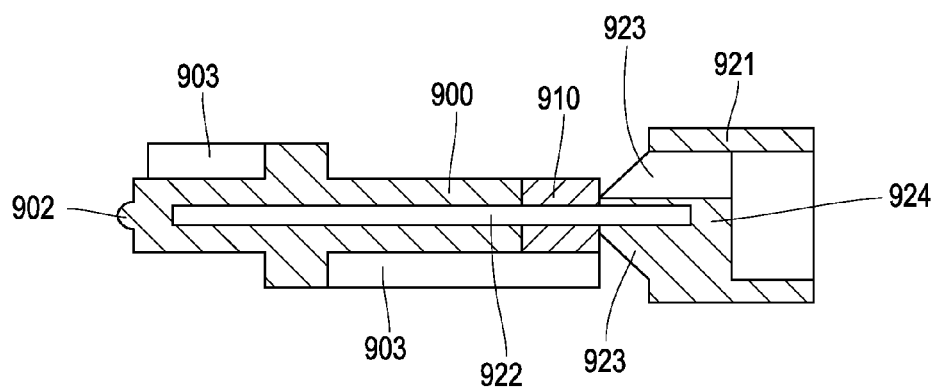
FIG. 103 is the second cross sectional view showing assembly for the third exemplary embodiment of the present invention.
Figure 105:
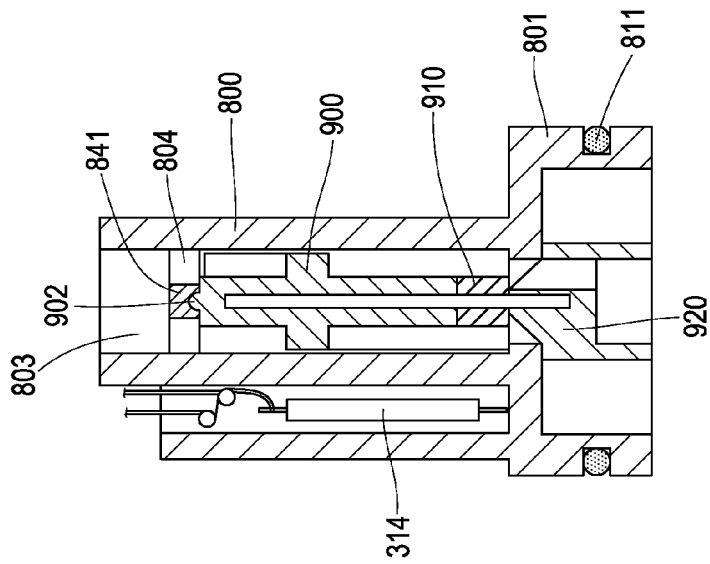
FIG. 105 is the fourth cross sectional view showing assembly for the third exemplary embodiment of the present invention.
Figure 104:
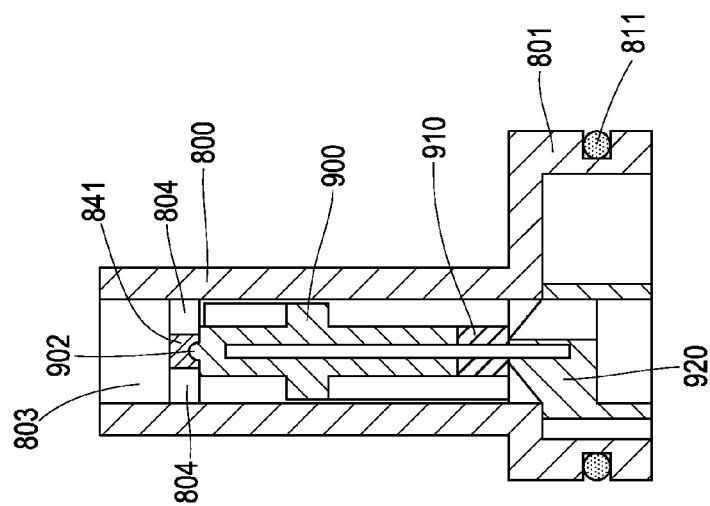
FIG. 104 is the third cross sectional view showing assembly for the third exemplary embodiment of the present invention.
Figure 106:
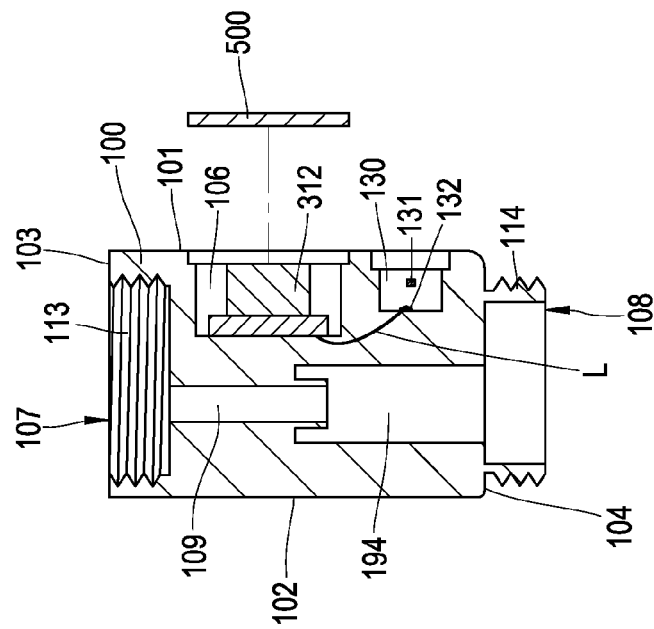
FIG. 106 is the fifth cross sectional view showing assembly for the third exemplary embodiment of the present invention.
Figure 107:
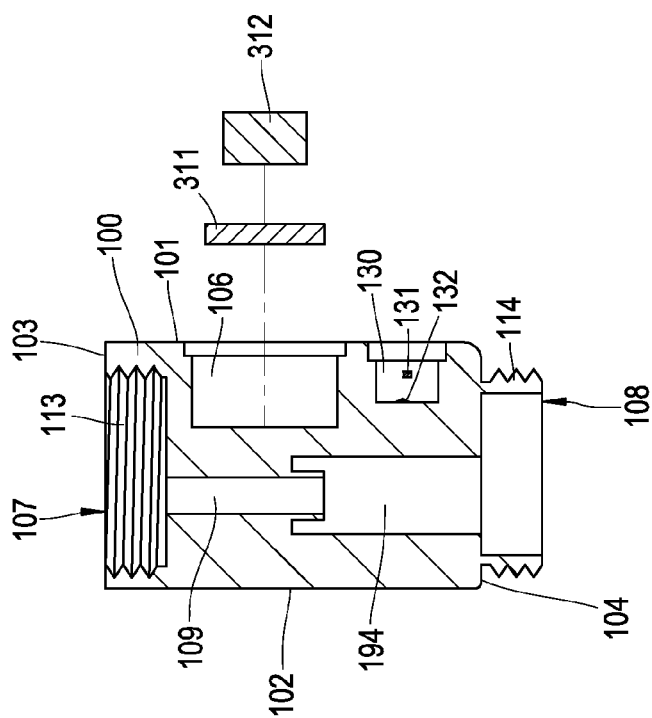
FIG. 107 is the sixth cross sectional view showing assembly for the third exemplary embodiment of the present invention.
Figure 109:
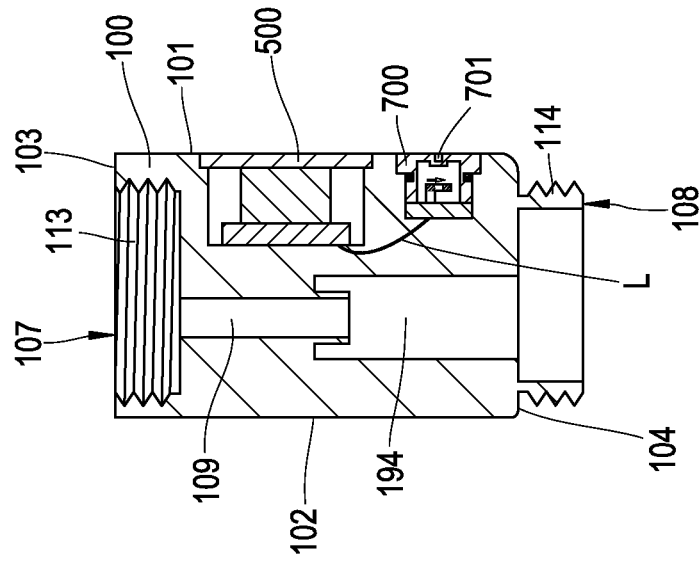
FIG. 109 is the eighth cross sectional view showing assembly for the third exemplary embodiment of the present invention.
Figure 108:
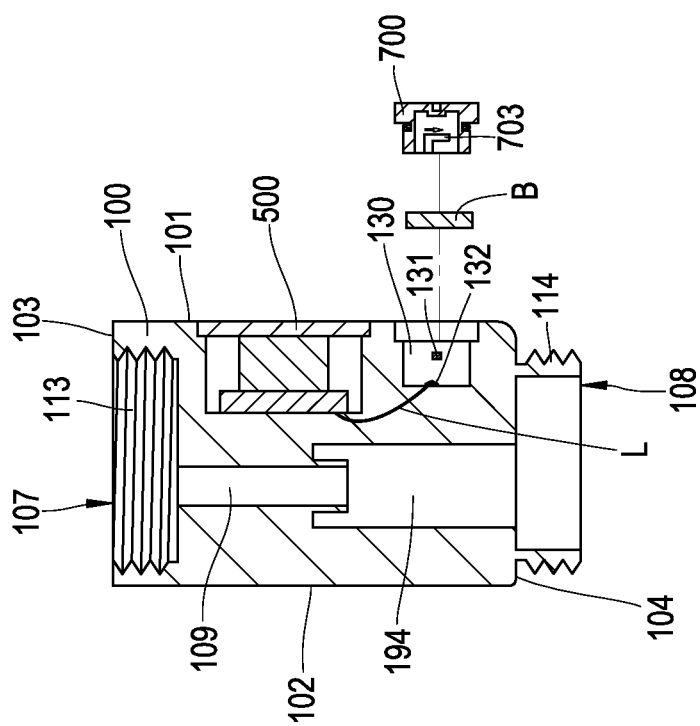
FIG. 108 is the seventh cross sectional view showing assembly for the third exemplary embodiment of the present invention.
Figure 111:
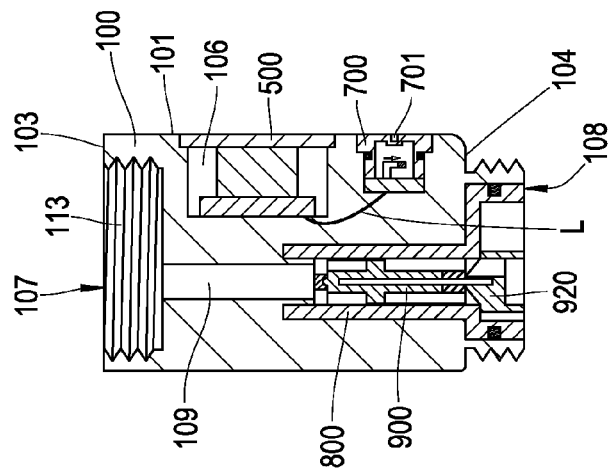
FIG. 111 is the tenth cross sectional view showing assembly for the third exemplary embodiment of the present invention.
Figure 110:
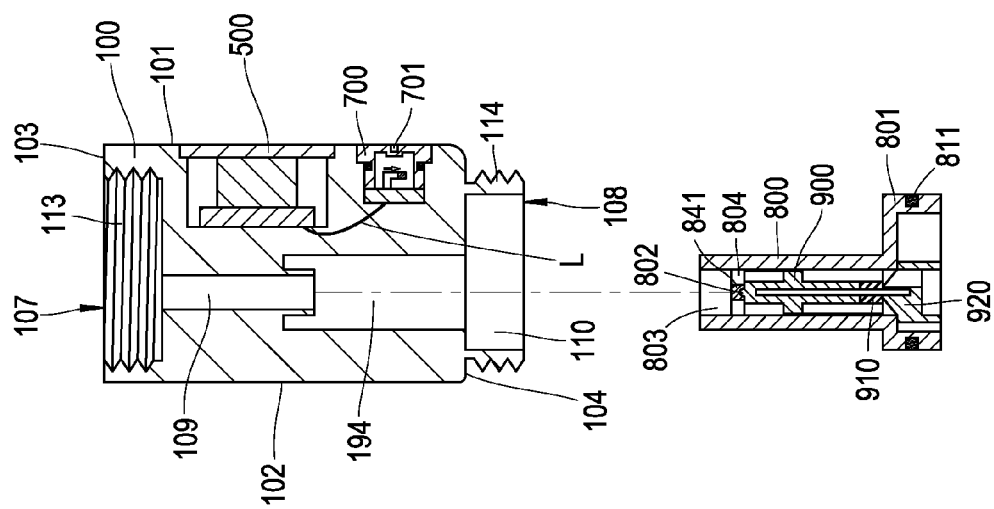
FIG. 110 is the ninth cross sectional view showing assembly for the third exemplary embodiment of the present invention.
Figure 113:
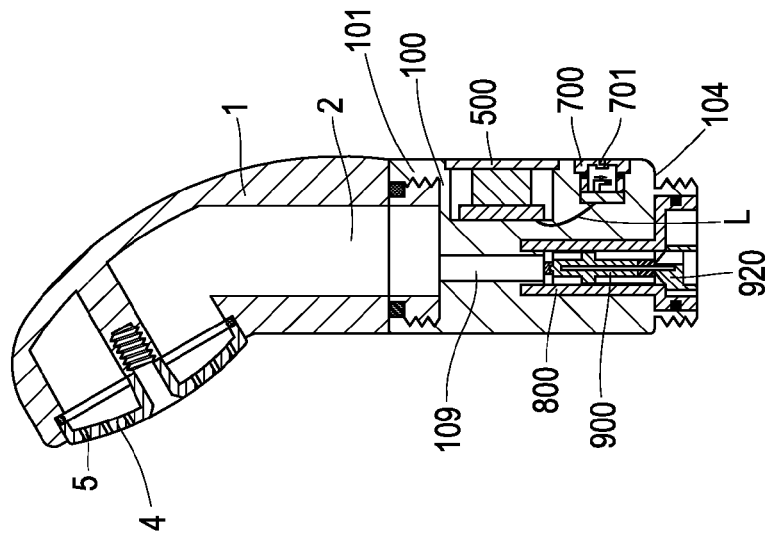
FIG. 113 is the first perspective view showing the assembly for the third exemplary embodiment of the present invention into a conventional "handheld shower head with built-in filter".

Please refer to FIGS. 102 to 111. The assembly procedure for the third exemplary embodiment of the present invention is stepwise performed as below. Step a, place the inducting magnet 910 in the round gapped receptacle 904 of the impeller shaft 900 (as shown in FIG. 102) so that the diameter of the central bushing 911 is in alignment with that of the central bushing 901 in the impeller shaft 900, then run the metallic supporting shaft 922 of the orderly through the central bushing 911 of the inducting magnet 910 and the central bushing 901 of the impeller shaft 900 respectively (as shown in FIG. 103). Step b, insert the impeller shaft 900 into the water channel 803 of the water flux measuring unit 800 by facing the axial docking jut 902 thereof toward the entrance of the water channel 803 until the axial docking jut 902 touches against the docking notch 842 of the blocking vanes 804 (as shown in FIGS. 104 and 105), and place the magnetic reed switch 314 into the flanked hollow pillar 805 of the water flux measuring unit 800 (as shown in FIG. 105), then connect the magnetic reed switch 314 to the microprocessor 311 of the signal circuit device 310 by the electric wire L (not shown in figures). Step c, place the integral water flux measuring unit 800 from previous step b into the cavity 194 in the bottom side 104 of the showerhead stem 100 by facing the upper hollow column 802 thereof toward the entrance of the cavity 194 in the water flux measuring unit 800 until the sealing ring 811 on the base hollow column 801 contact against the internal wall of the cavity 194 (as shown in FIGS. 110 through 111). Step d, connect the microprocessor 311 to the resilient piece 132 in the battery cavity mount 130 of the showerhead stem 100 by the electric wire L (as shown in FIG. 107), and respectively insert the microprocessor 311 and LCD display circuit 312 of the signal circuit device 310 into the mounting cavity 106 of the showerhead stem 100 (as shown in FIGS. 108 through 109), then cover the transparent lid 500 on the mounting cavity 106 in the front side 101 of the showerhead stem 100 via high frequency fusion method. Step e, embed the button-shaped battery B into the battery cavity mount 130 and securely engage the L-shaped latching fillisters 703 of the cover 700 with corresponding latching juts 131 of the battery cavity mount 130 by press down the cover 700 into the battery cavity mount 130 and turn it firmly (as shown in FIG. 111) so that the button-shaped battery B can supply power to the magnetic reed switch 314 and LCD display circuit 312 of the signal circuit device 310 as well as the microprocessor 311 via contacts with the resilient piece 132 in the battery cavity mount 130, then the overall assembly for the third exemplary embodiment of the present invention is accomplished.

Figure 112:
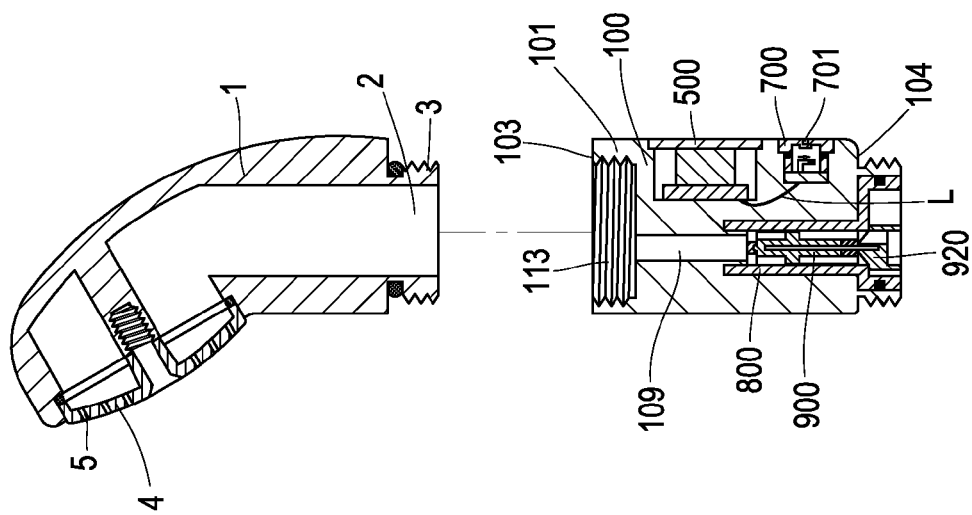
FIG. 112 is the first perspective view showing the disassembly for the third exemplary embodiment of the present invention into a conventional "handheld shower head with built-in filter".
Figure 114:
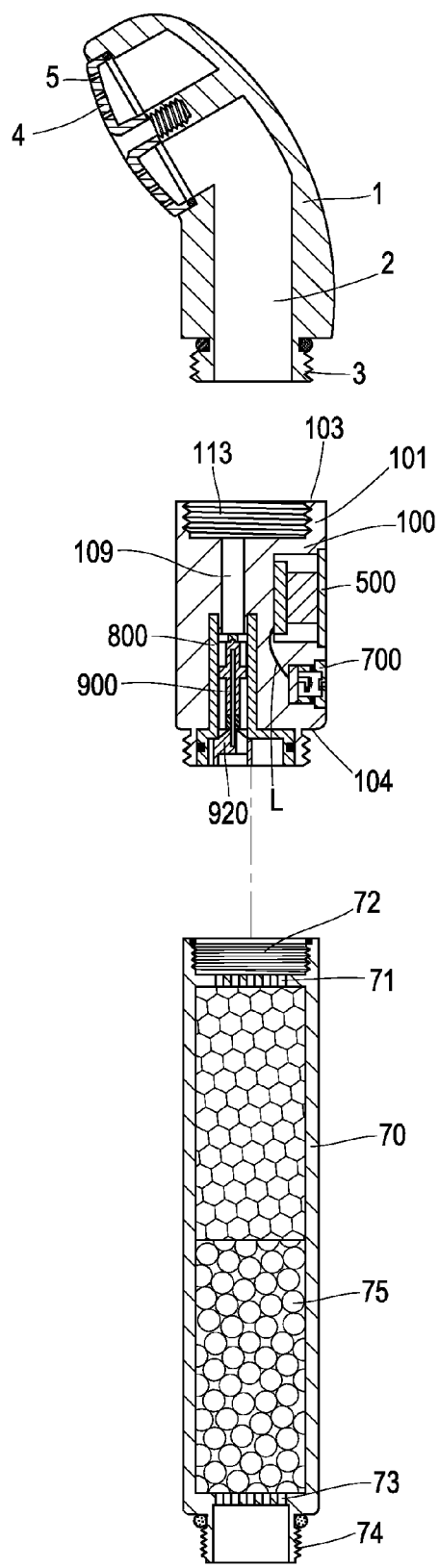
FIG. 114 is the second perspective view showing the disassembly for the third exemplary embodiment of the present invention into a conventional "handheld shower head with built-in filter".

Please refer to FIGS. 112 and 116. The operation for the third exemplary embodiment of the present invention into a conventional "handheld shower head with built-in filter" is described as below. Once the shower water W from the water pipe P flows through the water outlet 71 of the filter cartridge 70, it passes through the supporting tripod 923 of the cylindrical mount 921 in the supporter 920 to drive the spiral vanes 903 in the impeller shaft 900 rotate (as shown in FIG. 115), then the shower water W flows into the water inlet orifice 2 of the handheld showerhead 1 (as shown in FIG. 116), and finally, the shower water W is jetted out of the water spray holes 5 of the cap 4 in the handheld showerhead 1 (as shown in FIGS. 115 through 116), wherein, for each rotation of the spiral vanes 903 with the impeller shaft 900 driven by the running shower water W, the inducting magnet 910 in the round gapped receptacle 904 of the impeller shaft 900 simultaneously causes the magnetic reed switch 314 in the flanked hollow pillar 805 of the water flux measuring unit 800 to induce a switching signal (as shown in FIG. 114), which is relayed to the microprocessor 311 in the signal circuit device 310 for being processed to generate an accumulated data in certain preset interval for further transmitting to the LCD display circuit 312 for displaying related quantity of water flux thereon in accordance with following formula:

$$\text{Quantity of water flux (Q)} = \text{Cross sectional area (A)} \text{ times Flow velocity (V)}$$

Basing on the quantity of water flux (Q), the total filtered water quantity flowed through the filter cartridge 70 is accumulated and displayed on the LCD display circuit 312 and stored in the microprocessor 311, which can be processed to predict the rest service life time of the handheld showerhead 1. Thereby, a user of the showerhead can get real time statistical data of the total filtered water quantity flowed through filter cartridge 70 by simply means of looking at the LCD display circuit 312 via the transparent lid 500 on the front side 101 of the showerhead stem 100 (as shown in FIG. 115). Once the total filtered water quantity flowed through filter cartridge 70 reaches (or near reaches) a predetermined critical value for the rated service life time of the specific filter cartridge 70, the microprocessor 311 will send a alerting signal with current data of the total filtered water quantity to the LCD display circuit 312 for reminding the user to notice that it is the time to replace the filter cartridge 70 timely to assure good quality of the filter cartridge 70 and filtered water thereby. Therefore, the user can avoid the harmful consequences to the health caused by the unclean shower water W incurred by missing the replacement time and still continuously use the ineffective filter cartridge 70.

For replacing the button-shaped battery B, please further refer to FIGS. 84, 90 and 91. The power of the button-shaped battery B in the cover 700 of the battery receptacle 702 may run out after several replacements for the filter cartridge cylinder 70. Once the power of the button-shaped battery B run out, the cover 700 of a battery receptacle 702 can be taken off the battery cavity mount 130 of the showerhead stem 100 (as shown in FIG. 84) by simply inserting a coin into the handling groove 701 of the cover 700, and turn the cover 700 for detaching L-shaped latching fillister 703 thereof off the latching juts 131 in the battery cavity mount 130 (as shown in FIGS. 90 and 91); subsequently, replace a new button-shaped battery B for the spoiled button-shaped battery B in the cover 700 of a battery receptacle 702, then reversely perform previous steps aforesaid so that the new button-shaped battery B will supply power to the magnetic reed switch 314 and LCD display circuit 312 of the signal circuit device 310 as well as the microprocessor 311. Therefore, some drawbacks incurred by the redundant procedures such as detaching the alerting pod 20 off the round docking socket 122 in the back side 12 of the shower head 10, recharging the rechargeable battery 403, and recovering the alerting pod 20 over the round docking socket 122 in the back side 12 of the shower head 10 for the prior art handheld showerhead with filter replacing pre-alarm device can be eliminated by the third exemplary embodiment of the present invention.

In conclusion of the foregoing disclosure, the showerhead stem 100 of the present invention is easily sandwiched between the conventional handheld showerhead 1 and filter cartridge cylinder 70 for conventional "handheld shower head with built-in filter", the issues of top-heavy awkwardness, quickened aging fatigue and redundant purchase waste happened in the prior art "handheld showerhead with filter replacing pre-alarm device", which is already published by R.O.C. patent published No. 201406337 and US patent published No. 20140042240, are all solved. It is apparent that the present invention really has novelty, nonobviousness and industrial practical usage, which meet the criterion of the patentability. Therefore, we submit the patent application of the present invention in accordance with related patent laws.

What is claimed is:

1. A "warning device dedicated for replacing aged-filter in a handheld showerhead" comprises a showerhead stem, an impeller mount, an impeller, a signal circuit device and a transparent lid in addition to conventional handheld showerhead containing a detachable filter cartridge cylinder, wherein said showerhead stem, which is an integral plastic hollow casing body with a front side, a back side, a top side a bottom side and two flanks by unitary piece extrusion mold, includes a mounting cavity, an upper adapting section, a lower adapting section, a water channel, an impeller well and a recharging receptacle, wherein the mounting cavity is inwardly created in the front side, the upper adapting section is inwardly created in the top side, the lower adapting section is outwardly created on the bottom side, the water channel is internally created between the upper adapting section in the top side and the lower adapting section on the bottom side, the impeller well is inwardly created at the intersection of the bottom side and the water channel, and the recharging receptacle is inwardly created in one flank; said impeller mount, which is a slab with a front side and a bottom side for being inserted into the impeller well of the showerhead stem, includes a rotation axle disposed on the front side, and a water directing lump disposed on the front side near the bottom side such that the width of the water directing lump is less than the width of the front side so that the a water directing channel is created between the water directing lump and water channel after the impeller mount having inserted into the impeller well of the showerhead stem; said impeller, which is windmill-shaped wheel with multiple radial vanes, includes a magnetic element disposed on one vane and a central axial bushing run through for coupling with corresponding rotation axle on the front side of the impeller mount to let the impeller rotate freely; said signal circuit device, which is contained in the mounting cavity of the showerhead stem, includes a microprocessor, a LCD display circuit electrically connected to the microprocessor, a rechargeable battery electrically connected to the microprocessor, and a magnetic reed switch securely inset on the internal bottom side of the mounting cavity in the showerhead stem such that the rechargeable battery is electrically connected with the recharging receptacle of the showerhead stem via a pair of electric wires; and said transparent lid is made of plastic material via high frequency fusion method to hermetically watertight cover the mounting cavity in the showerhead stem.

2. The warning device dedicated for replacing aged-filter in a handheld showerhead as claimed in claim 1, wherein the upper adapting section in the top side of the showerhead stem is a tubular threaded female fitting of cylindrical cavity.

3. The warning device dedicated for replacing aged-filter in a handheld showerhead as claimed in claim 1, wherein the lower adapting section on the bottom side of the showerhead stem is a tubular threaded male fitting of cylindrical protrusion.

4. The warning device dedicated for replacing aged-filter in a handheld showerhead as claimed in claim 1, wherein the upper adapting section of the top side in the showerhead stem is adapted into a round recess socket with an inverted L-shaped latching jut.

5. The warning device dedicated for replacing aged-filter in a handheld showerhead as claimed in claim 1, wherein the recharging receptacle inwardly created in one flank in the showerhead stem is further disposed a plastic waterproof cover.

6. The warning device dedicated for replacing aged-filter in a handheld showerhead as claimed in claim 1, wherein the rechargeable battery in the signal circuit device is either nickel-chromium battery or nickel battery or lithium battery.

7. The warning device dedicated for replacing aged-filter in a hand-held showerhead as claimed in claim 1, wherein the magnetic reed switch in the signal circuit device is replaced by Hall-effect component.

8. A warning device dedicated for replacing aged-filter in a handheld showerhead comprises a showerhead stem, an impeller mount, an impeller, a signal circuit device and a transparent cover in addition to modified conventional handheld showerhead containing a detachable filter cartridge cylinder, wherein said showerhead stem, which is an integral plastic hollow casing body with a front side, a back side, a top side, a bottom side and two flanks by unitary piece extrusion mold, includes a mounting cavity, a tubular threaded male fitting, a round recess socket, an inverted L-shaped latching jut, a circular flange, a water channel, an impeller well and a recharging receptacle, wherein the mounting cavity inwardly created in the front side such that the tubular threaded male fitting is outwardly created on the bottom side, the round recess socket and inverted L-shaped latching jut are inwardly created in the top side, the circular flange with peripheral rim male threads is outwardly formed at the mounting cavity, the water channel is internally created between the round recess socket in the top side and the tubular threaded male fitting on the bottom side, the impeller well is inwardly created at the intersection of the bottom side and the water channel such that it is communicable between the water channel and impeller well, and the recharging receptacle is inwardly created in the top side in a position near the round recess socket; said impeller mount, which is a slab with a front side and a bottom side for being inserted into the impeller well of the showerhead stem, includes a vertical rotation axle disposed on the front side, and a water directing lump disposed on the front side near the bottom side such that the width of the water directing lump is less than the width of the front side so that the a water directing channel is created between the water directing lump and water channel after the impeller mount having inserted into the impeller well of the showerhead stem; said impeller, which is windmill-shaped wheel with multiple radial vanes, includes a magnetic element disposed on one vane and a central axial bushing run through for coupling with corresponding rotation axle on the front side of the impeller mount to let the impeller rotate freely; said signal circuit device, which is contained in the mounting cavity of the showerhead stem, includes a microprocessor, a LCD display circuit electrically connected to the microprocessor, a rechargeable battery electrically connected to the microprocessor, and a magnetic reed switch securely inset on the internal bottom side of the mounting cavity in the showerhead stem such that the rechargeable battery is electrically connected with the recharging receptacle of the showerhead stem via a pair of electric wires; and said transparent cover, which is made of plastic material into planar disk, includes a protrusion with hoop female threads formed at the backside thereof and a rubber sealing ring, which sleeves over the hoop female threads.

9. The warning device dedicated for replacing aged-filter in a handheld showerhead as claimed in claim 8, wherein the upper adapting section of the top side in the showerhead stem is adapted into a tubular threaded female fitting.

10. The warning device dedicated for replacing aged-filter in a handheld showerhead as claimed in claim 8, wherein the rechargeable battery in the signal circuit device is either nickel-chromium battery or nickel battery or lithium battery.

11. The warning device dedicated for replacing aged-filter in a handheld showerhead as claimed in claim 8, wherein the magnetic reed switch in the signal circuit device is replaced by Hall-effect component.

12. A warning device dedicated for replacing aged-filter in a handheld shower head comprises a showerhead stem, a transparent lid, a cover of a battery receptacle, a water flux measuring unit, a impeller shaft, a signal circuit device, and a button-shaped battery in addition to conventional handheld showerhead containing a showerhead with a detachable filter cartridge cylinder aforesaid, wherein said showerhead stem, which is an integral plastic hollow casing body by unitary piece extrusion mold, includes a front side, a back side, a top side, an upper adapting section with a tubular threaded female fitting, a bottom side, a lower adapting section with a tubular threaded male fitting, and two flanks, a mounting cavity, a water channel communicably connecting with a cavity for a water flux measuring unit, as well as a battery cavity mount with two opposed latching juts and a resilient piece for the button-shaped battery, wherein the mounting cavity is inwardly created in the front side, the tubular threaded female fitting is inwardly created on the top side while the tubular threaded male fitting is outwardly created on the bottom side, the water channel and cavity are internally and communicably created between the upper adapting section and the lower adapting section, as well as the battery cavity mount is inwardly created in the front side; said transparent lid is made of plastic material via high frequency fusion method to hermetically watertight cover the mounting cavity in the showerhead stem; said cover of a battery receptacle, which is bunged into the cavity mount of the showerhead stem, includes a handling groove disposed in the top thereof, a battery receptacle disposed in the bottom thereof and two opposed L-shaped latching fillisters mating with the two opposed latching juts in the battery cavity mount; said water flux measuring unit, which is to be plugged into the cavity in the showerhead stem, is a stacked body of two-section configuration having an upper section containing an upper hollow column with a water channel and a flanked hollow pillar with a tubular hollow as well as a lower section containing a base hollow column with a sealing ring inlaid the circumference thereof such that the outer diameter of the base hollow column is bigger than that of the upper hollow column, wherein the water channel includes a plurality of blocking vanes radially disposed in the upper portion thereof such that each blocking vane embraces a heaped body of an upper baffle and a lower docking notch; said impeller shaft, which is inserted into the water channel in the water flux measuring unit, includes a bottom central bushing, an upper axial docking jut, a plurality of circumferential spiral vanes and a bottom round gapped receptacle encompassed by the bottom ends of the spiral vanes, as well as an inducting magnet and a supporter in axial flow mode, wherein the inducting magnet, which is placed in the round gapped receptacle of the impeller shaft 900, includes a central bushing run through such that the diameter of the central bushing is the same as and in alignment with that of the central bushing in the impeller shaft; the supporter, which is to couple the impeller shaft via the inducting magnet, includes a cylindrical mount, a metallic supporting shaft, a supporting tripod with three radial ribs and a supporting base such that the supporting base is configured under the radial ribs of the supporting tripod; said signal circuit device, which is accommodated in the lower adapting section of the showerhead stem, includes a microprocessor and a LCD display circuit, as well as a magnetic reed switch in the tubular hollow of the flanked hollow pillar for the water flux measuring unit, wherein the microprocessor is connected to the resilient piece in the battery cavity mount of the showerhead stem and the magnetic reed switch in the tubular hollow of the flanked hollow pillar for the water flux measuring unit via electric wires respectively; and said button-shaped battery is embedded in the cover of the battery receptacle, and functions for supplying power to the signal circuit device.

13. The warning device dedicated for replacing aged-filter in a handheld showerhead as claimed in claim 12, wherein the button-shaped battery is either nickel-chromium battery or nickel battery or lithium battery.

14. The warning device dedicated for replacing aged-filter in a handheld showerhead as claimed in claim 12, wherein the magnetic reed switch in the signal circuit device is replaced by Hall-effect component.

\* \* \* \* \*